(12) United States Patent
Kim et al.

(10) Patent No.: US 12,056,708 B2
(45) Date of Patent: Aug. 6, 2024

(54) APPARATUS AND METHOD FOR CYBERSECURITY

(71) Applicant: UPPSALA PTE. LTD., Singapore (SG)

(72) Inventors: Hyung Woo Kim, Singapore (SG); Cheong Leng Tan, Singapore (SG); Chek Chuan Narong Chong, Singapore (SG); Jia Hao Donovan Tan, Singapore (SG); Athul Harilal, Singapore (SG); Kar Wing Yeung, Singapore (SG)

(73) Assignee: UPPSALA PTE. LTD., Singapore (SG)

( * ) Notice: Subject to any disclaimer, the term of this patent is extended or adjusted under 35 U.S.C. 154(b) by 461 days.

(21) Appl. No.: 17/424,028

(22) PCT Filed: Dec. 31, 2019

(86) PCT No.: PCT/SG2019/050653
§ 371 (c)(1),
(2) Date: Jul. 19, 2021

(87) PCT Pub. No.: WO2020/149790
PCT Pub. Date: Jul. 23, 2020

(65) Prior Publication Data
US 2022/0101326 A1 Mar. 31, 2022

(30) Foreign Application Priority Data

Jan. 18, 2019 (SG) .............................. 10201900481T
Apr. 3, 2019 (SG) .............................. 10201903000R
Oct. 1, 2019 (SG) .............................. 10201909196V

(51) Int. Cl.
G06Q 20/40 (2012.01)
G06Q 20/38 (2012.01)
H04L 9/40 (2022.01)

(52) U.S. Cl.
CPC ..... *G06Q 20/4016* (2013.01); *G06Q 20/3827* (2013.01); *H04L 63/0464* (2013.01); *H04L 63/0807* (2013.01)

(58) Field of Classification Search
None
See application file for complete search history.

(56) References Cited

U.S. PATENT DOCUMENTS 8,909,646 B1 * 12/2014 Fabrikant ............... G06Q 50/01
707/758
9,672,499 B2 6/2017 Yang et al.
(Continued)

FOREIGN PATENT DOCUMENTS

CN 107085812 A 8/2017

OTHER PUBLICATIONS

Phetsouvanh, "EGRET: Extortion Graph Exploration Techniques in the Bitcoin Network", IEEE International conference on data mining workshops (ICDMW), 2018 (Year: 2018).*

(Continued)

*Primary Examiner* — Wynuel S Aquino
(74) *Attorney, Agent, or Firm* — DENTONS Cohen & Grigsby P.C.

(57) ABSTRACT

An apparatus and a method for cybersecurity, the apparatus comprising a processor being configured to execute instructions in a memory to control the apparatus to receive an input for a subject address in a target blockchain system and to obtain a list of addresses involved in a predefined number of hops of transactions upstream and/or downstream of the subject address in the target blockchain system. Suspicious transaction behaviour of addresses in the obtained list of addresses upstream and/or downstream of the subject address are identified by the apparatus. A risk score indicative of degree of cybersecurity threat for the subject address (Continued)

taking into consideration the suspicious transaction behaviour is then calculated.

20 Claims, 58 Drawing Sheets

(56) References Cited

U.S. PATENT DOCUMENTS

| | | | |
|---|---|---|---|
| 9,882,918 B1 | 1/2018 | Ford et al. | |
| 10,078,750 B1* | 9/2018 | Oliver | G06F 21/552 |
| 10,380,594 B1* | 8/2019 | Bayer | G06F 16/951 |
| 2019/0132344 A1* | 5/2019 | Lem | G06N 20/00 |
| 2020/0125729 A1* | 4/2020 | Priel | G06F 11/302 |

OTHER PUBLICATIONS

Moser M. et al., Towards Risk Scoring of Bitcoin Transactions. Challenges and Opportunities Associated with a Bitcoin-Based Transaction Rating System, Mar. 3, 2014, p. 16-32.

Spathoulas G. et al., Towards Reliable Integrity in Blacklisting: Facing Malicious IPs in GHOST Smart Contracts. 2018 Innovations in Intelligent Systems and Applications (INISTA), Sep. 20, 2018.

Moser M. et al., An inquiry into money laundering tools in the Bitcoin ecosystem. 2013 APWG eCrime Researchers Summit, Apr. 28, 2014, pp. 1-14.

Canellis D., Here's how criminals use Bitcoin to launder dirty money. Nov. 26, 2018.

International Search Report from co-pending Application PCT/SG2019/050653 dated Mar. 20, 2020, pp. 10.

* cited by examiner

① Omission of Characters

② Visually similar letters (e.g. *n* VS *m*)

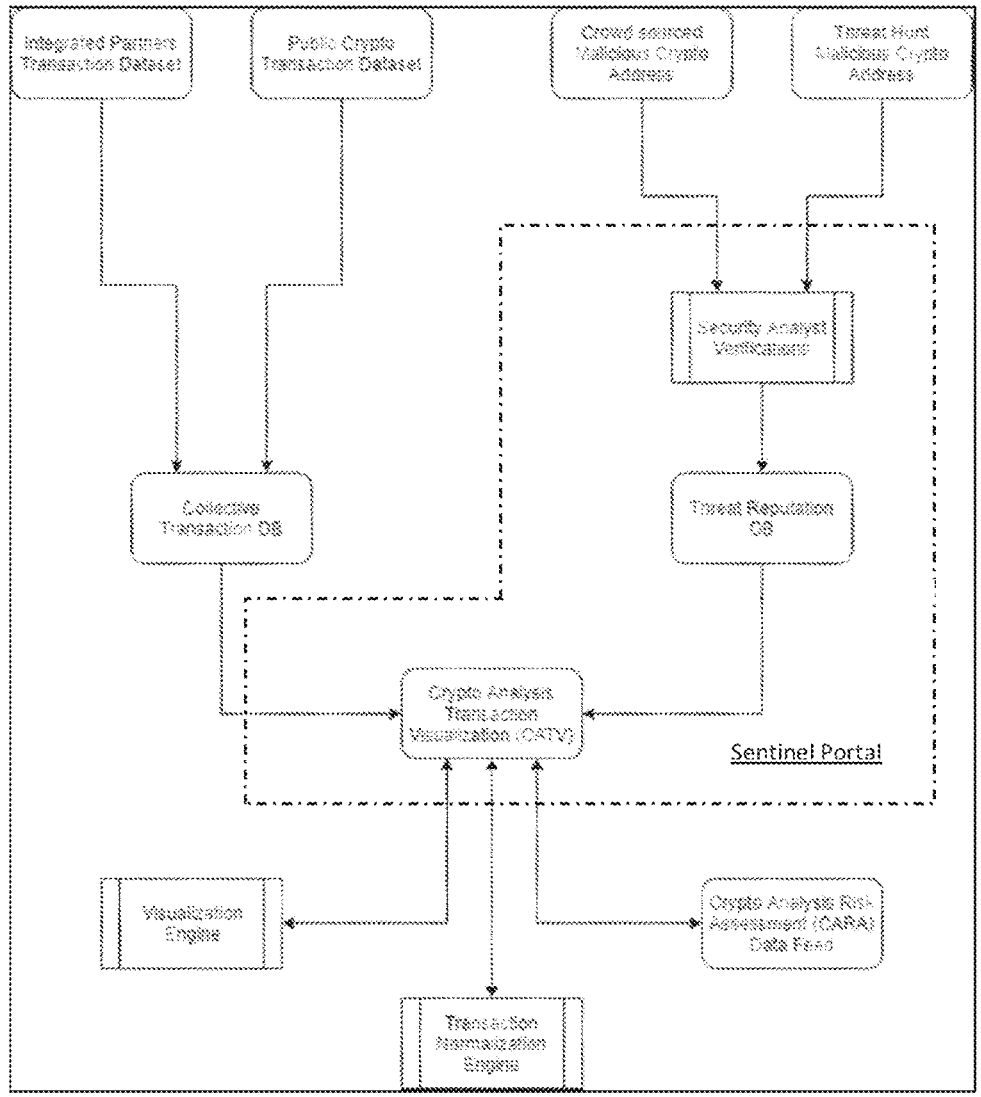
Figure 24: System Architecture of Crypto Analysis Transaction Visualization (CATV) Application hosted on Sentinel Portal (Gateway)
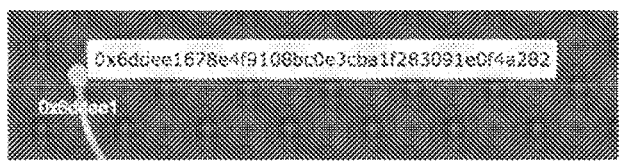
Figure 25: Mouse-over a node shows full address of the node.

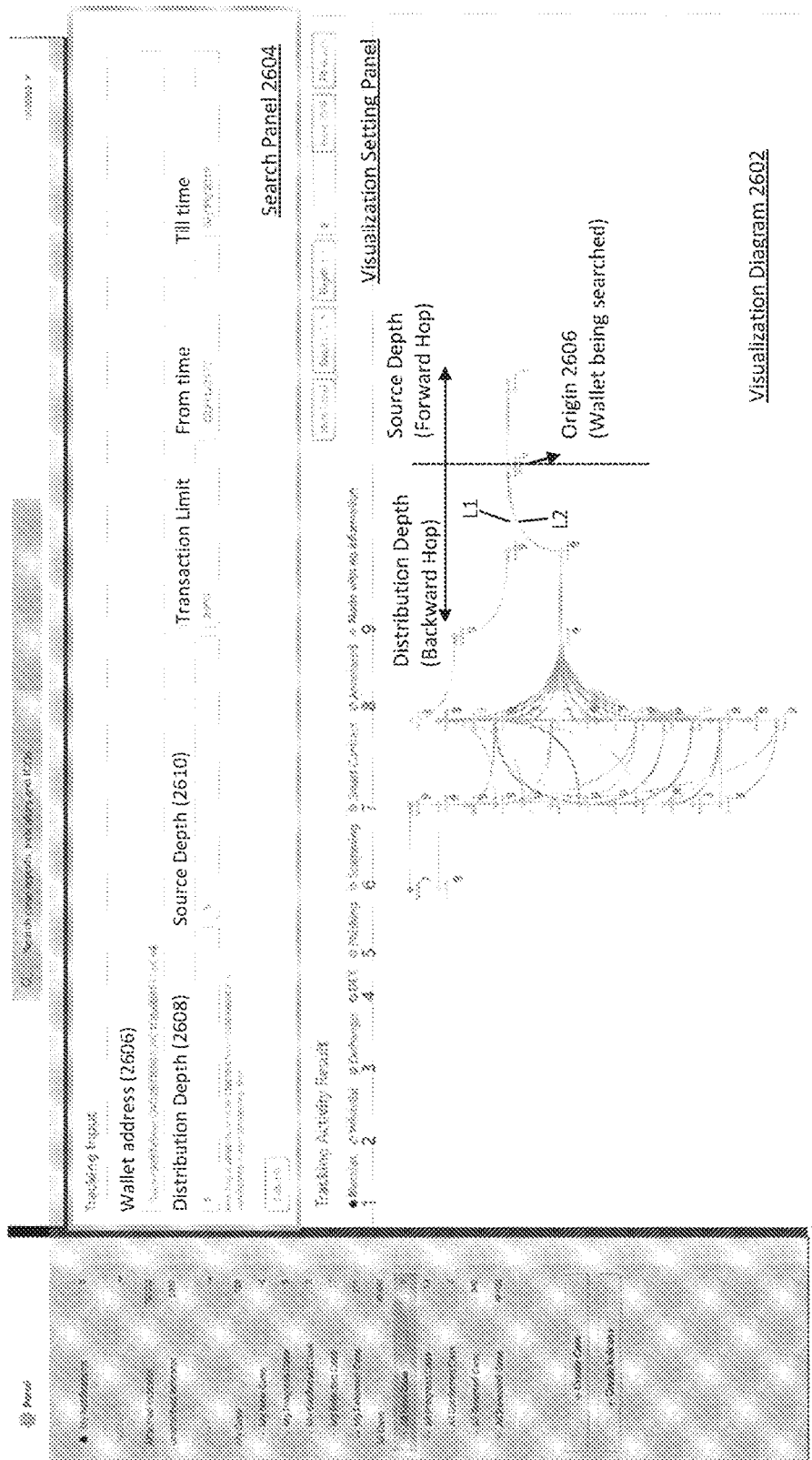
Figure 26: Visualization flow of transactions of a crypto wallet address being searched.

Figure 27: Transaction table showing search results of all nodes involved with a crypto wallet address being searched.

Figure 28: Search panel

Figure 37 (Different Methods Used in Smart Contract)
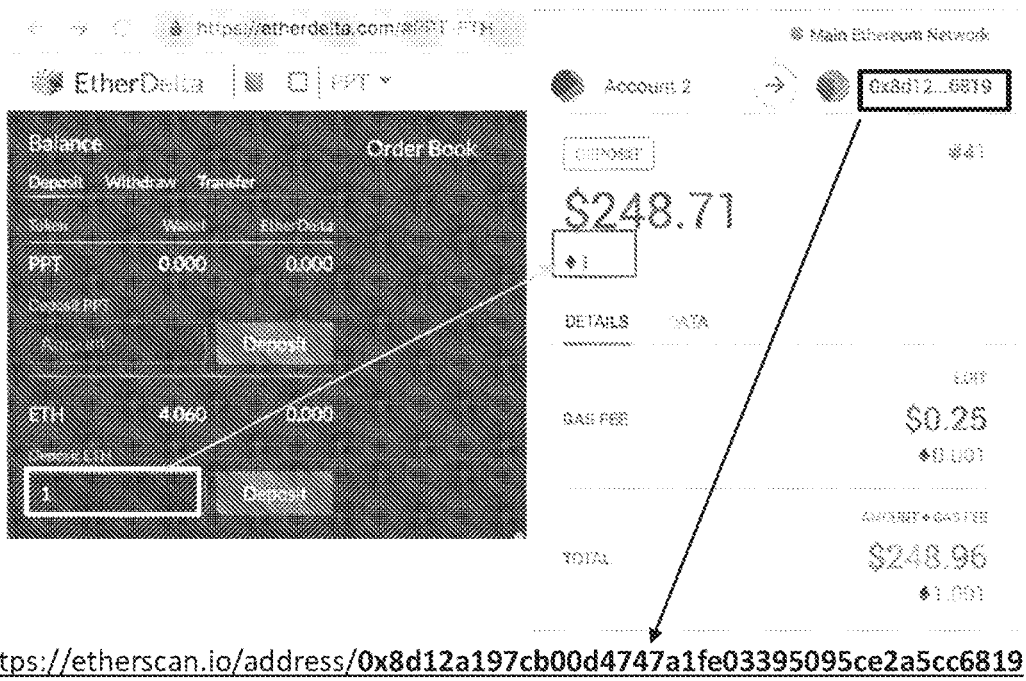
https://etherscan.io/address/0x8d12a197cb00d4747a1fe03395095ce2a5cc6819
Figure 39 (Collection of Smart Contract Address)

| From | | To | Value | |
|---|---|---|---|---|
| t4 | 0xeafa2b5b0ed5e4c... | out | 0x6c839d71cc6916... ~4107 | 0.00651917 Ether |
| t3 | 0xeafa2b5b0ed5e4c... | out | 0x242edd6abb67ec... ~4109 | 0.00859883 Ether |
| t2 | 0xeafa2b5b0ed5e4c... | out | 0xbe7b... ~4111 | 0.004 Ether |
| t1 | 0xdbb9...877ad5... | IN | 0xeafa2b5b0ed5e4c... | 0.02 Ether |

4105 points to t4 From address.

Balance on User Wallet is transferred to a Relay Wallet having an address of 0X6c839d (in short)

These two transfers are used for Withdrawals or Gas Payments for other User Wallets Figure 41A (identification of relay wallet)

| From | | To | Value |
|---|---|---|---|
| 0xced62a78480c... | IN | 0x6c839d71cc6916... ~4107 | 0.006479877945154 Ether |
| 0xbabc39c711cf40... | IN | 0x6c839d71cc6916... | 0.0064817 Ether |
| 0x57dec0db156a09... | IN | 0x6c839d71cc6916... | 0.0064809 Ether |
| 0x7aab1037093627... | IN | 0x6c839d71cc6916... | 0.0064926 Ether |
| 0xa7184c5fd78017... | IN | 0x6c839d71cc6916... | 0.006499 Ether |

Figure 41B (identification of user wallet)

| From | | To | Value |
|---|---|---|---|
| 0x242edd6abb67ec... | out | 0x866c09a678d994... | 0.00817883 Ether |
| 0xeafa2b5b0ed5e4c... ~4105 | IN | 0x242edd6abb67ec... ~4109 | 0.00859883 Ether |

Figure 42A (identification of withdrawal relay wallet)

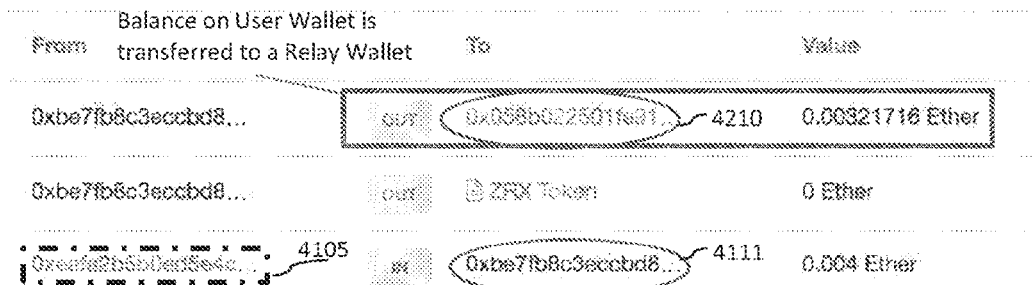
Figure 42B (identification of other relay wallet)
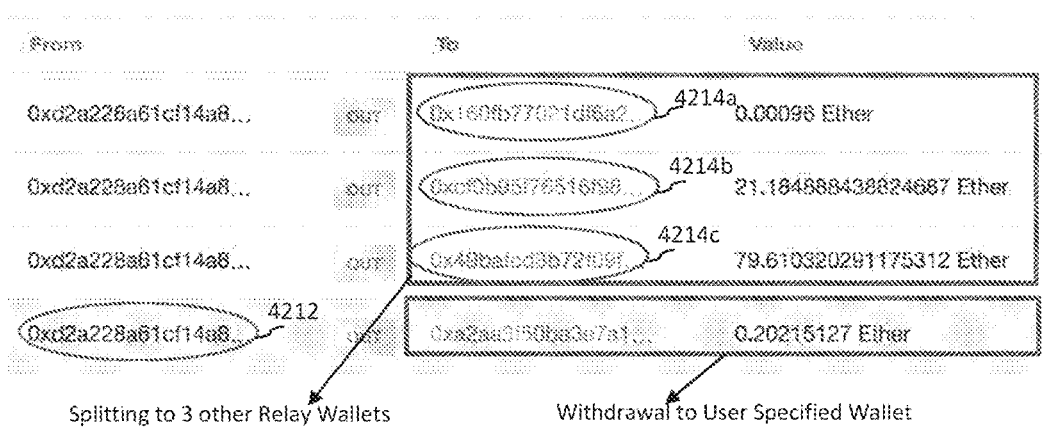
Figure 42C (DEX: splitting to 3 relay wallets)
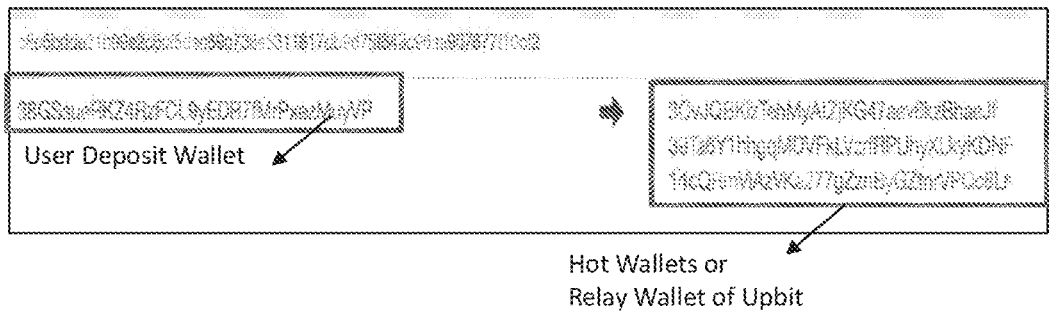
Figure 42D (Upbit Example)

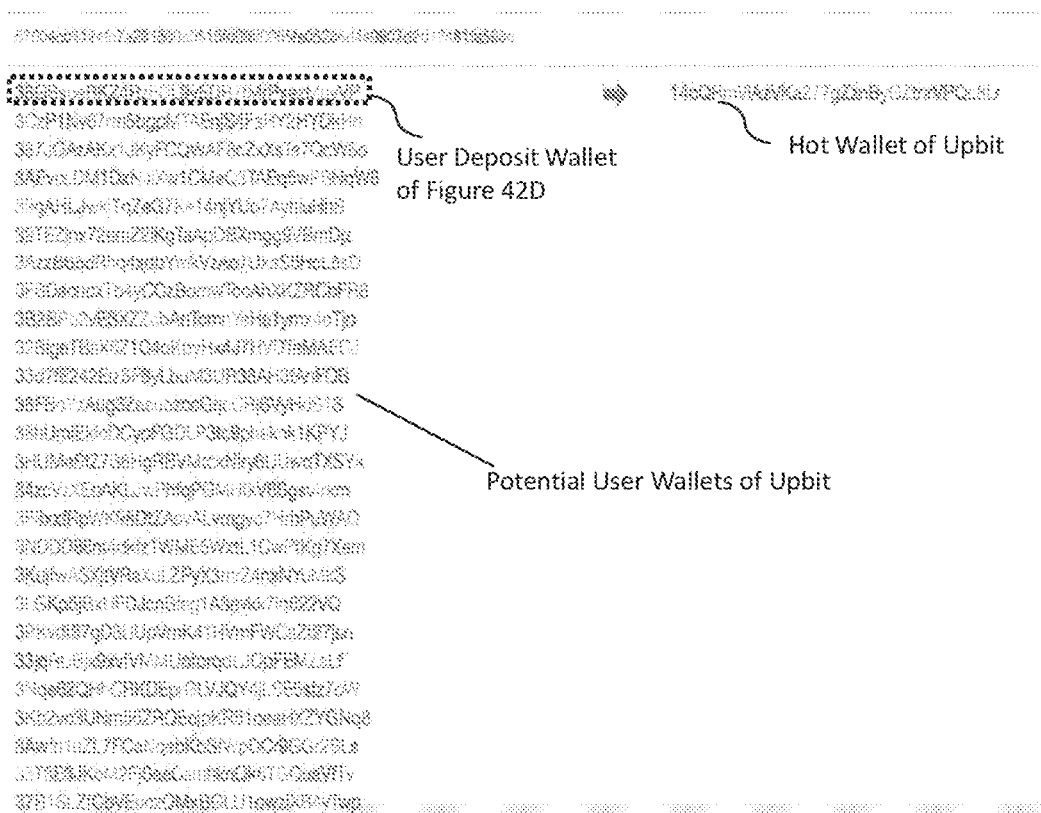
Figure 42H (Continuation of Figure 42D)

Figure 47 (Main menu of wallet crawler system)
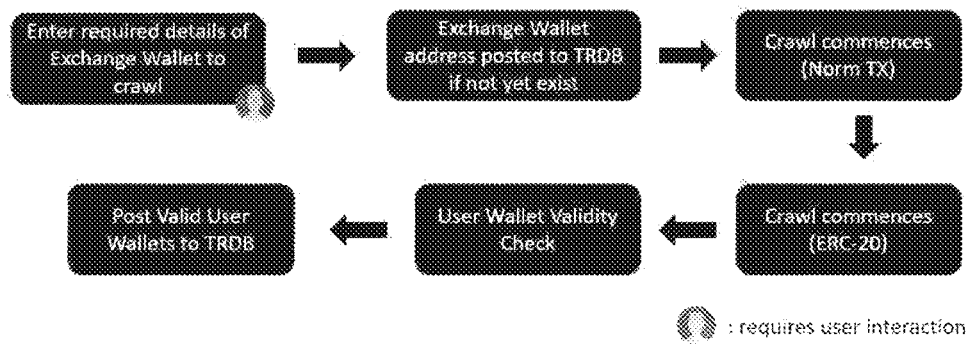
Figure 48

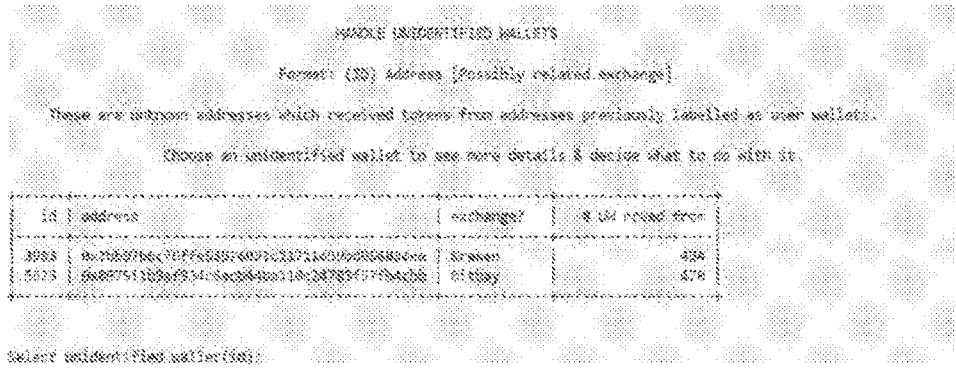
Figure 49A (Handle Unidentified Wallets)
Figure 49B
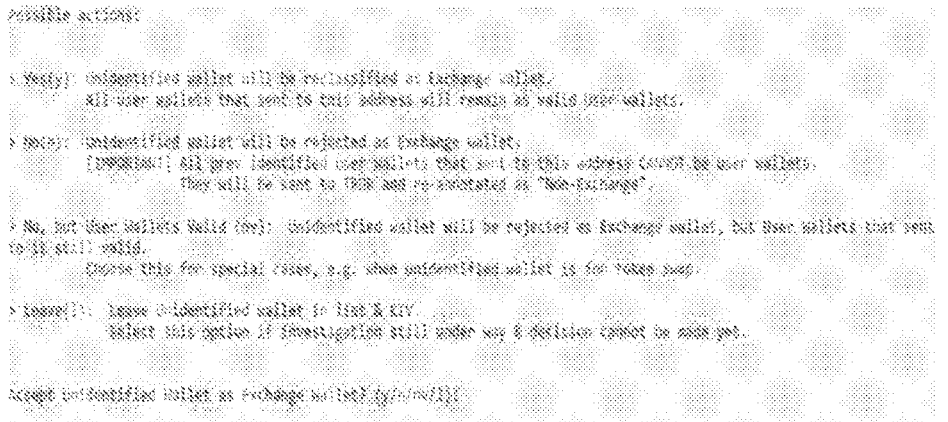
Figure 49C Figure 50 (Example of Spam address -- ElectrifyAsia)

Figure 51 (Example of Spam address-- blockwell.ai KYC Casper token)

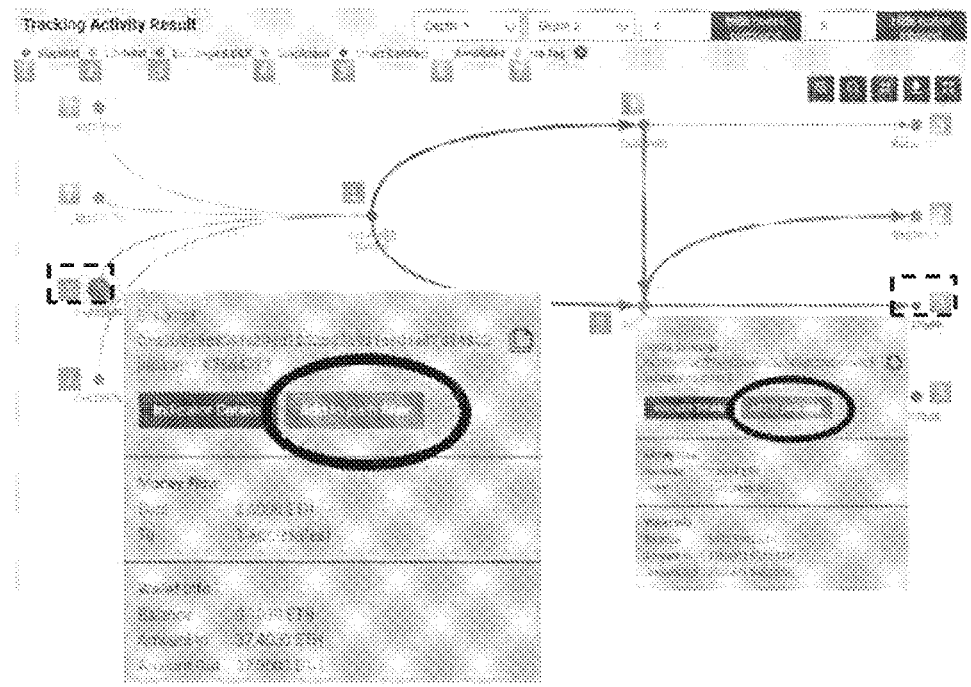
Figure 52 (Before Path filter)
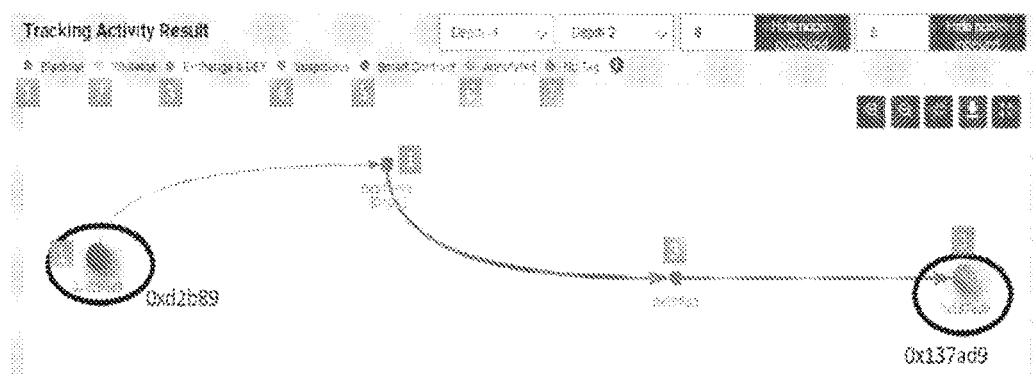
Figure 53 (After Path filter)

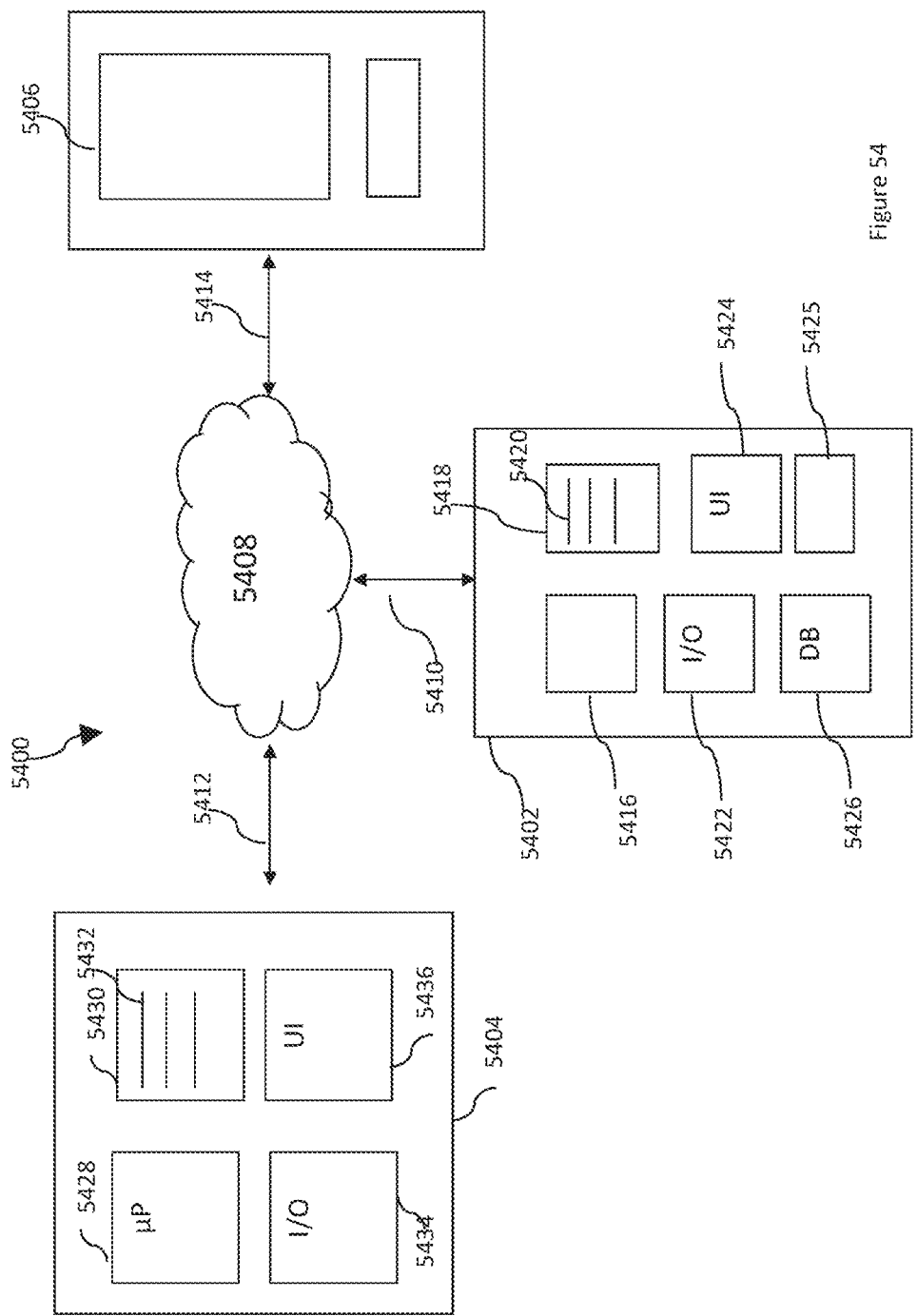

| TYPE | ADDRESS | ANNOTATION | SECURITY CATEGORY | DETAILS |
|---|---|---|---|---|
| ETH | 0xcc2a61901cb2a11e0d33 48b578a3e6e551b1b50e | Bithumb, Exchange | Graylist | |
| ETH | 0xcc2a61901cb2a11e0d33 48b578a3e6e551b1b50e | Bithumb, Exchange, Token | Graylist | |
| ETH | 0x921adfc666a564b299146 4c394c2aa4391 1834b4 | Bithumb, User Wallet | Graylist | Relationship with 0xa6cb6c3f12d03b57c9086c6ecd046d37abed0b7c |
| ETH | 0x6829dcac96d016f40f175 cbdb76b92d6cdfa6240 | Bithumb, User Wallet | Graylist | Relationship with 0xc257274276a4e539741ca11b590b9447b26a8051 Relationship with 0x2140efd7ba31169c69dfff6cdc66c542f0211825 |

Figure 55

APPARATUS AND METHOD FOR CYBERSECURITY

CROSS-REFERENCE TO RELATED APPLICATIONS

This is a national stage application filed under 35 U.S.C. 371 based on International Patent Application No. PCT/SG2019/050653, filed Dec. 31, 2019, which claims priority to Singapore Patent Application No. 10201900481T filed Jan. 18, 2019, Singapore Patent Application No. 10201903000R filed Apr. 3, 2019, and Singapore Patent Application No. 10201909196V filed Oct. 1, 2019 the disclosures of which are incorporated herein by reference in their entireties.

FIELD OF INVENTION

The invention relates to an apparatus and a method for cybersecurity.

BACKGROUND

Rapid development of digital technology in the 21st century has led to the emergence of sophisticated and intelligent threats that hinder further innovation. For instance, the framework of cryptocurrency lies in a decentralized system that promotes autonomy. Such autonomy does not support traceability to an individual and/or an organization that may hack into a decentralized system and steal information and/or digital currency, and thus punitive damages cannot be imposed on such wrongdoer. It should also be appreciated that these unlawful transactions are recorded permanently in a block chain and are irreversible. As the decentralized cryptocurrency system lacks a threat-defense system, the burden for instilling security of a transaction in the decentralised cryptocurrency system has thus far been placed upon the shoulders of individuals and corporations.

While corporate users have access to a wider arsenal of security solutions and professionals and/or more sophisticated security solutions and professionals, individual end-users have far fewer resources to defend themselves. The situation is exacerbated by using poor quality security software and/or inferior hardware or a lack of technical knowledge and expertise.

There are at least three fundamental security issues faced by an average cryptocurrency user. Firstly, these ordinary users are extremely vulnerable to system hacks. In addition, while these users can be easily identified as potential targets, it is challenging to identify the attackers. As a result, these ordinary users have to bear all the risks hackers could potentially inflict upon them.

Decentralization, the core ideology underlying cryptocurrency technology, simultaneously encourages innovation and breeds anxiety as both thrive on autonomy. Autonomy based on anonymity imposes great responsibility on the system. In reality, the rising number of cybercrime is evidence that such autonomy comes at a cost. There is further cause for concern in the absence of a defense structure to protect against exploitations of the system Furthermore, the rapid evolution of blockchain technology is accompanied by the development of various scams and cybercrimes. For instance, there exists ransomware, a new type of malicious software that takes the user's data hostage and demands monetary compensation in bitcoin in exchange for the release of the user's data. It is expected that the ransomware "market" will expand to $17.36 billion by 2021.

Another example of cybercrime is phishing attacks. Such phishing attacks are more and more prevalent as more and more individuals and/or organizations have at least one email address. Phishing emails, in which malicious macros are inserted into attached document files such *.doc, *.xls, *.ppt, etc., can infect a user and cause great damage when he or she opens the infected document file or clicks on attached malicious links. For instance, a major Korean cryptocurrency exchange, Bithumb, was hacked in July 2017, and the confidential information of 31,000 customers and companies were stolen because an infected file was opened. To date, the perpetrator of this phishing attack has yet to be identified.

Phishing attacks are also not limited to email. In the case of telephone phishing, there are also a variety of fraudulent methods that have succeeded in the deceit of many individuals into disclosing their personal information to a criminal pretending to be an operator of a cryptocurrency exchange. For example, a hacker may claim to be an administrator, and request personal information of a user to reset the password of his or his account that has been hacked. The hacker then gains access to the user's account.

There is yet another example of cybercrime that is related to bitcoin-related hacking. This cybercrime can occur during the Initial Coin Offerings (ICOs), where by creating a fake ICO fundraising site and giving false information, hackers can replace the wallet address designated to receive the ICO funds and replace it with their own.

In another example, the DAO (Decentralised Autonomous Organization) incident in 2016 exposed about 15% of the total supply of Ethereum to hackers due to attacks on code vulnerabilities. Tens of thousands of investors suffered financial loss as a result. A "hard fork" had to be implemented to mitigate loss of the DAO incident, and such implementation violated the fundamental characteristic of blockchain immutability. The hard fork is a rule change on a block chain such that the software validating according to the old rules will see the blocks produced according to the new rules as invalid. In case of a hard fork, all nodes meant to work in accordance with the new rules need to upgrade their software.

One of the reasons why these cybercrimes occur is because victims are rather easy to target due to the open nature of the internet. The ideology of decentralization is central to both cryptocurrency and the internet, but autonomy in openness is subject to individual responsibility.

In summary, there are risks that are associated with a decentralized cryptocurrency system, and the inherent vulnerabilities embedded in an autonomous environment is highly dependent on the alertness of an individual.

SUMMARY

Aspects of examples of the present disclosure are provided in the independent claims. Some optional features of examples of the present disclosure are defined in the dependent claims.

BRIEF DESCRIPTION OF DRAWINGS

In some of the drawings, similar elements are denoted by similar reference numerals in different figures. Embodiments of the invention will be better understood and readily apparent to one skilled in the art from the following written description, by way of example only and in conjunction with the drawings, in which:

FIG. 24 shows a system architecture framework of a Crypto Analysis Transaction Visualization (CATV) application according to an example of the present disclosure.

FIG. 25 shows an example of a label that appears if a user mouse-over or clicks on a node of a visualization diagram generated by the CATV application.

FIG. 26 shows an example of a visualization diagram generated by a visualization engine of the CATV application.

FIG. 27 shows a transaction table generated by a transaction engine according to an example of the present disclosure.

FIG. 28 shows a search panel used to enter search parameters for generating a visualization diagram.

FIG. 37 illustrates 3 basic functions (Deposit, Trading, Withdrawal) used in relation to a decentralised exchange (DEX) according to an example of the present disclosure.

FIG. 39 illustrates an example on how a smart contract address can be collected and used for further analysis according to an example of the present disclosure.

FIG. 41A illustrates how a relay wallet of a centralised exchange (having decentralised wallets) can be identified according to an example of the present disclosure.

FIG. 41B illustrates how the identified relay wallet of FIG. 41A can be used to identify additional user wallets according to an example of the present disclosure.

FIG. 42A illustrates how a withdrawal relay wallet can be identified in the example of FIG. 41A according to an example of the present disclosure.

FIG. 42B illustrates how the identified relay wallet of FIG. 41A can be used to identify additional relay wallets according to an example of the present disclosure.

FIG. 42C is an example showing how a relay wallet, after a withdrawal was made, is split into three other relay wallets according to an example of the present disclosure.

FIG. 42D illustrates how a user deposit wallet of Upbit exchange can be used to identify more hot wallets or relay wallets of Upbit exchange according to an example of the present disclosure.

FIG. 42H illustrates how a hot wallet of Upbit exchange can be used to identify more relay wallets of Upbit exchange according to an example of the present disclosure.

FIG. 47 is an example of a main menu (Graphical user interface) of wallet crawler system according to an example of the present disclosure.

FIG. 48 is a flow chart on how the wallet crawler system is configured to determine and/or validate user wallet from an exchange wallet address according to an example of the present disclosure.

FIG. 49A to 49C illustrate a user wallet validity check process from FIG. 48, and how unidentified wallets can be handled according to an example of the present disclosure.

FIG. 50 is an example of Spam address identified through a block chain explorer application according to an example of the present disclosure.

FIG. 51 is another example of Spam address identified through block chain explorer application according to an example of the present disclosure.

FIGS. 52 and 53 shows how a filter path function in the CATV application can highlight the path between two nodes of a virtualization diagram according to an example of the present disclosure.

FIG. 54 is an example of SIPB between an apparatus for managing the threat reputation database, a Sentinel device owned by a Sentinel and a user device owned by an individual utilizing the Sentinel Protocol according to an example of the present disclosure.

FIG. 55 is an example of data stored in a wallet crawler annotation database (WCDB) according to an example of the present disclosure.

DETAILED DESCRIPTION

Figure 1:
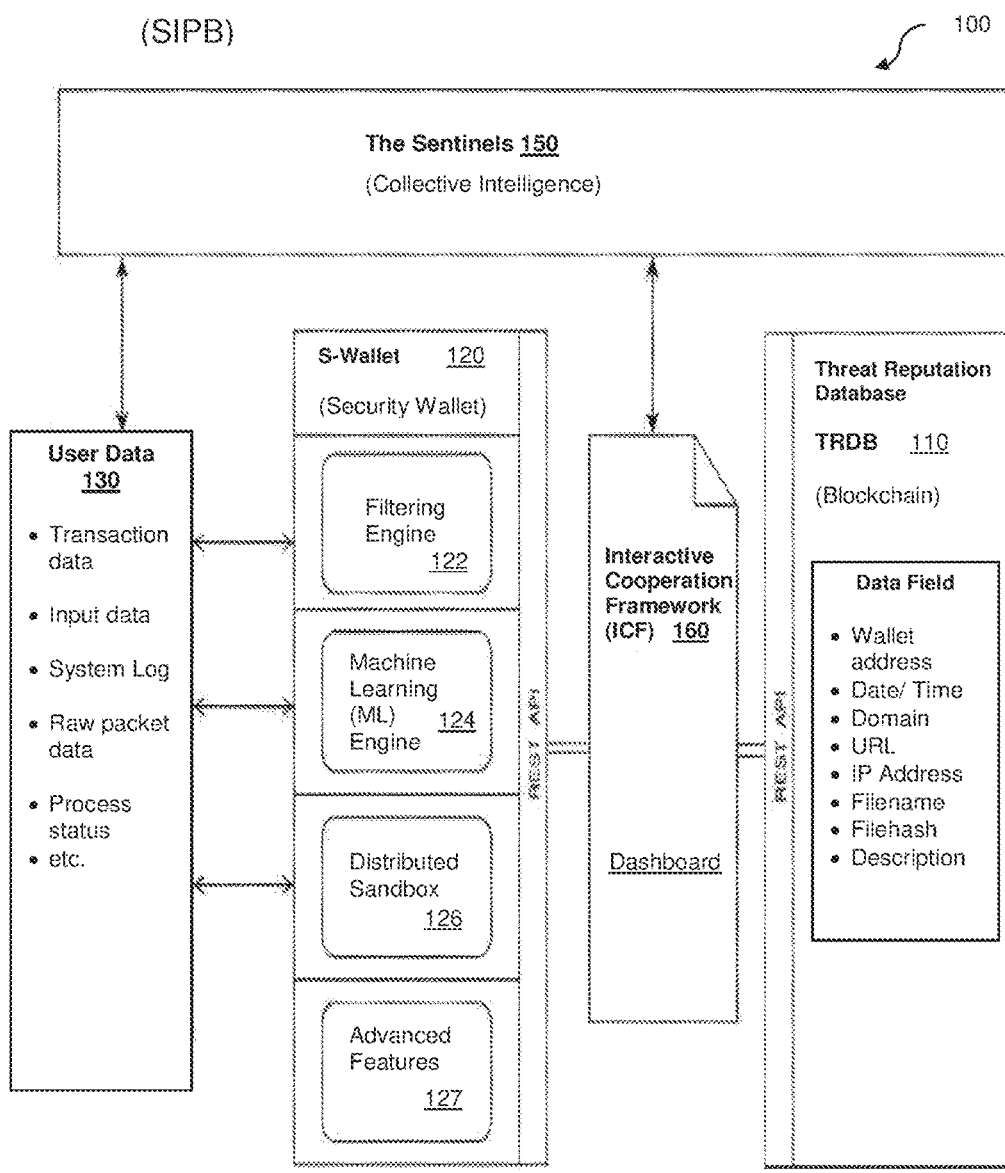
FIG. 1 shows one example of the technology architecture that is used for a proposed Sentinel Protocol, in accordance with an example of the present disclosure.

Cybersecurity is a concern in today's world and cybercrimes can seriously impact an individual and/or an organization. This impact may increase with the prevalence of Blockchain technology.

Blockchain technology, in a broad sense, relates to a complete peer-to-peer system that does not require the control of a central agency. Instead, a transaction that employs block chain technology (for example, remittance of digital currency such as Bitcoin, Ethereum and the like) is completed using a consensus algorithm within a trust-less network. In a settlement process of a Block chain transaction, the governing rule is that all records are shared and published for anyone to view and/or verify. However, this may cause some implementation difficulties in commercialization of financial products because information disclosure of sensitive personal property cannot be separated from technical aspects of the transaction. Without a guarantee of real identity, users may be unwilling to take part in a variety of financial services unless the governing rules and regulations become more stringent. One proposed solution is to the use of consortium blockchain, which does not exploit the full potential of public decentralization. Moreover, it is questionable whether full disclosure of such information would exploit all the advantages of decentralization.

The inventors of the present disclosure are of the view that if a blockchain-based reputation system and information related to current cybercrimes can be shared within a blockchain distributed policy, the decentralized blockchain system would be more robust to security threats.

However, manipulation and destruction of information related to detected cybercrimes can be rather challenging. When an individual or group with malicious intent manipulates the reputation of an organization or system or hacks a blockchain-based system to manipulate its recorded reputation, the latter case can be resolved by the advantage of the data integrity of the blockchain.

However, in a reputation system scoring the quality of information rather than a transaction, an attack such as a Sybil attack cannot be easily defeated by the basic characteristics of the blockchain, due to the subjective nature of the pre-manipulated information which allows it to be recorded, despite the transaction reputation.

Such drawback can be mitigated through collective intelligence. The following paragraphs are directed to an example of a proposed apparatus and method for cybersecurity.

According to the proposed apparatus and method for cybersecurity, there is provided a method and an apparatus to overcome the disadvantage(s) of decentralization by turning its characteristics into an advantage for security. This method is governed by a Sentinel Protocol and the apparatus may comprise a memory and a processing unit (e.g. computer, processor etc.) configured to execute instructions in the memory to operate the apparatus to execute certain steps of the method. By utilizing a collective intelligence system created by harnessing the advantages of decentralization, the Sentinel Protocol is adapted to combine cryptographic functions and intelligence-based threat analysis algorithms to create a secure, innovative ecosystem. Note that the term "Sentinel Protocol" used herein also refers to a system or, specifically, a decentralized system that includes the apparatus and such decentralized system uses the method governed by the Sentinel Protocol and may make use of artificial intelligence. For simplicity, the terms "Sentinel Protocol" and "Security and Intelligence Platform for Block chain" (SIPB) are herein interchangeably used. However, for clarification, the Sentinel Protocol is directed to software components, while SIPB can encompass both hardware and software components, including the Sentinel Protocol). The apparatus described earlier may be a node in a plurality of nodes in the Sentinel Protocol system or an apparatus comprising or operating more than one node. Details of the Sentinel Protocol, its associated method, apparatus, and/or system would be provided below.

Through the Sentinel Protocol, the public can report malicious activities such as Phishing Domains, Wallet Addresses, Malicious Social Media URLs in to the SIPB and each reported case would be evaluated by a Sentinel (Crowdsource Cybersecurity Expert). The Sentinel may be a system administrator. The Sentinel Protocol may incorporate features of the Blockchain. The Sentinel may be a user of a node in a Blockchain network. The Sentinel may register itself as a Sentinel in the Blockchain network, or may be selected/voted by the Blockchain network, to undertake the validation/evaluation of the reported case. Each validation/evaluation may be a transaction in the Blockchain network. A node in a Blockchain network may refer to a computer, terminal or device operated by the user. More details on the Sentinel will be provided later.

The data validated/evaluated by the Sentinel may be stored as a data block in the Blockchain network. For instance, the validated/evaluated data may be stored in a Threat Reputation Database. Such Threat Reputation Database may be committed on a Blockchain, for instance, an EOS Blockchain. An example on the EOS Block chain is https://eosflare.io/account/eosioupptrdb. In one example, the threat reputation database may support threat data comprising Crypto Wallet Addresses, Domains, Hostnames, IP addresses, URLs and the like.

The term "Uppsala Security" used herein refers to an organization that is engaged to implement and/or market the Sentinel Protocol. This term should not be read as a technical term.

Resolving the discussed security loopholes of a decentralised system is the responsibility of the entire cryptocurrency community; and thus, individual attempts to address the issues will be inadequate and ineffective. Collective intelligence can be harnessed to create a decentralized cybersecurity ecosystem that protects the interests of the general public.

According to the proposed apparatus and method for cybersecurity, there is provided a decentralized artificial intelligence system configured to detect unidentified attack patterns of attacker(s), disseminate the detected information throughout the ecosystem, and protect all members of the decentralized artificial intelligence system through collective intelligence, while maintaining the fundamental principle of autonomy. Details on the decentralised artificial intelligence system and Sentinel Protocol would be discussed later in the present disclosure.

Collective Intelligence

The term "collective intelligence" used herein covers using information reported by users of a decentralised system to authenticate a field of an online transaction (e.g. blockchain transaction), such as wallet address, URLs, host names, IP addresses, domains and the like. These users cover administrators of cryptocurrency exchanges, users performing cryptocurrency exchanges, and/or security experts (also known as security vendors) that may be incentivised to share their technical knowledge to identify unsecured links or threats to the block chain. In one example, individuals or institutions that have been thoroughly verified, qualified, and certified by a panel of experts will be authorized to update the results of the investigation in the blockchain.

By combining information related to cybercrimes with the blockchain, many copycat crimes can be prevented and/or or identified quickly due to the shared economic principles of the data. This implementation completes the cybercrime investigation framework and brings awareness to potential security threats. For example, it is conceptually possible for cyber-criminals targeting cryptocurrency to access users' personal information (despite the autonomy nature of a decentralised system).

Blockchain is essentially a system that shares information transparently because all transactions are recorded in a distributed ledger and can be verified by anyone without special permission. This means that it is possible to trace any of these transactions. This means that the flow of cryptocurrency transactions that has been hijacked by cybercrime is easily traceable.

However, it is possible to escape traceability by money laundering through cryptocurrency exchanges and coin shift systems. The cash value of the cryptocurrency is lost if it is not exchanged for money. A vicious cycle occurs as there is an exchange. The same applies to autonomous transaction coins, such as Dash, Zcash, and Monero, that hide transaction information, as eventually an exchange is needed to cash out in order to enhance traceability through the Interactive Cooperative Framework associated with transaction analysis projects such as BlockSci.

While it is not impossible for cryptocurrency exchanges to cooperate to fight cybercrime, cryptocurrency exchanges also strive to protect privacy of the users in accordance with strict regulations. Most cryptocurrency exchanges are required to agree that they cannot cooperate without the consent of the police or government investigative agencies in order to meet the basic obligation to protect the confidentiality of their users. However, cryptocurrency regulation is different amongst countries around the world, and it is difficult to receive help from experts who have expertise in cryptocurrency in local investigative agencies. In addition, most countries do not treat cryptocurrency-related cybercrimes as a real financial crime. This means that people who are not protected by the legal system are the ones bearing the risks of financial loss.

A blockchain that contains information regarding all the existing, occurring, and suspicious cybercrimes in an immutable database can support a decentralized investigation system. All information can be made instantly transparent to the individuals, exchanges, projects, security firms, governments, etc.; most importantly, the information can be tracked by all around the world within one system.

Therefore, a reputation system built on collective intelligence offers the advantage of simplicity. This means that exchanges can refer to the reputation system and take the proactive action without the need for complex legal evidence that adds to the burden of users. This can prevent and control the many cybercrimes that occur within the cryptocurrency industry.

In addition to harnessing collective intelligence, artificial intelligence (for instance, through machine learning, deep learning) may be employed to identify potential security threats.

Artificial Intelligence

The mechanism of artificial intelligence is simply to model a large quantity of good quality data using an optimized algorithm. Attackers often employ intelligent use of an unexpected number of attacks to exploit system vulnerabilities over long period(s) of time when targeting an individual, group, government, business, or organization. Thereafter, a command and control communication channel is established with the hacker's external command tower. It would be difficult to grasp the behavior of an attacker who has already successfully entered an internal network after the communication channel is established with the hacker's external command tower. This is because existing security technologies do not have the capability to doubt the behavior of a seemingly legitimate entity in making an exact binary representation of an attack as a signature. For this reason, many attacks are perceived by the targeted individual and/or organization as normal users' daily patterns.

Therefore, a decentralized artificial intelligence system (local machine learning engine) may be provided and configured to keep track of changes in behaviours of a user (instead of appearances, i.e. digital signatures, and the like). Likewise, by comparing the correlation of changes in minor behaviours rather than the changes in appearance, the decentralized artificial intelligence system can be configured to recognize the empirical risks in advance, and provide a high probability of fraud prevention.

FIG. 1 shows one example of the technology architecture that is used to keep track of changes in behaviours of a user.

The decentralized system 100 provides a security intelligence platform for blockchain and comprises the following components:
- S-Wallet: Integrated security wallet 120
- User Data 130 that comprises user input 130a, transaction data 130b, system logs 130c, and packet data 130d
- Filtering Engine 122: Cryptocurrency address filtering, scam related domain, and file filtering
- Machine Learning Engine 124: Local machine learning engine for behaviour analysis as discussed above
- Distributed Sandbox 126: Distributed malware analysis sandbox
    - Threat Reputation DB 110: Intelligence Database (DB) on a block chain containing cybercrime information- Plugin Features: In future, more enhanced security functions 127 will be added, such as VPN, Integrated with third party cryptocurrency wallet
- The Sentinels 150: Certified and qualified collective intelligence group and individuals
- Interactive Cooperation Framework (ICF) 160: Also known as Sentinel Portal, which is a dashboard for the Sentinels and public user activities such as root cause analysis, incident response, and statistics of worldwide activities The following paragraphs describe two examples how the Sentinel Protocol and/or security intelligence platform for blockchain 100 can be used to combine the blockchain technology and artificial intelligence together.

In the first example, the decentralized artificial intelligence system 100 provides a machine learning-based blockchain security client wallet (also known as S-wallet 120, and its details will be discussed in detail later) that collects a user's or node's information and creates model behaviours of all the aspects, such as normal activities of your computer usage patterns, including transaction patterns. When a suspicious behaviour occurs, the security wallet 120 recognizes the probability of threat, and blocks the execution of the process. Detailed information is reported to the collective intelligence group 150, and shared with the reputation system 100. All information is shared through an API (Application Programming Interface) to everyone who would like to use it, and it can be extended to become the most accurate and secure global intelligence system in the world.

In the second example, a Fraud Detection System (FDS) is constructed using data from the blockchain. Essentially, Sentinel Protocol's anomaly detection is associated with a consensus system reached by a group of Sentinels. The Sentinels 150 may be a group of individuals who are certified by a majority of experts (or initially by the Token Vendor and/or its affiliate(s) ("Uppsala Security") during the early stages of SIPB (Security Intelligence Platform for Blockchain) to act as an "International Cybercrime Police Force". It is possible that a Sentinel may be replaced by a machine (e.g. A.I. System) and the work to be done by the Sentinel is automated by the machine. The Sentinels 150 are responsible for research and analysis, and have special authority to update their reputation system. They receive rewards for their work through Sentinel Protocol's shared economy system, which will be described later. To prevent insider threats, the Fraud Detection System (FDS) is installed to monitor and detect abnormal behaviour for collective intelligence as well as ordinary users' abnormal transactions. Similar to conventional banking transaction monitoring system, digital asset FDS can be deployed in cryptocurrency transactions which taps on information gathered and processed by SIPB. In another example, the techniques described in the above-mentioned examples can be employed in combination. Through collective intelligence, security information can be shared and/or validated among the users of the Blockchain and/or the Sentinels and are subsequently stored in a database for use.

Security Features

The Security Intelligence Platform for Blockchain (SIPB, or in short, Sentinel Protocol) 100 may have the following unique security features:
- Threat Reputation Database (TRDB) 110
- Machine Learning (ML) Engine Integrated Security Wallet (S-Wallet) 120
- Distributed Malware Analysis Sandbox (D-Sandbox) 126

Sentinel Protocol may provide all the security features (TRDB, ML, D-Sandbox) discussed below, for example, with reference to FIG. 1, through its integrated security wallet (S-wallet) 120. However, each feature can be arranged to enable third-party networking via API. The integrated security wallet 120 is implemented with two functions: Auto Reporting and Manual Reporting, which will be discussed with reference to FIG. 2 in detail later.

Threat Reputation Database (TRDB)

The following paragraphs may make reference to existing prior art in order to highlight the differences with the technology proposed in the present disclosure and the advantages that are associated with such differences.

In an example of the present disclosure, a Threat reputation database (TRDB) 110 is provided to mitigate or eliminate the following problems in the existing cybersecurity industry:

1. Present architecture of the existing cybersecurity industry comprises at least one centralized database; configured for storing threat information for authentication or checks by a plurality of users who would make reference to the centralised server. Such a centralized database is vulnerable to information manipulation and abuse. The database becomes an obvious target of Sybil attacks, or server hacks and service interruptions. For instance, in October 2017, for example, Russian state hackers stole National Security Agency materials using the well-known antivirus company, Kaspersky's, antivirus software. Ironically in this incident, hackers used the security tools provided by Kaspersky to find vulnerabilities of the target. In contrast, the decentralized nature of a blockchain (proposed for an example of the present disclosure) can mitigate this problem as its data immutability makes it difficult for hacker to tamper with the data. This increases the security stability of the server that provides the data.

2. There is a lack of shared knowledge among security vendors. The greater the collected risk information, the higher the chance of preventing cybercrimes. However, in the present state of the art, each security vendor compiles threat information on its own with a 'winner-takes-it-all' attitude. There is simply no incentive for vendors or users to collaborate and create one comprehensive database. Goodwill alone does not scale, so TRDB 110 uses an incentive scheme that encourages Security experts, ordinary users and/or vendors to contribute to the TRDB 110 under a consensus mechanism and feedback from participants, or through Delegated Proof of Stake (DPOS), which will be discussed later. Through collective intelligence, TRDB 110 can efficiently collect hacker's wallet address, malicious URI, phishing address, malware hashes, and prevent a user from accessing such malicious data (such as wallet addresses, phishing addresses, malicious URIs, and malware hashes) and lose valuable data.

In one example, to maintain data integrity in the TRDB 110, the TRDB 110 is configured to be updated solely by security experts 150 in order to eliminate systematic errors such as false positives. General users can also participate by allowing auto reporting of a detected security risk and/or manual reporting of a detected security risk. The more users contribute to the TRDB 110, the more robust it will be to protect individuals and/or organizations from scams and fraud.

In such example, if users allow auto reporting, unknown threats that are automatically detected from a machine learning-based security wallet 120 (to be discussed later) are recorded in the TRDB 110. Through manual reporting, an user can report risk information that will be validated by the community (comprising the Sentinels 150). This means that reported data would be subject to review or validation by the Sentinels 150 (and/or systems administrator of the Sentinel Protocol before registering as a data block of a blockchain in the TRDB 110.

TRDB 110 can be provided as an API, so any individual or organization (e.g. cryptocurrency wallet projects, cryptocurrency exchanges, and security vendors) can make use of the information. Alternatively, TRDB 100 can be provided locally to an individual or organization with security updates downloaded into the TRDB 100 at regular intervals or in real time.

Machine Learning (ML) Engine Integrated Security Wallet (S-Wallet)

The following paragraph may make reference to existing prior art in order to highlight the differences in the technology proposed in the present disclosure and the advantages that are associated with such differences.

The Sentinel Protocol provides an S-Wallet 120 having the functionality of antivirus software. A fundamental difference between the S-Wallet 120 and antivirus software in the present state of the art is that the antivirus software in the present state of the art has to be optimized to respond to new threats. This means that the antivirus software has to receive the latest updates via a centralized server for all new known signatures. Such approach may not be efficient to respond to unknown threats such as zero-day attacks. In comparison, the S-wallet 120 is configured to analyze the threat tendency and history to proactively respond to unknown threats or zero-day attacks. This means that S-Wallet 120 does not need signature updates. This unsupervised learning approach is especially effective against threats like ransomware. While S-wallet 120 leverages collective intelligence from the connected TRDB 110, it provides basic blocking services for the following information:

Cryptocurrency Wallet Address Filtering
URL/URI Filtering
Data Filtering
Fraud Detection System (FDS)

It should be appreciated that other than machine learning technology, other viable technology that relates to artificial intelligence (e.g. fuzzy logic, deep learning, and the like) can be used to enable the Fraud Detection System (FDS) on all distributed ledgers and to identify transactions that are reported for misuse or stolen, thereby preventing secondary damage.

In another example, the TRDB 110 can be used without S-wallet 120 and/or be used with other available digital wallets.

Distributed Malware Analysis Sandbox (D-Sandbox)

The following paragraph may make reference to existing prior art in order to highlight the differences in the technology proposed in the present disclosure and the advantages that are associated with such differences.

A sandbox is a security mechanism that can be implemented in the Sentinel Protocol to run untested or unverified programs and code on a separate virtual machine without risking the application or host. Potential threats may be submitted to the D-Sandbox via a ticket system, and all threats will be analyzed using collective intelligence. The sandbox is expected to be more cost effective and use computing power more efficiently. Individual users may contribute to the security ecosystem by provisioning the sandbox through a virtual machine.

D-Sandbox 126 has two outstanding advantages. First, it is significantly cost effective. It improves scaling through distributed systems. The ability of a security appliance with regular sandbox system to run virtual machines is limited. Even expensive security appliances were very limited in their ability to analyze malware this way. Further, a regular sandbox system can be highly unstable as it cannot ensure high capability such as high throughput, high bandwidth or higher-than-expected usage. This often led to system performance degradation and malfunctioning, which not only compromise user experience but may also result in malware infection.

The second advantage is that D-Sandbox 126 can build a better security system in addition to minimizing computing power waste in Proof of Work (PoW). The computing power to generate the hash value can be wasteful. The nodes participating in Sentinel Protocol's network can use their computing power to analyze malware as well. This means that idle resources of the decentralized security system can be utilized where they are needed. Individual users can also help by provisioning the sandbox through a virtual machine, boosting the overall security ecosystem.

Sentinel Protocol Ecosystem

The following describes examples in a Sentinel Protocol ecosystem:

INTERACTIVE COOPERATION FRAMEWORK (ICF, OR SENTINEL PORTAL)

Some crypto exchange platforms lack security expertise from the initial system design to the full operation. Customer service specialists cannot be the cybersecurity specialists though they are playing both roles currently. Sentinel Protocol overcomes this problem by providing an essential framework that is run by trusted cryptocurrency security experts leveraging their collective intelligence. Just by joining the Sentinel Protocol community, crypto users can easily obtain knowledge and assistance on all security issues. They can also deploy security solutions provided by the Sentinel Protocol. Inefficiency costs will be reduced for businesses and individuals alike. This framework will enhance the overall security of the crypto-world and is built on the fundamental principle of decentralization.

Anti-Theft System

While more real-world applications for cryptocurrency are built every day, there is no system to validate the integrity of the crypto assets. This means that stolen crypto assets can be used as a payment for commercial services as long as the hacker splits them through tumbling and mixing. Similar to how the traditional financial system where credit/debit card companies block the use of stolen credit/debit card, Sentinel Protocol will track all the stolen cryptocurrencies and share this information to any crypto service provider. Advantageously, stolen crypto assets detected using the Sentinel Protocol will be prevented from utilization or conversion to fiat money. This means that the Sentinel Protocol allow cryptocurrency to enjoy similar protection as regular fiat currency under regulatory constraints.

Malformed Transaction Prevention

Addresses registered as scams, and all derived addresses, can be shared within Sentinel Protocol community in real time (because of the nature of blockchain). As long as Sentinel Protocol is applied, further spread of damage can be prevented. One of the applicable uses is during Initial Coin Offerings (ICO), where thousands of people are involved for a short period of time and addresses could be tampered. When the Sentinel Protocol is in operation and a hacker changes an address, all users are automatically notified of the original address and the newly changed address. Advantageously, the Sentinel Protocol provides a systematic method to notify all users of the Sentinel Protocol of a cyber-attack and to stop malicious transactions that are associated with the identified domains/IP addresses/wallets.

Example 1

Unidentified Threat Prevention

Hacker Malloy uploads a software into a well-known cryptocurrency online community. He created this software such that it would be undetectable by reputable threat-checking websites such as VirusTotal or anti-virus programs. Dozens of community users, including Alice, download what they thought was a regular mining software. (Unfortunately, most users do not know how to check the integrity of an original file via md5, sha, etc.). Once Malloy notices that his mining software (backdoor) is downloaded, he replaces it with the clean, normal file. By then, the user account will have already been compromised and all the information will have been collected and stolen by Malloy using the mining software (backdoor). The compromised and/or stolen information may comprise both the passphrase of the private key of the wallet and the credential of the cryptocurrency exchange. However, it is difficult to ascertain how the system was compromised, as Alice—an ordinary user—does not have any of the necessary investigative skills or tools to investigate this cybercrime.

In comparison, an online community user, Bob, who uses the Sentinel Protocol's S-Wallet 120 and downloads the same corrupted mining software will not have his information stolen and/or compromised. After downloading the corrupted mining software, the machine learning engine 124 within S-Wallet 120 detects that the downloaded file is highly suspicious. The machine learning engine 124 blocks the execution of the downloaded file, even if the file has not been labeled as known attack and/or even if the file had not been detected by any antivirus software thus far. As soon as the file execution is blocked, corresponding information is automatically submitted to Sentinel Protocol. Then, the Sentinels 150, the group of trusted security experts, analyzes the root cause of the threat. This analyzed information is registered in the Threat Reputation Database (TRDB) 110 and also reported to the online community where the file was originally found. Through more detailed analysis of the timestamp and the uploader, Malloy is identified as the hacker. Meanwhile, Malloy realizes that he cannot distribute his mining software elsewhere, since real-time defense systems of the Sentinel Protocol database is employed everywhere.

Example 2

Transaction Traceability

Hacker Malloy has a wallet of stolen coins that he hacked from many people. Prior to cashing them in, he distributes coins on a number of sub-addresses (through tumbling and mixing) to avoid tracing. This is possible due to the nature of the cryptocurrency wallets. Alice is one of Malloy's victims. As soon as Alice finds out her coins are stolen, she reports it to Sentinel Protocol 100. The Sentinels 150 confirm the incident, and register the case information into the Threat Reputation Database (TRDB) 110. Sentinel Protocol 100 will automatically track all sub-addresses derived from the original addresses registered. This will be shared to all crypto services including the exchanges that have integrated Sentinel Protocol 100. If Malloy tries to convert his coins, the exchange system that has already been notified receives a high priority alarm, and it will cut off any chance for hacker Malloy will not be able to use the coins he stole.

It will not be easy for Alice to have the coins back, since current judicial systems in different countries are not consistent across borders. Alice starts to actively promote her case and the advantage of using Sentinel Protocol in the hope of Sentinel Protocol will have greater presence worldwide. One day, Sentinel Protocol may rise in influence to replace the complex documentation and legal identity verification required by the Interpol to report hacking.

Figure 2:
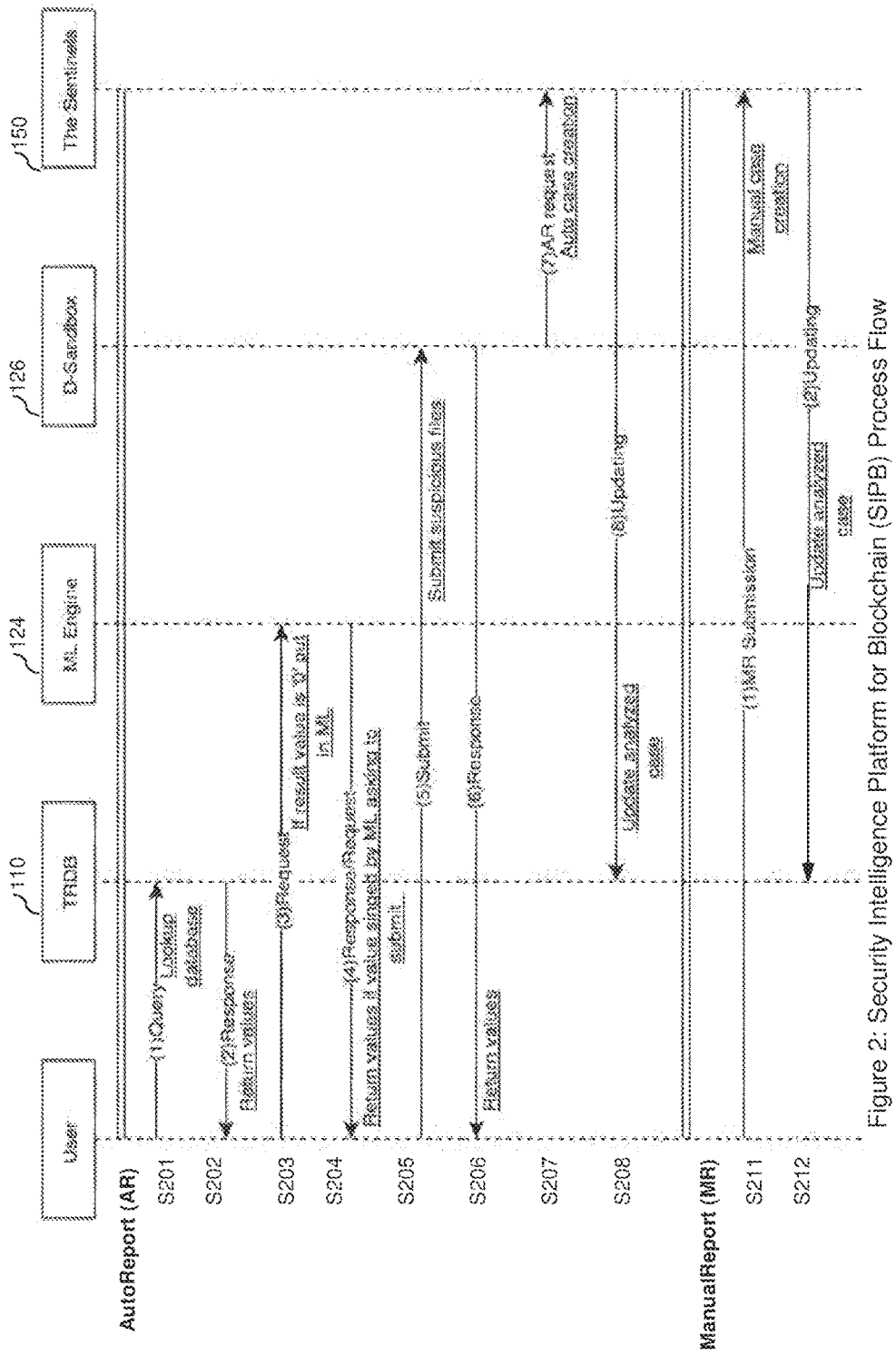
FIG. 2 shows one example of auto reporting and manual reporting implemented for security intelligence platform for blockchain (SIPB), in accordance with an example of the present disclosure.

FIG. 2 shows one example of a process flow for security intelligence platform for blockchain (SIPB) (e.g. 100 in FIG. 1). The process flow illustrates how an ordinary user can use the TRDB (e.g. 110 in FIG. 1), ML Engine (e.g. 124 in FIG. 1), D-Sandbox (e.g. 126 in FIG. 1) to improve cybersecurity through auto-reporting and manual reporting.

If a user has installed on his or her device an S-wallet (which functions as an end point security application and/or a cryptocurrency wallet), the user can invoke Auto reporting (AR) and/or Manual reporting (MR) function. However, if a user did not install on his or her device the S-Wallet, the user can still interact with SIPB through MR. This means that the SIPB is not limited to its use exclusively with S-wallet.

In the process flow, if a domain, url, cryptocurrency wallet address, file download, etc., are attempted through a link or redirection during monitoring of a security wallet (not limited to S-wallet), one of the following may occur:

Auto Report (AR)

The auto report function is an intelligence framework to optimize the analysis of unknown threat.

With reference to FIG. 2, the following steps are performed during the AR process:

1. Query (S201): A user send a request to the Threat DB (i.e. TRDB) 110 to research potential scam/harm of reported information. The reported information is automatically retrieved from user data 130, and can be in the form of a domain, url, cryptocurrency wallet address or file downloaded through a URL.

2. Response from TRDB (S202): In response to the query in S201, the Threat DB 110 provides data field of information that has been registered in the TRDB. For instance, the returned data may indicate whether the reported domain, URL, cryptocurrency wallet address of file downloaded has been recorded in the TRDB (e.g. whitelist, blacklist, greylist). In this example, a value of "0" indicates that the reported information has not been recorded in TRDB, and further investigation is required. This means that if the value "0" is received at S202, the process then proceeds to S203.

3. Request to ML Engine (S203): If the queried address is identified as scam/harm (i.e. a blacklist in TRDB), it will be blocked according to the Sentinel Protocol. Even if the queried address is not identified as a new threat, files (i.e. relevant content of reported information) are downloaded for analysis. Advantageously, the data in TRDB 110 is re-verified regularly. For instance, if the reported information is found to be recorded as a blacklist in the TRDB 110 and was last verified 6 months ago, the ML engine may be triggered to determine whether the reported information remains in the blacklist. The S-wallet 120 at the user device may be configured to send a request to the ML engine 124 to analyze whether a downloaded file is suspicious before execution of the downloaded file.

4. Response from ML Engine/request for further inspection (S204): After the ML engine 124 analyzes suspicious behavior of the downloaded files or processes within a node associated with the S-wallet 120, it classifies the downloaded files or processes as unknown threat(s), and blocks them from execution. In other words, if the ML engine 124 determines that the downloaded file is suspicious, it will return a value that is assigned by the ML engine 124 to the S-wallet 120 to trigger further inspection.

Further inspection may be conducted through analysis by D-Sandbox 126 and/or the Sentinels 150. It should be appreciated that the S-wallet 120 can be configured to seek the permission of the user to report this detected information, for instance, through the settings of the S-wallet. This means that even if the AR function is enabled for the S-wallet, the ML engine 124 can be set to ask permission of the user before reporting any detected threats through the Sentinel Protocol. In one example, the ML engine 124 is configured to ask the user for permission by a pop-up window.

5. Submit (S205): Once the S-wallet 120 receives a response for triggering further inspection of the unknown threat(s), a request from the ML engine 124 is sent to a distributed sandbox (e.g. D-sandbox 126) for sandboxing. If the S-wallet 120 is configured to request permission from the user in S204, for instance, through the submit option (optional on/off) under the settings of the S-wallet, the S-wallet 120 will check if such submit option is enabled before sending a request along with the threat information (including the suspicious files) to the distributed sandbox for sandboxing.

Results after analysis by a distributed sandbox is sent back to the S-wallet 120 at S206. Such results can be reviewed by the user. 6. AR request to the Sentinels (S207): An auto reporting case is created and shared to the Sentinels 150 through an Interactive Cooperation Framework (ICF) dashboard (i.e. 160 of FIG. 1). The auto reporting case is created after receiving a request from the D-sandbox 126.

7. Analysis response: The Sentinels analyze the threat reported by the user using a sandbox or a distributed sandbox or additional tools. After the Sentinels 150 analyze the root cause of the reported threat, the result of the analysis is registered in the Threat Reputation Database (TRDB) 110. If the result of the analysis determines that the unknown threat is indeed malicious, the online community where the malicious file was originally detected may be alerted. The result of the analysis (or analyzed information) may comprise an indicator for adding to a blacklist of the TRDB 110 and/or an indicator for adding to a whitelist of the TRDB 110.8. Updating: The updated threat information, which include the result of the analysis by the Sentinels, is sent to the Threat DB 110 (S208). The updated threat information may be subjected to validation (e.g. result of the analysis must be signed with a private key of the Sentinel) before registering the updated threat information as a data block of a block chain in the TRDB 110.

In addition, domain information may be monitored and/or compared with the TRDB to improve detection of malicious data.

It should be appreciated that the steps illustrated in FIG. 2 need not be in sequential order. For instance, in one example, AR request may be arranged to execute right after S202 (i.e. from TRDB 110) or S204 (i.e. from ML Engine 124). In such example, an initiation request for further inspection by the D-sandbox may be triggered by the Sentinels 150 after the AR case has been created. In another example, S204 may also be omitted and a request to trigger further inspection by the D-sandbox 126 may be sent directly from the ML Engine 124.

Manual Report (MR)

With reference to FIG. 2, the user can also manually report scam information through the following steps.

1. MR Submission (S211): Domain information, scam url, scam address and files of any suspicious information can be reported directly to the Sentinels 150 using reporting functions of the S-wallet associated with each user.

2. Updating (S212): After verification of the scam information by the Sentinels, updated threat information is sent to the Threat DB 110. The Sentinels may analyze the unknown threat reported by the user using a sandbox or a distributed sandbox or additional tools. The updated threat information may comprise an indicator for adding to a blacklist of the TRDB 110 and/or an indicator for adding to a whitelist of the TRDB 110. The updated threat information may be subjected to validation (e.g. result of the analysis must be signed with a private key of a Sentinel) before registering the updated threat information as a data block of a block chain in the TRDB 110.

Consensus Mechanism (Proof of Protection)

The basic mechanism of Proof of Work (PoW) gives the right to block generation and its corresponding benefits when the results reach an approximation of the given target difficulty through mining. The process of finding the results requires extensive computational work that involves trial and error, so it is difficult for all but a few to achieve it. Therefore, the person who has gone through these difficult processes may become a delegate to represent the majority. The problem is that the massive waste of electricity in the process of finding this delegate is inefficient. As a result, there have been discussions on other possible methods of improving consensus. In one arrangement, there is an algorithm which increases the probability of delegation by the amount of stake held known as Proof of Stake (PoS).

In one example of the present disclosure, case validation occurs among Pre-Sentinels, where data from one Pre-Sentinel is double-checked by a security team (comprising qualified cybersecurity experts) e.g. Uppsala Security's security team. Case validation is required before registering updated threat information as a data block of a block chain in the TRDB (i.e. 110 of FIG. 1). A pre-sentinel can be defined as a security expert who is contributing to the TRDB and is working to improve on a score of reputation that is indicative of his credibility and/or dependability. Such score of reputation can be made available for user reference in the Sentinel Protocol system.

The consensus of Sentinel Protocol improves on the idea of the Delegated Proof of Stake (DPoS), introduced from BitShares invented by Daniel Larimer. The Sentinels, delegated by the Uppsala Security, are a group of proven institutions or individuals with the necessary qualifications, such as the security team at the cryptocurrency exchanges, global cyber security research firms, or group of white hackers or individual white hackers. All of the delegates are experts who have proven their status and experience. Thus, the risk of malicious intentions of a delegator is dramatically reduced and consensus can be optimized.

In order to maintain data integrity in the TRDB, a score reputation is introduced in the consensus of the Sentinel Protocol. That is to say, a sentinel or a pre-sentinel is given a higher ranking if the score of reputation is higher.

In one example, a score of reputation is measured by Sentinel Points (SP), where UPP is the circulating currency. Sentinel Points can only be obtained by acting as a member of The Sentinels and/or Pre-sentinel. For example, the Sentinels 150 analyze cases registered through Automatic Report (AR) function and Manual Report (MR) function provided by the S-wallet 120 of FIG. 1, record the relevant information in the TRDB and such data in the TRDB can be shared to many ecosystems of various industries.

Figure 3:
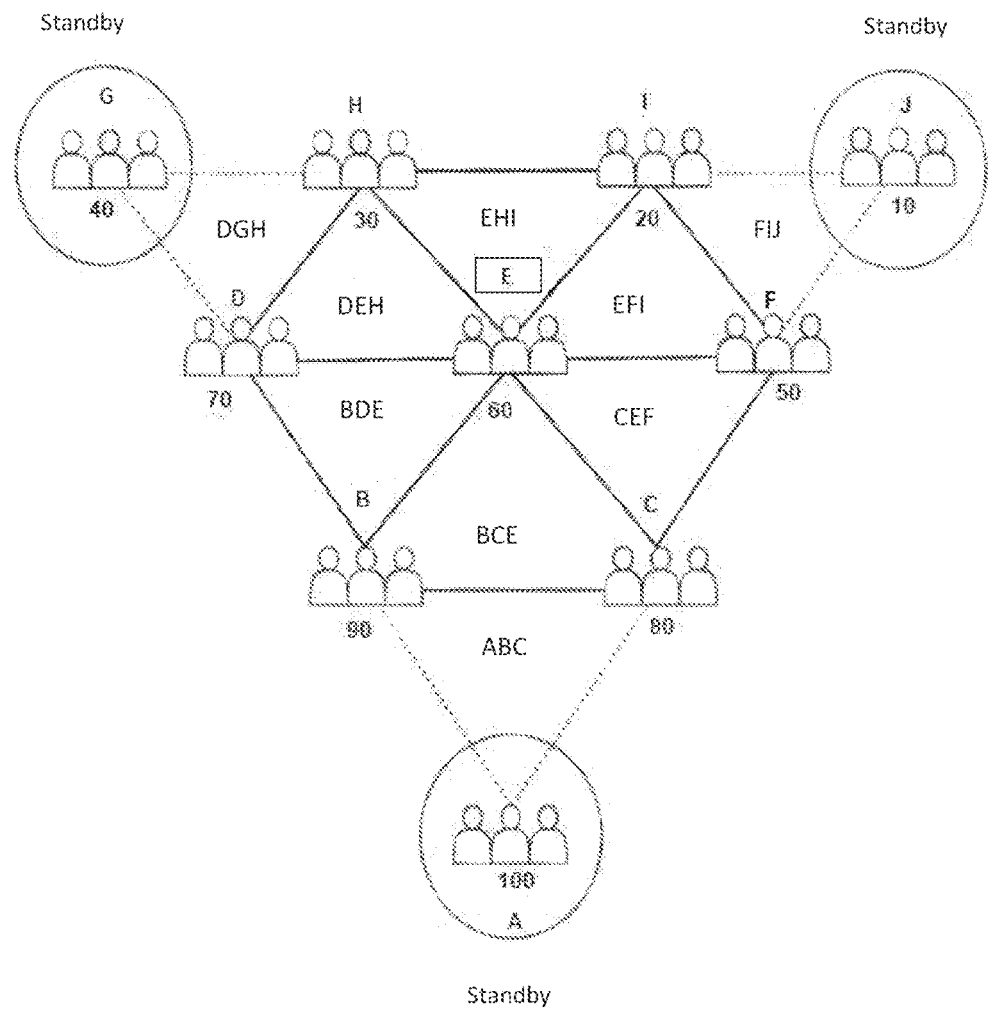
FIG. 3 shows one example of a high level consensus diagram that is used to determine when a data block is created in a block chain), in accordance with an example of the present disclosure.

Another example to quantify a score of reputation of a member of the Sentinels and/or Pre-sentinel is one that is based on the Sentinel's or Pre-sentinel's performance respectively, wherein users can actually vote on their reputation. The system that is delegated by obtaining a reputation score, defined as the Proof of Protection (PoP) in Sentinel Protocol. If a dishonest Sentinel's actions intend harm, such as a Sybil attack or forking a chain, he will lose his reputation score as a punishment. As with the slasher of Ethereum, this eliminates the "nothing at stake" issue, as representatives are threatened with loss of both reputation and qualification The advantage of the reputation system, especially this structure, is that it is almost impossible to become a bad actor, as individuals are representatives of trust in their professional field. Technically, in this trust structure, a large number of delegated Sentinels are unnecessary; that would only serve to increase randomness for securing consensus and add unnecessary delay. Therefore, an example of the consensus structure of Sentinel Protocol has a selected group only of only seven Sentinels in charge of validation of transactions, generating blocks, and updating the TRDB. According to the reputation ranking, and with reference to FIG. 3, a total of ten Sentinels A-J are chosen in one example, with seven designated as Active while three are designated as Standby. In FIG. 3, the three Sentinels that are designated as Standby are Sentinels A. G and J. These three Sentinels will remain on Standby, unless needed to reduce network latency and delays. Although only a selected number of Sentinels are proposed in the present example, it is appreciated that in another example, there could be provided a large number of delegated Sentinels, as the community (i.e. Blockchain network) scales up. In another example, there may be small groups of Sentinels servicing a pre-defined region or community (may be geographically defined). The PoP synchronous algorithm and asynchronous Byzantine Fault Tolerance (BFT) are supported as redundant consensus algorithms in case of significant network fragment, massive DDOS attack, or other unexpected event causing the majority of The Sentinels to lose communications with each other.

Sentinel Protocol's Proof of Protection (PoP) is designed to be simple and efficient in terms of latency, scalability and reliability.

FIG. 3 shows one example of a high level consensus diagram that is used to determine when a data block is created in a block chain. The Proof of Protection (PoP) consensus diagram described in FIG. 3 comprises the following components:

10 delegated reputation Sentinels form an inverted pyramid structure shown in FIG. 3. These ten delegated Sentinels are chosen from a pool of Sentinels that has the highest reputation ranking. For the avoidance of doubt, although each delegated Sentinel is represented by a group of individuals in the diagram, each Sentinel can represent an individual or organization in another example.

The score of reputation is indicated underneath each person in the group of individuals. In FIG. 3, the scores are indicative of Sentinel Points earned by individual contributions to the Sentinel Protocol. For instance, Sentinel E owns 60 Sentinel Points while Sentinel C owns 80 Sentinel Points.

A, G, and J correspond to each of the three endpoints that become Standby. Note that these three end points (i.e. Standby nodes) are randomly designated. This means that these standby nodes may be active in the next block generation in the block chain.

Nodes in a hexagon formed by Sentinels B, C, F, I, H and D are randomly granted a block generation.

Each small triangle structure of the inverted pyramid structure (i.e. DGH, DEH, EHI, EFI, FIJ, BDE, BCE, CEF or ABC) is intended to tag the smallest multicast groups to minimize broadcast for efficiency Minimized consensus process by selecting seven fixed nodes.

In case of Byzantine Fault Tolerance (BFT) implemented for 'n=3f+1' structure, up to 10 nodes can be operated with three Standby nodes and the node of the Sentinel E becomes Master.

Standby nodes A, G and J are charged with Denial of Service (DoS) resistance as well as high availability. The nodes A, G. and J perform backup of the peer node. (For stabilized consensus, The Sentinels can build a robust network security environment.

In summary, under DPOS consensus illustrated in FIG. 3, the Sentinel Protocol allows seven Sentinels to validate incident data and before creating the correspondent block. For any malicious attempts by a Sentinel, that Sentinel will be penalized, losing Sentinel Points and thus losing financial rewards and reputation. With this incentive and penalty structure, the Sentinels are encouraged to make the correct validations.

In one example, case statuses can be fixed by the Sentinel himself or by the other Sentinels. For the data already stored on a blockchain, only the Sentinels have the authority to create blocks. They can overwrite the previous block and create a new one (e.g. if one Sentinel makes a mistake). This will also happen when the status of a site or an address status (e.g. a whitelisted address can later be blacklisted).

Incentive System of the Sentinel Protocol

Sentinel Protocol aims to create a self-sustaining cyber security ecosystem in a moderate timeframe without requiring centralized guidance or organization. An effective cyber security ecosystem requires an exchangeable cryptocurrency as a direct means to compensate for the usage of goods or services; also, it requires an independent value which represents an individual's subjective contribution to improve the cybersecurity ecosystem. Thus, Sentinel Protocol has a circulating cryptocurrency, in one example, the UPP (Uppsala Tokens), for the use of the goods and services provided by Sentinel Protocol and Sentinel Points (SP) for the staking value of The Sentinel Protocol's reputation. It should be appreciated that instead of UPP, other digital currency can be used as monetary reward to Sentinels (or security experts) in other examples.

Early contributors will receive greater incentives; once Sentinel Protocol reaches a certain level of intelligence or timeframe, an automatic reduction of UPP incentives for relatively similar contributions will be implemented to benefit early contributors. This incentive system is designed to encourage both the ones who need help from cyber security experts, as well as those experts (either individuals or organizations) to participate.

The following paragraphs describe one example illustrating how early contributors may be awarded with greater incentives.

UPP (UPPSALA TOKENS)
- UPP is a currency for goods and services provided in the Sentinel Protocol ecosystem, such as the advanced security features of the security wallet
- UPP also can be used in a case opened for detailed cyber forensic service, consultancy, vulnerability assessment, and/or other activities requiring Sentinel Protocols' help
- Usage fees can be collected in a smart contract by a DEX (decentralized exchange) platform such as Kyber Network
- In one arrangement, 500,000,000 UPP may be generated and distributed for the early stage cybersecurity community builders
- 30% of the UPP collected from advanced feature usage fees, case processing fees, and/or future developments by Uppsala Security can be vested together with UPP generated by inflation to remunerate community contributors for their work on a pro rata scheme
- Throughout 20 time-vestings, additional UPP may be generated; following the inflation ratio described below, and distributed to contributors who make the Sentinel Protocol ecosystem a better place by Proof of Protection (PoP) as discussed earlier.
- To incentivize the early participants or early Sentinels who contribute to the Sentinel Protocol ecosystem, the initial inflation ratio will be set between 3 to 7%. Subsequently, there can be a logarithmic decrement percentage reduction in the incentive with each round until reaching (near) 0% inflation ratio
- Each round of vesting may be executed when the total generated Sentinel Points hits a target value or certain weeks of timeframe; whichever comes sooner.
- In one arrangement, 15% of the initial UPP supply is reserved for Uppsala Security, 15% of the proceeds from the sale of the initial UPP supply is reserved for business development, development funds, legal funds, advisory incentives, other organizational activities requiring funds, etc, 2% of the initial UPP supply is reserved for advisory incentives, and 8% of the initial UPP supply is reserved for any unforeseen business activities
- In this arrangement, the remainder of UPP (i.e. 60% of the initial UPP supply) is distributed in the market for Sentinel Protocol early contributors, users, contributors, supporters, etc.

The following paragraphs describe one example of how Sentinel Point can be awarded in exchange for UPP.

Sentinel Points
- Can only be acquired by PoP (Proof of Protection).
- POP comprises of various cybersecurity activities, including but not limiting to; reporting a true scammer's address, IP, website, validating reports, resolving incident cases, etc.
- Legitimate report validation is done by the Sentinels
- S-Wallet holders can do PoP by D-Sandboxing computation
- Other indirect contribution for the Sentinel Protocol community includes: generating articles to enlighten the public on issues of cybersecurity or translating articles to other languages
- The Sentinels obtain Sentinel Points according to the report analysis and the user's reputation vote
- Sentinel Point holders will have the vesting benefit of UPP generation described above. Vesting amount will be proportional to the Sentinel Points each entity holds relative to the total Sentinel Points generated via POP done for the community. Automated exchange process could be applied.

In one exemplary technique, the Sentinel Protocol may be provided as an add-on extension for web browser (such as Chrome, Mozilla Firefox and the like).

The extension may have the following features:
- Utilizing the Whitelisted and Blacklisted information on the Threat Reputation Database, users are informed when they are visiting a whitelisted site by a small pop indicator. Likewise, users are also informed when they are visiting a blacklisted site by an overlay that they have landed on a potentially deceiving website. Users can also be informed when they landed on a site that is utilising Puny Code which has been known to be used by attackers to direct victims to a phishing site.
- A search function for whitelisted and blacklisted crypto addresses.
- End users can report suspicious sites using the extension.

In one example, once a user installs the sentinel protocol add-on extension for his or her web browser (or the corresponding API), there is now an automation means to verify the Crypto Wallet addresses and websites that he maybe interacting with.

Figure 16A:
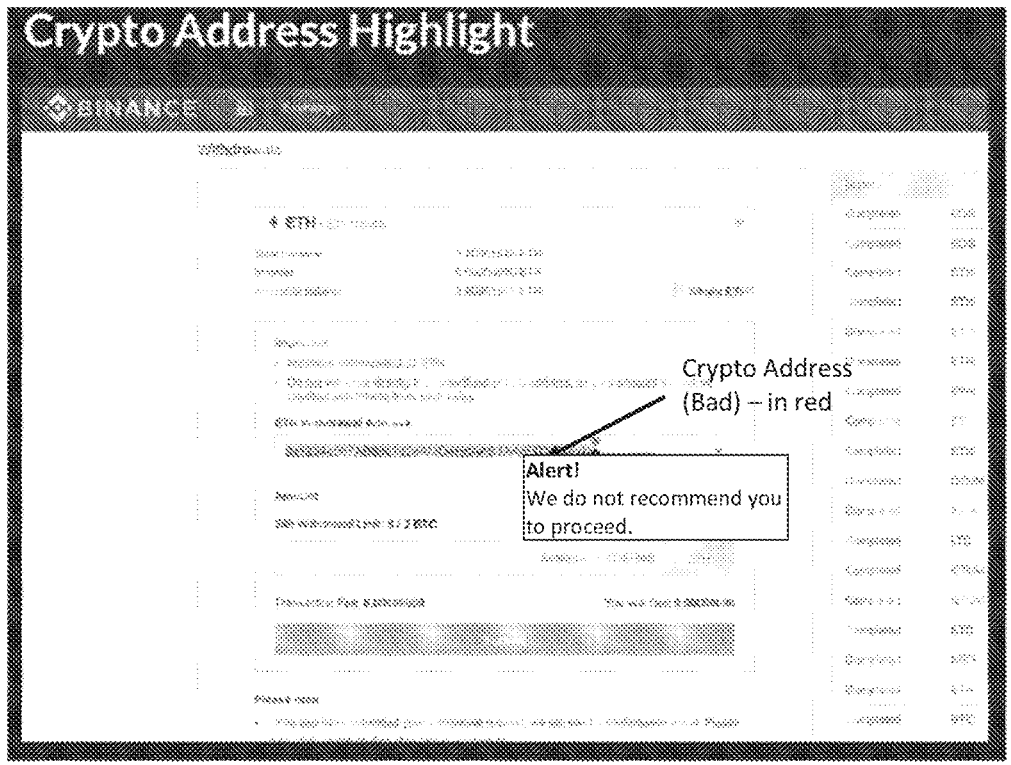
FIGS. 16A and 16B show how an alert display of a fraudulent crypto address and an authentic crypto address are indicated respectively in accordance with an example of the present disclosure.
Figure 16B:
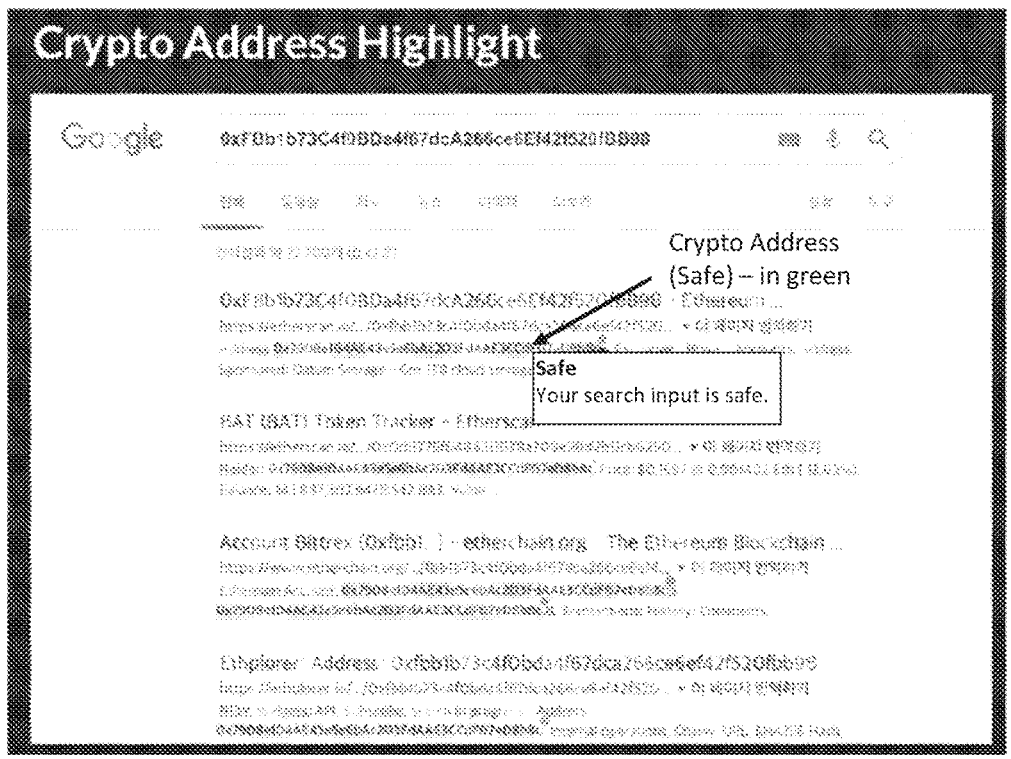

For instance, after an exchange received Crypto Assets from a wallet address, the exchange can use the relevant API to query the TRDB to check if the wallet addresses has been blacklisted in the TRDB. If it is blacklisted, this may indicate the associated funds are from illegitimate gains such as a scam or hack. In one other implementation, the inputted Crypto Address or ICO site can be highlighted, and after querying the TRDB using the API, the highlight color of the inputted Crypto Address can change to indicate Whitelist or Blacklist or Unknown. In one example, and with reference to FIG. 16A, a malicious crypto address (i.e. Blacklist) is highlighted in red. In addition, an alert may overlay the highlighted crypto address to indicate to the user that transaction is risky. In another example, and with reference to FIG. 16B, a safe crypto address (i.e. Whitelist) is highlighted in green, and an unknown crypto address (i.e. Unknown) is not highlighted (not shown in FIGS. 16A and 16B). In addition, an alert may overlay the highlighted crypto address to indicate to the user that the queried crypto address is safe. The API may also be configured such that if the highlighted crypto address is clicked, the user will be redirected to an indicator detail screen of the portal.

The sentinel protocol may also be employed in a phishing and impersonation detection system. In one arrangement, an API can be created to link the TRDB with the phishing and impersonation detection system (interchangeably used with Twitter Crawler System). Machine learning can also be employed in the phishing and impersonation detection system to analyse and pick up patterns from detected sites to improve detection algorithm of the phishing and impersonation detection system. The phishing and impersonation detection system can be an add-on functionality to the Sentinel Protocol or a stand-alone functionality (e.g. a third party application with links to the Blockchain network based on the Sentinel Protocol) to automatically detect and flag Twitter (or other social networking) Accounts that are impersonating other legitimate Twitter (or other social networking) accounts. The phishing and impersonation detection system can be configured to detect Giveaway Scams that are tweeted using these impersonated accounts.

Figure 4:
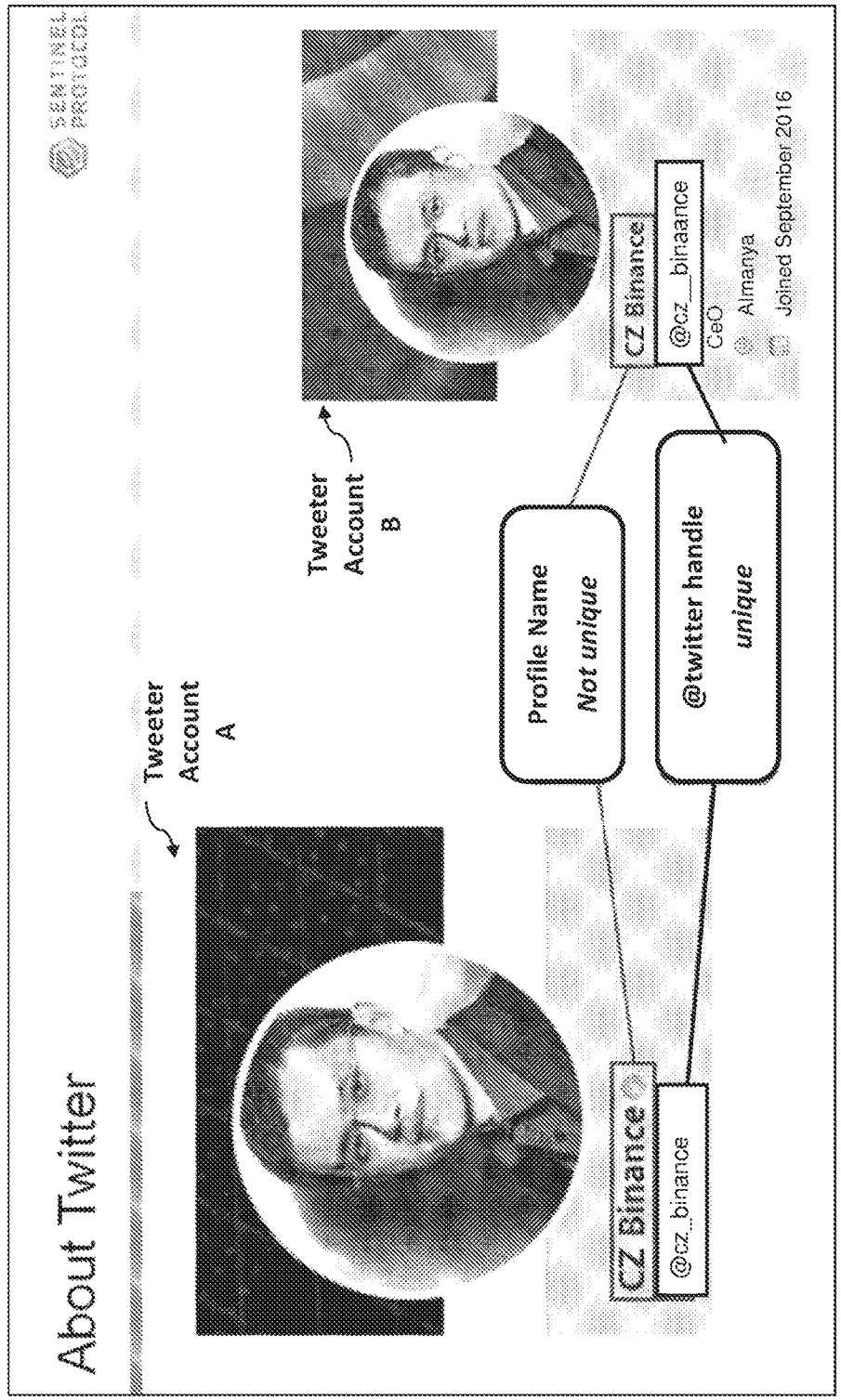
FIG. 4 shows a comparison between an authentic (real) twitter account and an impersonated (fake) twitter account), in accordance with an example of the present disclosure.

For instance, if implemented as an add-on to the Sentinel Protocol, the Sentinel Protocol can then be used to check a twitter handle of a twitter account to authenticate the identity of a user. FIG. 4 compares a legitimate twitter account A with a bogus twitter account B created to impersonate the legitimate twitter account A. It is clearly shown in FIG. 4 that a profile name of a twitter account is not unique, but the twitter handle of each twitter account is unique. Specifically, the profile names for both twitter accounts A and B in FIG. 4 are "CZ_Binance". The twitter handle for twitter account A is "@cz_binance", as compared to the twitter handle for account B, which is "@cz_binaance".

Figure 5A:
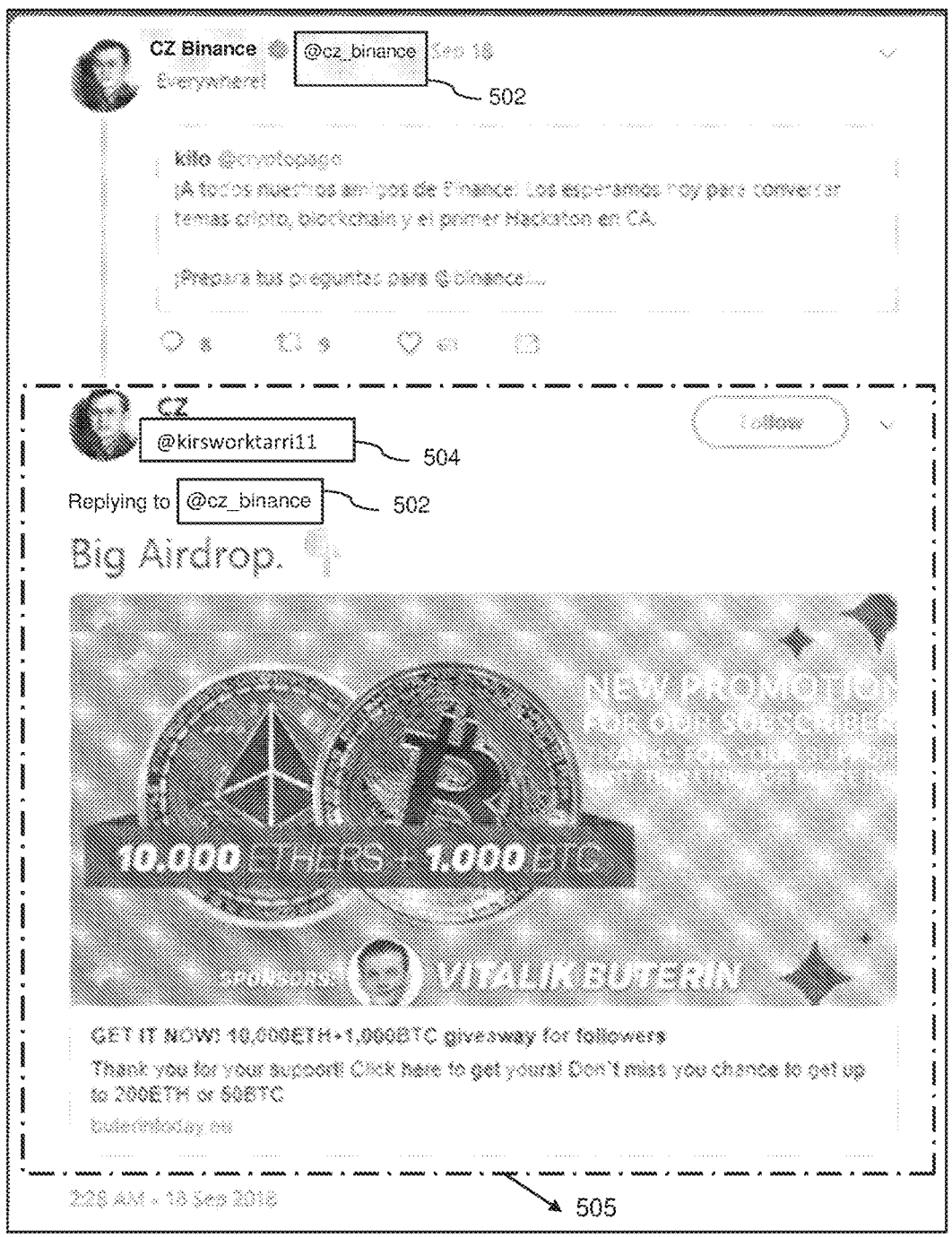
FIGS. 5A and 5B show examples of how a twitter account can be infected with phishing campaigns).
Figure 5B:

Therefore, it is possible for malicious actors to carry out phishing campaigns by impersonating key crypto influencers or reply to tweets by key crypto influencers with phishing links (as shown in FIGS. 5A and 5B) or inserting wallet addresses. Key crypto influencers may refer to crypto startup CEOs, social media influencer, any prominent figures in the field of crypto technology or block chain technology and the like.

In an example, and with reference to FIG. 5A, a bogus twitter account, identified by a twitter handle 504, is replying to a legitimate account that can be identified by a twitter handle 502. A link to a phishing campaign 505 (marked out by a box drawn with long dash-dot lines) is included in the reply from the bogus twitter account. Since the profile name of the bogus twitter account (i.e. CZ) has a profile name that is similar to that of the legitimate twitter account (i.e. CZ Binance), a reader may accidently be redirected to the phishing link or may click on the phishing link thinking that it is a genuine post by the legitimate account which the reader trusts.

In another example, and with reference to FIG. 5B, a bogus twitter account is replying to a legitimate account that can be identified by a twitter handle 502. However, on a first post 506 in the chain of reply, there is no link to a phishing campaign. In this example, the bogus twitter account continues from the first post 506 of the bogus twitter account with a second post 507. There is a link to a phishing campaign 505 (marked out by a box drawn with long dash-dot lines) on the second post 507. Since the profile name of the bogus twitter account has a profile name that is identical to that of the legitimate twitter account (i.e. Justin Sun), a reader may accidently be redirected to the phishing link or may click on the phishing link thinking that it is a genuine post by the legitimate account which the reader trusts. Note that the phishing campaigns 505 indicated in FIGS. 5A and 5B are for illustrative purpose, and the reproducibility of its content is not important to understand the present example.

Figure 6A:
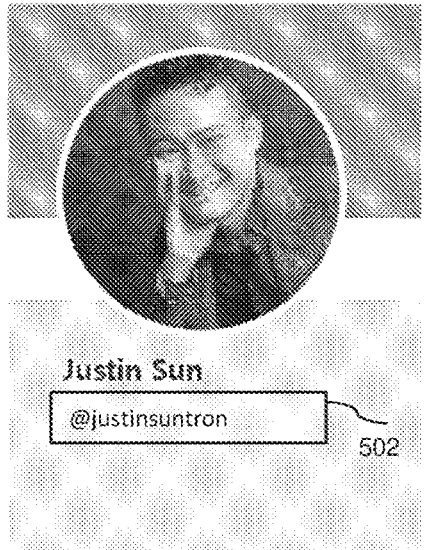
FIGS. 6A to 6C and 7 show common tricks used by malicious actors on an impersonated account.
Figure 6B:
Figure 6C:
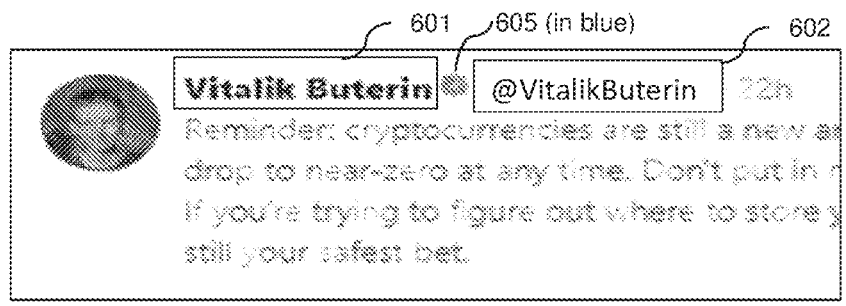

Unlike the reply post of the bogus twitter account in FIG. 5A, the unique twitter handle is not showing on the second post 507 of the bogus twitter account in FIG. 5B. This is because, as illustrated in FIG. 6B, the malicious actor of the bogus twitter account in the example of FIG. 5B has used space or hangul tillers to push unique twitter handle 504 out of screen. This is in contrast to FIG. 6A, where the legitimate twitter account in FIG. 5B did not use space or hangul fillers in between the profile name and the unique twitter handle 502.

Figure 7:
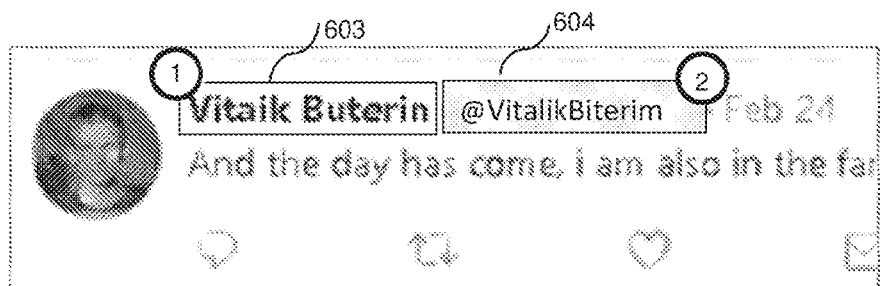

In another example, and with reference to FIG. 7, a malicious actor omits a character in his or her twitter handle 604 and/or profile name 603. In this example, the malicious actor can also use visually similar letters as that of the actual profile name of the legitimate twitter account holder in his or her twitter handle 604 and/or profile name 603. The profile name 601 and the unique handle 602 of the legitimate twitter account is shown in FIG. 6D for comparison. A security badge 605 (in blue) located next to the profile name 601 is provided by the Twitter service provider to indicate that the account is authentic. It is clear that in this example, when compared to the legitimate twitter account, the character "l" is missing from the profile name 603, and visually similar letters, such as "m" instead of "n", is used in the twitter handle 604.

Advantageously, an API can be created to link a TRDB (e.g. 110 of FIG. 1) with the phishing and impersonation detection system to authenticate a legitimate twitter account and/or to help the general public differentiate a legitimate twitter account from a bogus twitter account. The API may be in the form of python scripting, django scripting, or PostgreSQL scripting.

Figure 8A:
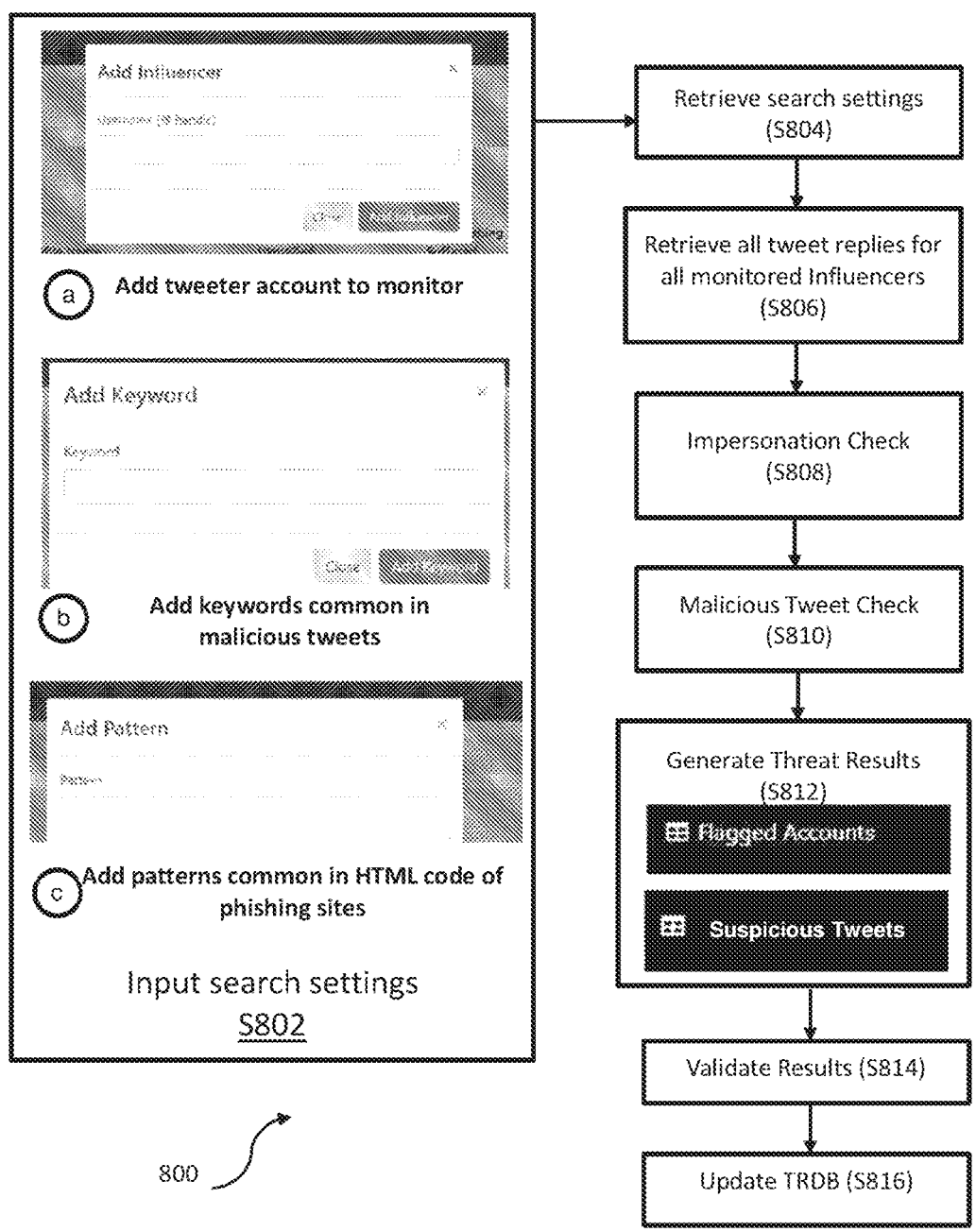
FIGS. 8A to 8D illustrate a work flow implemented for a twitter crawler system in accordance with an example of the present disclosure.

In one example, the phishing and impersonation detection system can be used to crawl tweet replies to a particular twitter account (e.g. crypto influencer) to detect at least one of the following:

Impersonator twitter accounts
Malicious Tweets
Phishing links
Wallet addresses of malicious actors FIG. 8A illustrates an example on how a twitter crawler system can be implemented. The twitter crawler system can be shared through an API (Application Programming Interface) to any user who would like to use it.

At a step S802, the twitter crawler system is configured to allow a user or a member of the Uppsala Security to add crypto influencers to monitor, keywords common in malicious tweets, and/or patterns common in html code of phishing sites. In another example, the identity check may be done automatically by the Sentinel Protocol (at the back end) by using the corresponding API. This step S802 can comprise the following sub-steps:

(a) input a twitter account to be monitored, for example, a twitter account of a key crypto influencer. Key crypto influencers may refer to crypto startup CEOs, social media influencer, any prominent figures in the field of crypto technology or block chain technology and the like.

(b) input keywords that are common in malicious tweets, for example, "airdrop wallet", "wallet address" etc. There may be provided a Keyword Management Feature in the TRDB where user can delete, edit or add keywords.

(c) input patterns (in HTML code) common to Phishing sites. There may be provided a Pattern Management Feature in the TRDB where user can delete, edit or add patterns.

At a step S804, the twitter crawler system retrieves the search settings inputted by the user or the Sentinel at step S802.

In one example, at a step S806, all tweet replies for all monitored influencers are retrieved at S806. Note that each monitored tweet account is assigned with a parameter, "lastRetrievedID", wherein the "lastRetrievedID" is the tweet ID of the latest retrieved tweet out of all tweets returned. Such information may be stored in the TRDB to facilitate the analysis.

Figure 8B:

In one example, and with reference to FIG. 8B, tweet replies can be retrieved on a regular basis (by polling) using Python-twitter API such as the command below:

mentions=api.GetSearch(term="@"+username,
        result_type="recent", include_entities=True,
        count=100, since_id=int(sinceValue)) (See FIG.
        8B)

Note that recursion of the command is repeated until GetSearch returns a value of 0. Consequently, the since_id returns results with an ID that is more recent than a specified ID. In the above command, if the specified ID is assigned as the lastRetreived ID, this command will return the next 100 tweets after the tweet that is associated with the lastRetreived ID.

At a step S808, the twitter crawler system is configured to perform impersonation check. Identity of a twitter user can be authenticated by checking at least one of the conditions:

Use of spaces or hangul fillers and the like to push unique twitter handle out of screen (see for example, FIG. 6B)

Omission of characters in twitter handle and/or profile names (see for example, FIG. 6D)

Use of visually similar letters in twitter handle and/or profile names (see for example FIG. 6D)

Figure 8C:
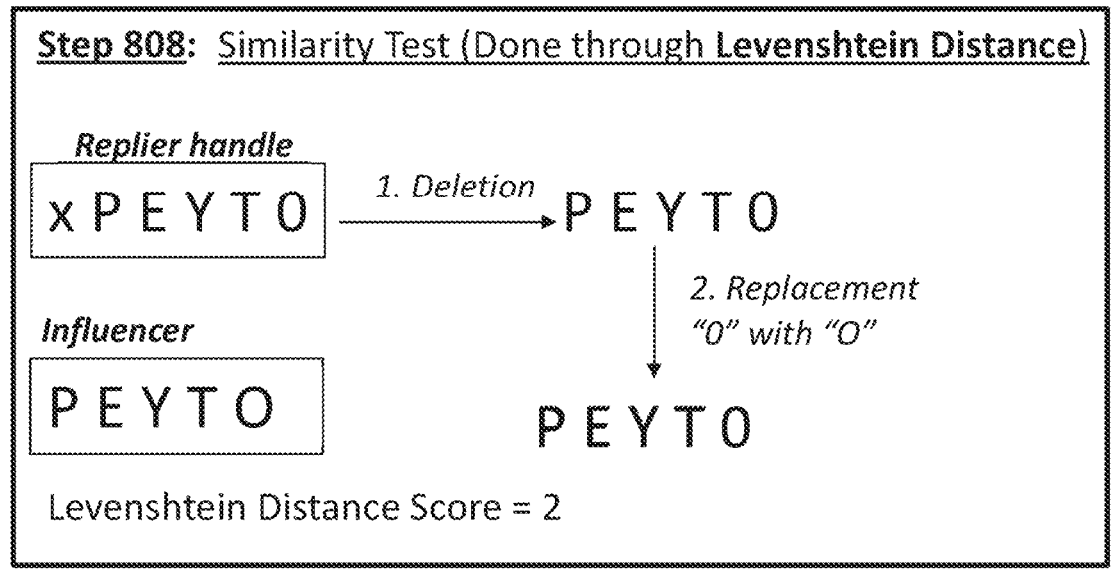
Figure 8D:
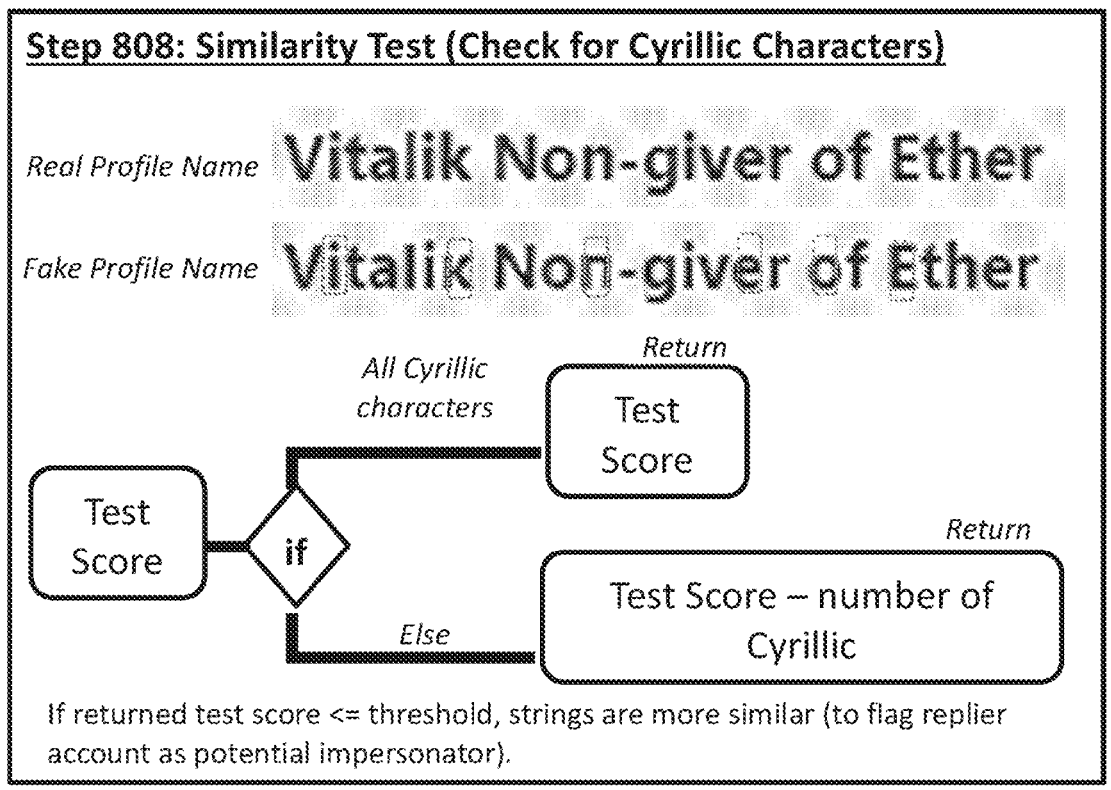

Use of special characters such as Cyrillic/Russian characters that look like English alphabets in twitter handle and/or profile names (see for example FIG. 8D).

During the impersonation check process (i.e. S808), the twitter crawler system is configured to replace hangul fillers with space, and to remove all whitespaces from a tail end of the profile name of a twitter account that is being monitored. Such implementation will ensure that the twitter handle is positioned right after the profile name, i.e. remove the whitespace issue illustrated in FIG. 6B.

Similarity test is then performed between handle and/or profile name that is being investigated against handles and/or profile names of all influencers that are added to the TRDB. The influencers to be monitored are typically added to the TRDB by Uppsala Security, In another modification, an user may submit a request to the SIPB for his twitter account to be monitored.

In one example of a similarity test, Levenshtein Distance Algorithm (see for example FIG. 8C) may be performed between two strings to compare how different the two strings are, wherein the first string is the handle or profile name of the tweet account being monitored and the second string is one of the handle or profile of all influencers that are added to the TRDB. Levenshtein Distance Algorithm returns a Levenshtein Distance score that is computed based on the least number of operations required to transform the first string to the second string, wherein the operations include deletion, addition and replacement. The lower a score is calculated between the two strings, the more similar the two strings are. It should be appreciated that other measures of edit distance (e.g. Damerau-Levenshtein distance, Wagner-Fischer algorithm) may be used to determine how similar the two strings are. If the computed score is lower than a threshold, the account that is being monitored will be flagged as a potential impersonator.

With reference to FIG. 8C, a replier handle "xPEYT0" is compared with an influencer handle "PEYTO". It can be seen that two operations are required to transform the replier handle to the influencer handle. A deletion operation is required to delete the character "x" and a replacement operation is required to substitute the character "0" with "O". Consequently, the computed Levenshtein distance score is 2.

In another example of a similarity test, the number of special characters (e.g. Cyrillic characters) in a handle or a profile name is calculated for analysis and a corresponding score is compared with a threshold to determine a potential impersonator. In this example, and with reference to FIG. 8D, the algorithm presumes that all Cyrillic characters used in the profile name are for tricking victims. If the profile name is made up of all Cyrillic characters, the twitter crawler system is configured to return the Levenshtein Distance Score calculated to transform the profile name of the replier handler to the profile name of the influencer. If the profile name is made up of both English characters and Cyrillic characters, the twitter crawler system is configured to return a score that is computed by deducting the number of Cyrillic characters from the Levenshtein Distance score calculated to transform the profile name of the replier handler to the profile name of the influencer. In the example of FIG. 8C, the Levenshtein Distance score is 6 and because there are 6 Cryillic characters, the returned test score is 0. The lower a returned score is, the more similar the two profiles/handles are. If the returned score is lower than or equal to the threshold, the account that is being monitored will be flagged as potential impersonator. If the returned score is more than the threshold, the account that is being monitored is likely to be substantially different from the legitimate influencer account. This means that if the returned score is more than the threshold, the account that is being monitored is unlikely to be a potential impersonator.

Turning back to FIG. 8A, content of each retrieved tweet reply is analyzed and flagged as potentially malicious at S810 if at least one of the following conditions is satisfied:

(i) a tweet reply retrieved in S806 is determined to contain at least one keyword stored in TRDB and presence of a wallet address, (ii) a tweet reply retrieved in S806 is determined to contain at least one keyword stored in TRDB and presence of a URL, (iii) if the detected URL is determined to include at least one malicious html pattern stored in the TRDB and/or a unknown wallet address; or (iv) if the detected wallet address or URL is found to match a record of a blacklist stored in the TRDB.

A combination of the above conditions may be used to lower rate of false positives. For instance, only when the tweet reply is determined to contain at least one keyword stored in TRDB and at least one URL, and if the detected URL of the tweet reply is determined to include at least one malicious html pattern stored in the TRDB, the tweet reply is flagged as potentially malicious. Using a combination of conditions can lower a rate of detection of false positives. The above conditions can be termed collectively in the present disclosure as conditions to flag suspicious tweets.

Figure 9:
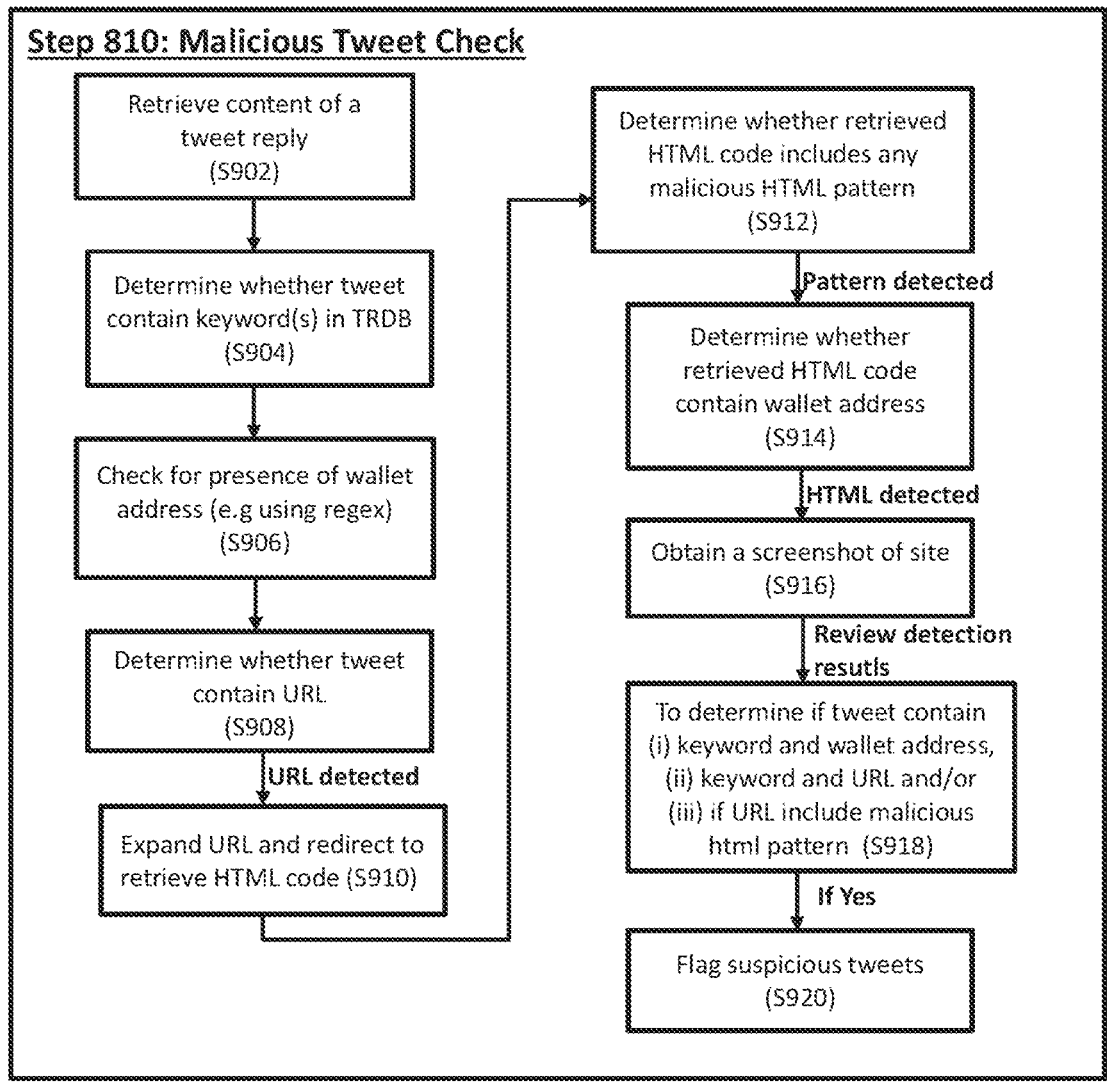
FIG. 9 illustrates malicious tweet check implemented for the twitter crawler, in accordance with an example of the present disclosure.

Step S810 is explained in detailed with reference to FIG. 9. At a step S902, content of a tweet reply is retrieved. Alternatively, content of a plurality of tweet replies are retrieved and scheduled for investigation, where each tweet reply is identifiable by a tweet ID. At a step S904, tweet content (or replies) of a twitter account is checked for key words (such as send, airdrop, wallet) stored in TRDB. It is possible for a user and/or a Sentinel to add, remove or edit keywords to be checked through the tweet content using a Keyword Management Feature of the TRDB. Typical keyword search algorithms (such as exact matches, partial matches, keyword search using wildcard and the like) may also be used to determine if there are any keyword(s) detected in a tweet reply by the Twitter Crawler System.

Subsequently, at a step S906, tweet content is also checked for presence of a wallet address. In one example, using regex, wallet address of a prescribed format can be detected.). Some examples of the prescribed formats are listed below:

BITCOIN
- a) P2PKH (begins with '1', 26-35 chars long, alphanum) One example is 1BvBMSEYstWetqTFn5Au4m4GFg7xJaNVN2
- b) P2SH (begins with '3', 26-35 chars long, alphanum) One example is 3J98t1WpEZ73CNmQviecrnyiWrnqRhWNLy
- c) Bech32 (begins with 'bc1, 26-35 chars long, alphanum') One example is bc1qar0srrr7xfkvy5l643lydnw9re59gtzzwf5mdq.

ETHEREUM
- a) Standard (begins with '0x', followed by 40 alphanum) One example is 0x89205A3A3b2A69De6Dbf7f01ED13B2108B2c43e7.

At a step S908, tweet content is also checked for URL links. For every URL detected in each tweet, the respective URL link is expanded and redirected, for example, through a sandbox at a step S910 to retrieve corresponding HTML code. Subsequently, at a step S912, after retrieving HTML code corresponding to the redirected URL link, the Twitter Crawler System is configured to check if the retrieved HTML codes include any malicious patterns defined in the TRDB. Some examples of malicious patterns are detection of text strings such as "verify your address", "copy address to clipboard", and "waiting for your payment". If the Twitter Crawler System detects a possible threat, it is configured to scan the HTML for wallet address (can be ETH address, Bitcoin Address, or the link) at a step S914 and/or to take a screenshot of the site at a step S916. Such screenshot may serve as evidence of malicious content in the future. In another example, the detected wallet address(es) and/or URL link(s) are compared with a blacklist stored in the TRDB. Artificial Intelligence or Machine Learning may also be used to identify malicious html pattern. It should be appreciated that the Twitter Crawler System may be incorporated into the Sentinel Portal.

At a step S918, the Twitter crawler system is configured to execute a program (instructions) stored in a memory to determine if a tweet reply to an influencer twitter account that is stored in the TRDB for monitoring fulfils any one of the conditions to flag a suspicious tweet. The conditions to flag a suspicious tweet are

- (i) if it is determined that the tweet reply contains a keyword stored in the TRDB and a wallet address,
- (ii) if it is determined that the tweet reply contains a keyword stored in the TRDB and an URL,
- (iii) if it is determined that a URL in the tweet reply contains a malicious html pattern (in the form of text string) stored in the TRDB, and/or
- (iv) if it is determined that a wallet address or a URL in the tweet reply is found to match a record of a blacklist stored in the TRDB.

If it is determined that a retrieved tweet reply fulfils any one of the conditions to flag a suspicious tweet, the tweet reply will be flagged for further verification by the Sentinels at a step S920. In one example, the tweet id of a corresponding suspicious tweet is recorded in a TRDB. In another example, the tweet id of a tweet reply that has been determined by the twitter crawler API to be non-suspicious may be recorded.

Figure 10A:
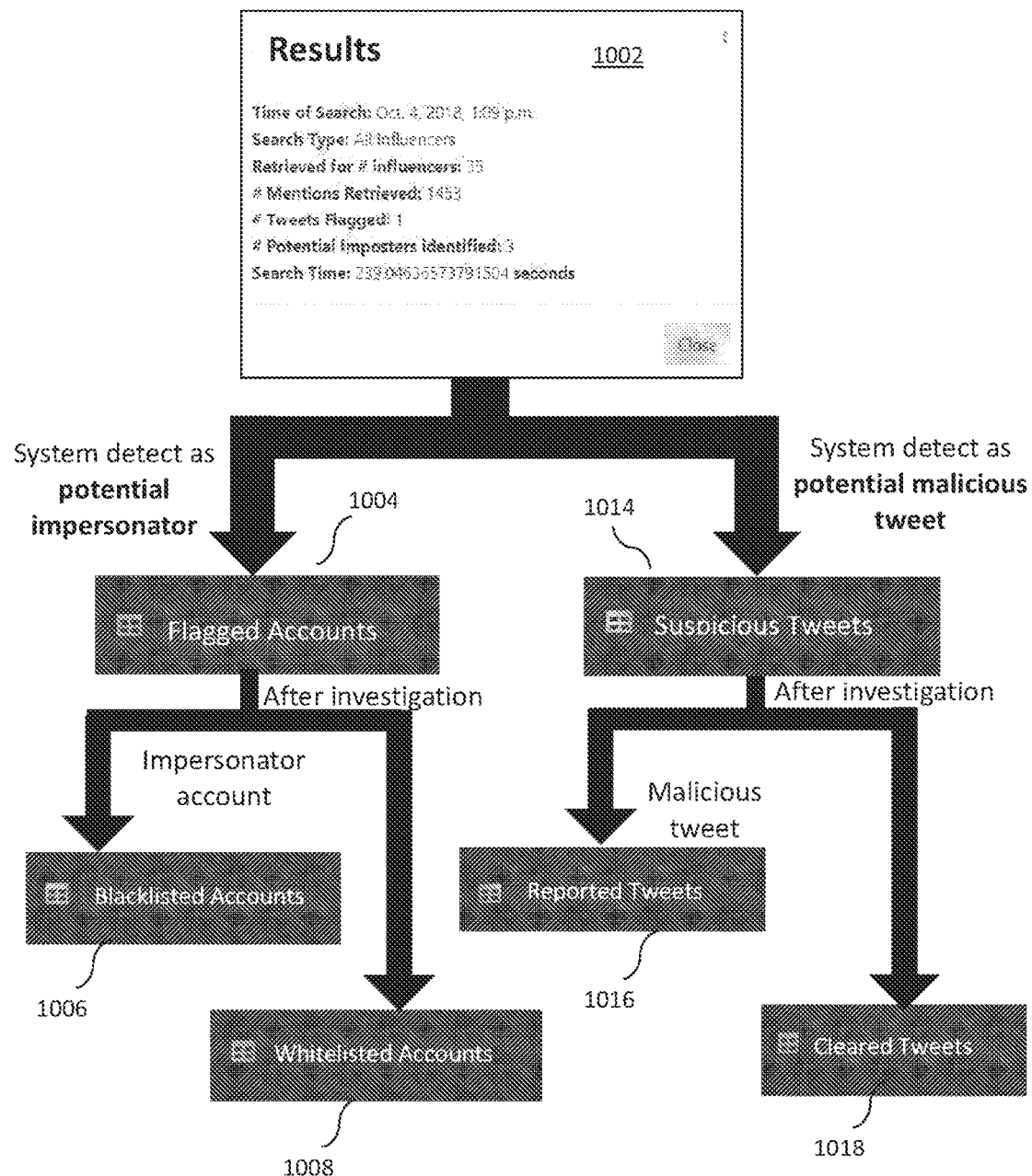
FIG. 10A shows how detected results are handled (post-search) in accordance with an example of the present disclosure.

Turning back to FIG. 8A, the twitter crawler system is configured to generate threat results at a step S812. The generated threat results include flagged twitter accounts and suspicious tweets. The generated threat results are transmitted to the TRDB for validation by the Sentinels (e.g. 150 in FIG. 1, A-J in FIG. 2) at a step S814. The validation process by the Sentinels is described in detail with reference to FIG. 10A.

If a potential impersonator or a potential malicious tweet is reported or detected by the Twitter Crawler System, investigation of the threat results 1002 by the Sentinels will begin. If it is verified to be a real threat, the data would be saved in blacklisted accounts 1006 or reported tweets 1016 of the TRDB accordingly. If it is verified to be a false positive (i.e. not a security threat), the data would be saved in whitelisted accounts 1008 or cleared tweets 1018 of the TRDB accordingly.

Figure 10B:
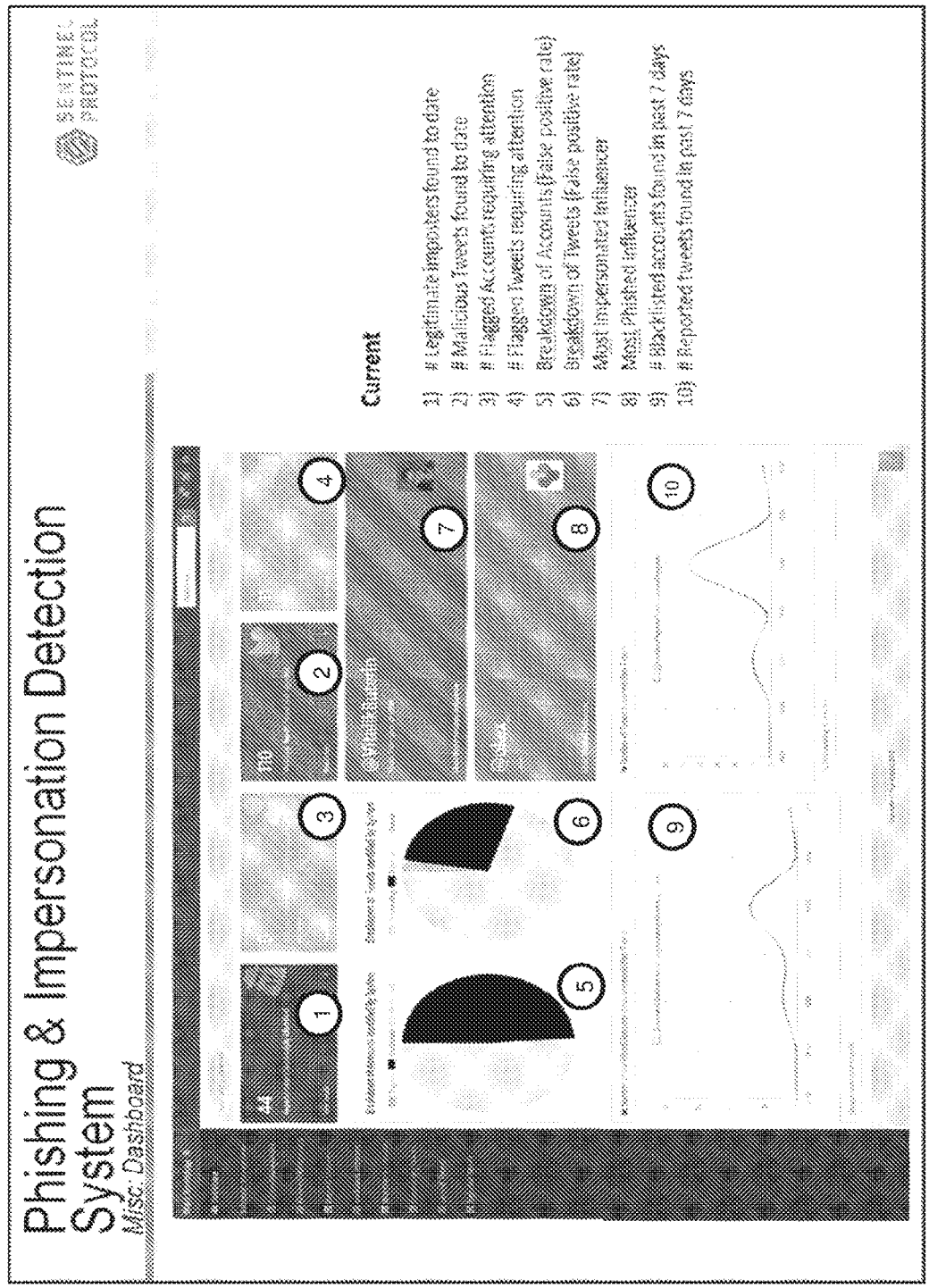
FIGS. 10B and 10C show other optional features that can be implemented in accordance with an example of the present disclosure.
Figure 10C:
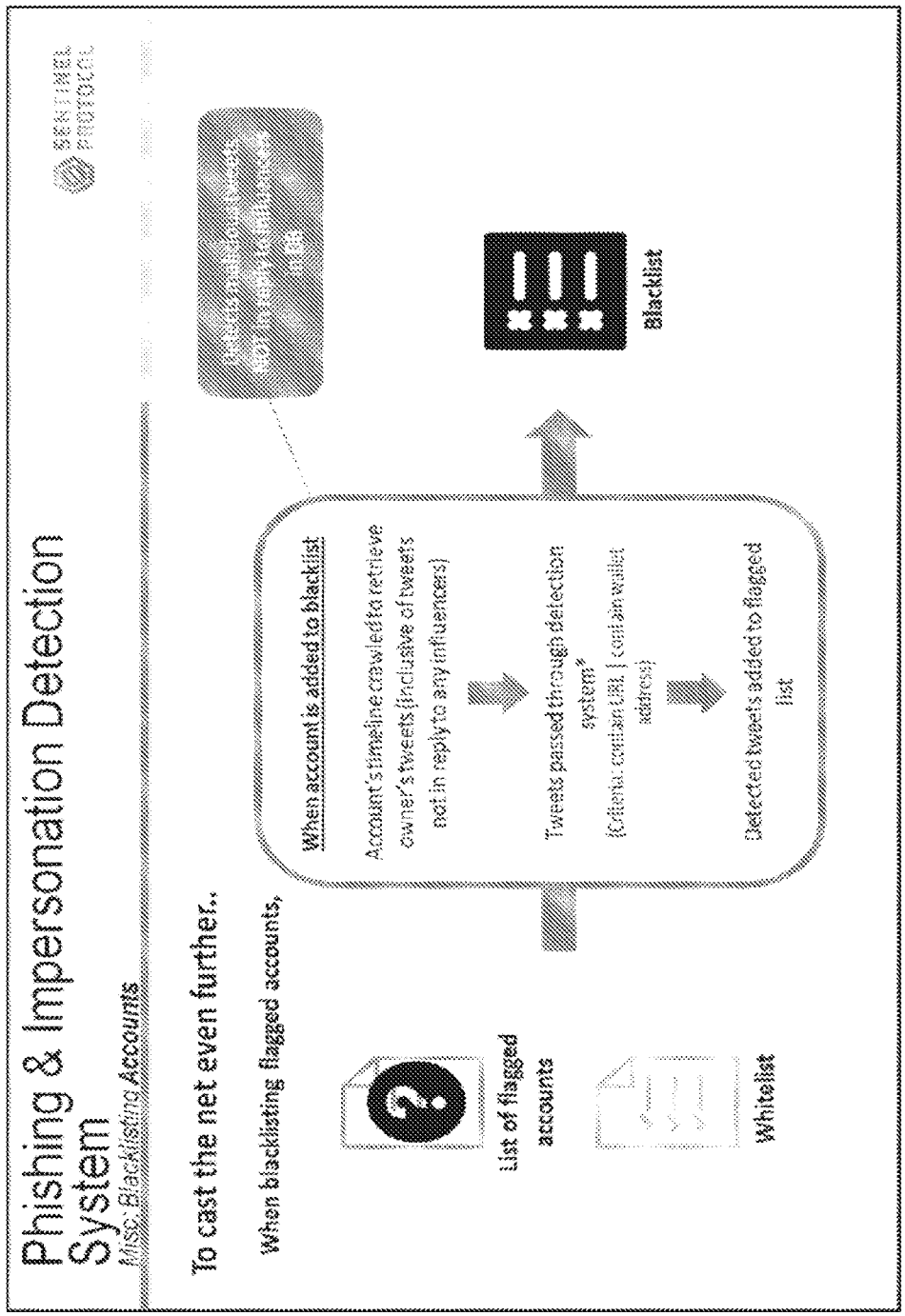

In one example, and with reference to FIG. 10C, further investigation is performed on a flagged twitter account after the flagged twitter account is blacklisted. Specifically, the twitter crawler system is configured to crawl all tweets of the newly-blacklisted twitter account. Advantageously, the twitter crawler system is able to uncover malicious tweets that are not replying to tweets by influencers stored in the TRDB. Similar steps (e.g. detecting a URL or a wallet address in a tweet) that have been discussed with reference to FIG. 8A and FIG. 9 can be implemented to identify malicious tweets of the newly-blacklisted twitter account. If it is determined that a tweet of a newly-blacklisted account is likely to be suspicious, the tweet is flagged for further investigation by the Sentinels. Alternatively, the suspicious tweet can be updated in the TRDB as a malicious tweet. It should be appreciated that tweets replying to tweets by influencers that have been processed by the twitter crawler system can be skipped for efficiency.

The detection criteria used for determining whether a retrieved tweet of the newly-blacklisted twitter account is malicious can be different because the chance of a tweet of a blacklisted account being malicious is higher. For instance, the threshold used for comparing with the computed test score may be varied.

The phishing and impersonation detection system (or the twitter crawler system) may provide a dashboard containing key performance indicators, such as the 10 indicators (beginning with "1) #Legitimate imposters found to date" and so on) in FIG. 10B. The dashboard may be in a presentable format that includes charts and the like.

Examples relating to the use of sentinel protocol on a phishing and impersonation detection system are shown in FIGS. 4-7, FIGS. 8A-8I, FIGS. 9A-9E and FIG. 10A-D. It should be appreciated that the techniques disclosed here can be used on other social networking platforms, such as Facebook. Various modifications can also be made to an alert sent to a user when malicious data is detected online. In one example, the alert can be displayed as a pop-up window or indicated as a safe bar on a web browser page. A safe bar used herein can refer to the browser's navigation bar that is highlighted according to a detection result or a bar arranged in proximity (e.g. below, left, right or above) of the browser's navigation bar for showing a warning message or displaying a colour indication of the detection result (e.g. green for safe websites, and red for malicious websites). Other arrangements of alert display can be illustrated in FIGS. 16A, 16B, 17A, 17B and 18.

Some examples of predefined settings used to modify the display of such alert are shown in FIGS. 11 to 15. As an example, the safe bar setting, black list setting, and annotation setting for twitter badge or crypto for an alert can be modified. In one example, and with reference to FIG. 14, location and color of a safe bar (when displayed) can be customized to user preferences.

Figure 11:
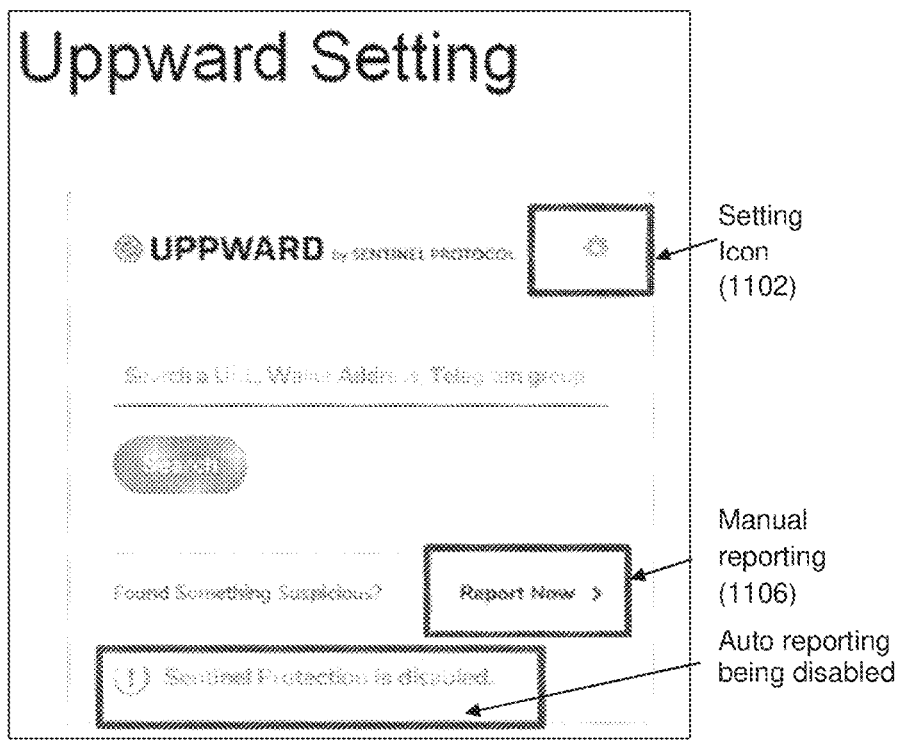
FIGS. 11 to 15 show some examples of predefined settings used to modify the display of an alert displayed to a user when using an API of the Sentinel Protocol.
Figure 12:
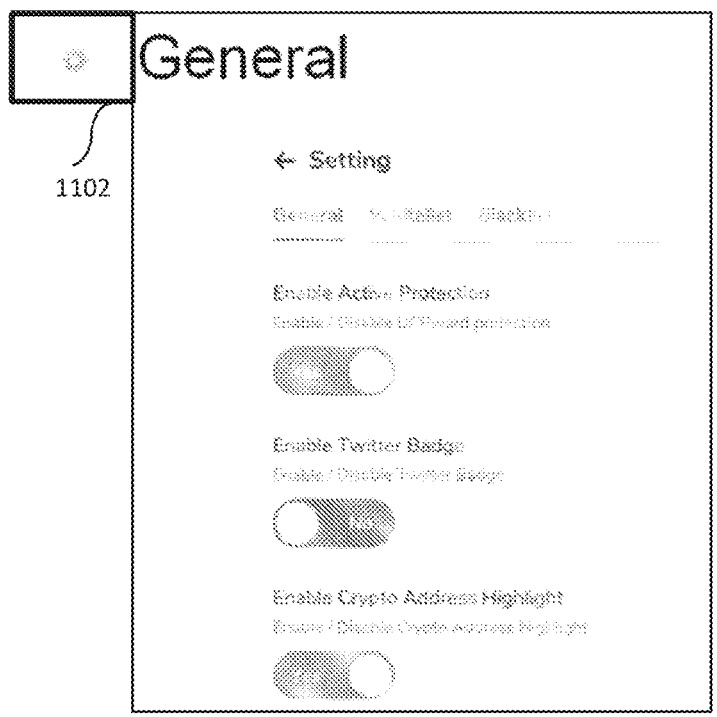
Figure 13:
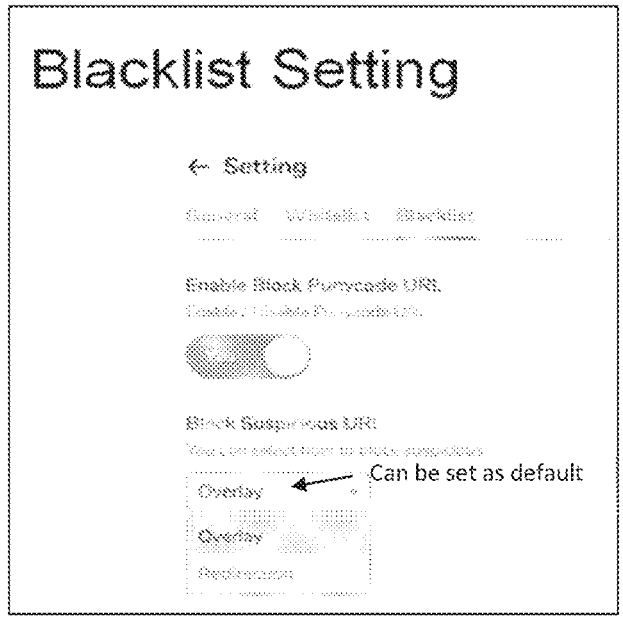
Figure 15:
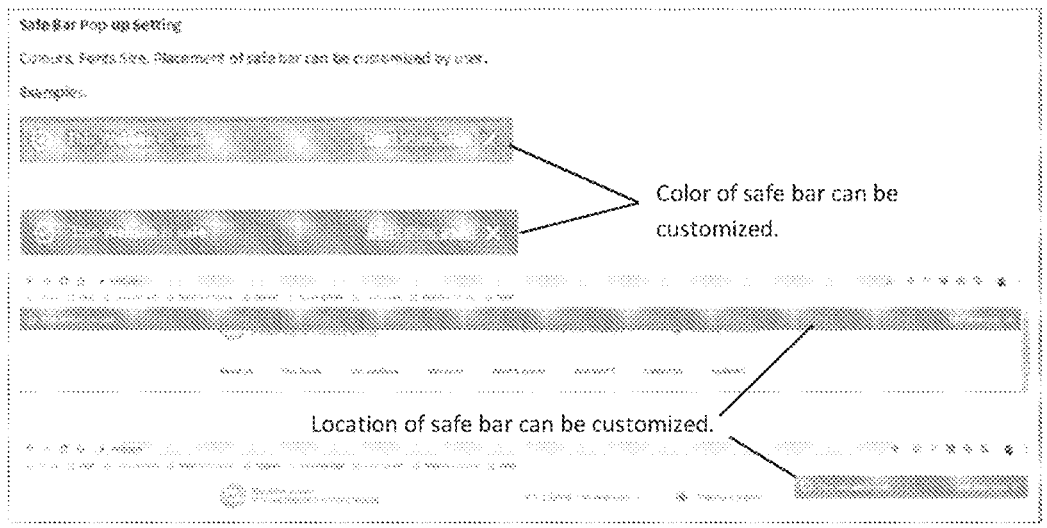
Figure 14:
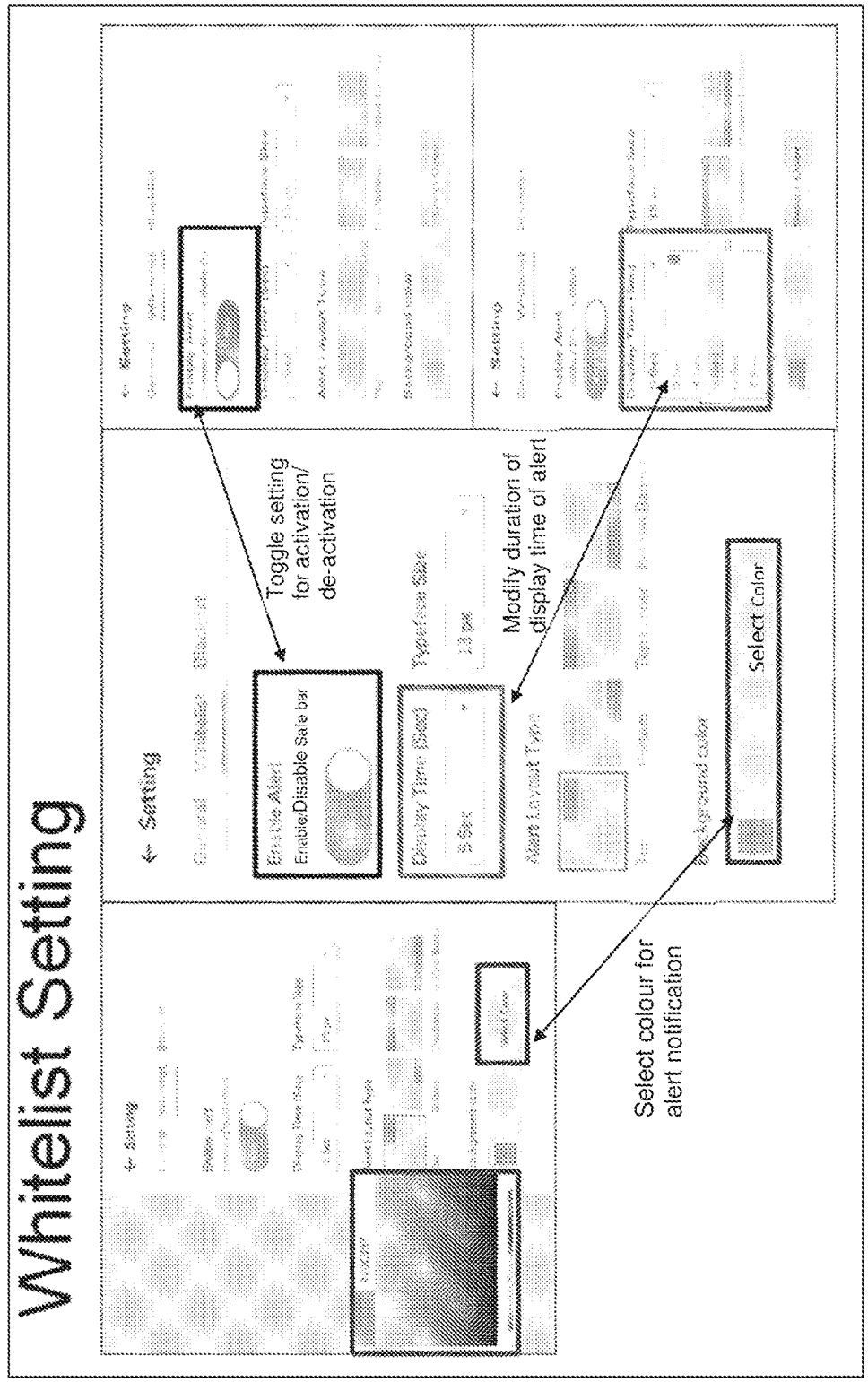

FIG. 11 is an example of a web plug-in for implementation on a browser. It can be seen that auto reporting mode is being disabled. There is provided a selection button 1106 for a user to report suspicious threat activity manually. In addition, there is a setting button 1102 for a user to enable automatic protection, and/or modify the safe bar setting, black list setting, and annotation setting for twitter badge or to highlight a crypto wallet address as an alert. As shown in FIG. 12, there are provided toggle buttons for enabling twitter badge (e.g. 1705 in FIG. 17A), and for enabling highlighting of a crypto wallet address.

1. Safe bar setting (See FIGS. 14 and 15):
   a. Option to make the safe bar disappear automatically at the specified time (i.e. Default 5 seconds display).
   b. Modification of the safe bar layout. (Top, bottom, top banner, or bottom banner)
   c. Size Change of the Safe bar.
   d. Color Change of the safe bar.
   e. Toggle on/off for disabling the safe bar function.
   f. The disappearance time can be defined in a whitelist tab.
2. Annotation—Twitter Badge
   a. Add a Twitter Badge next to Twitter users. It should be appreciated that the twitter badge added next to Twitter profile name when using the Twitter Crawler API is different from a security badge (e.g. 605 in FIG. 6) provided by the Twitter service provider. The security badge provided by the Twitter service provider is issued (after verification) at a request of a user. However, a malicious actor who owns a bogus (fake) twitter account is unlikely to request from the Twitter service provider to issue the security badge. This means the general public cannot discern a bogus twitter account with an authentic twitter account.

Figure 17A:
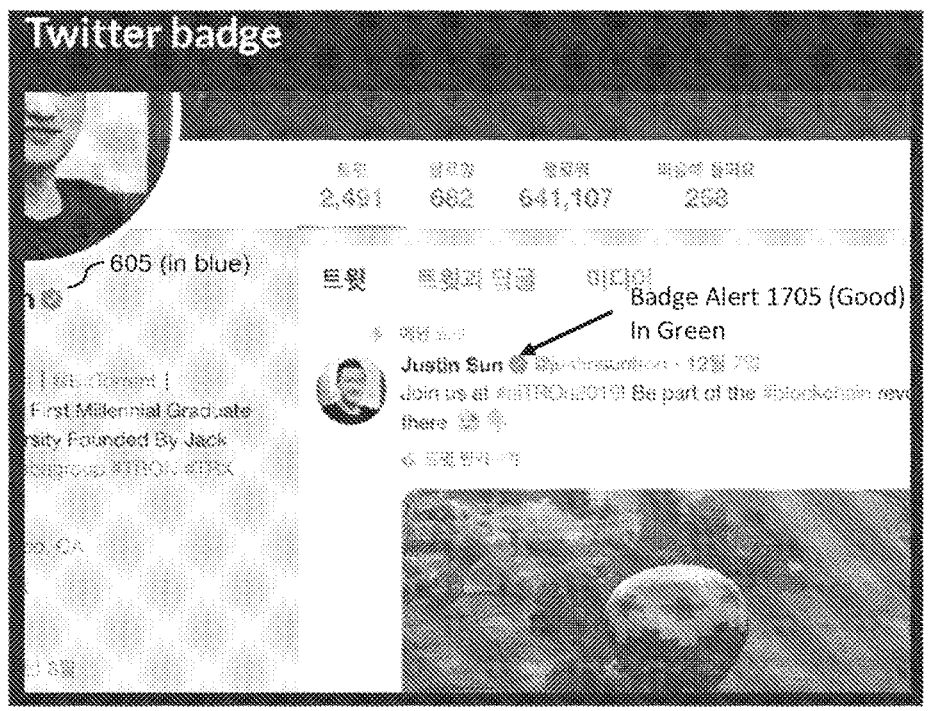
FIGS. 17A and 17B show how a twitter badge can be implemented for indicating an impersonated account and an authentic account respectively in accordance with an example of the present disclosure.
Figure 17B:

With reference to FIGS. 17A and 17B, the twitter crawler API provides a badge 1705 to all influencer accounts that are being monitored (stored in the TRDB) and the accounts who are replying to any of the influencer accounts. The profile name in the legitimate influencer account is "Justin Sun", and the corresponding handler is "@justinsuntron". In comparison, the profile name of the bogus twitter account (imitating the legitimate influencer account) is "Justin Sun@justinsuntron" and the handler of the bogus twitter account is not shown to the reader. This misleads a reader to think that this bogus account has the actual handler of the legitimate influencer account.

The color indication of the badge 1705 reflects the present status of the twitter account in the TRDB, hi one example, the badge is green for whitelist and red for Blacklist. In another example, the twitter accounts that have not been checked with the Threat Reputation Database can be represented by a yellow badge (not shown in figures).
   b. Syncing data into TRDB.
   c. Clicking on Twitter Badge takes you to the indicator detail screen 1707 of the portal.

Figure 18:
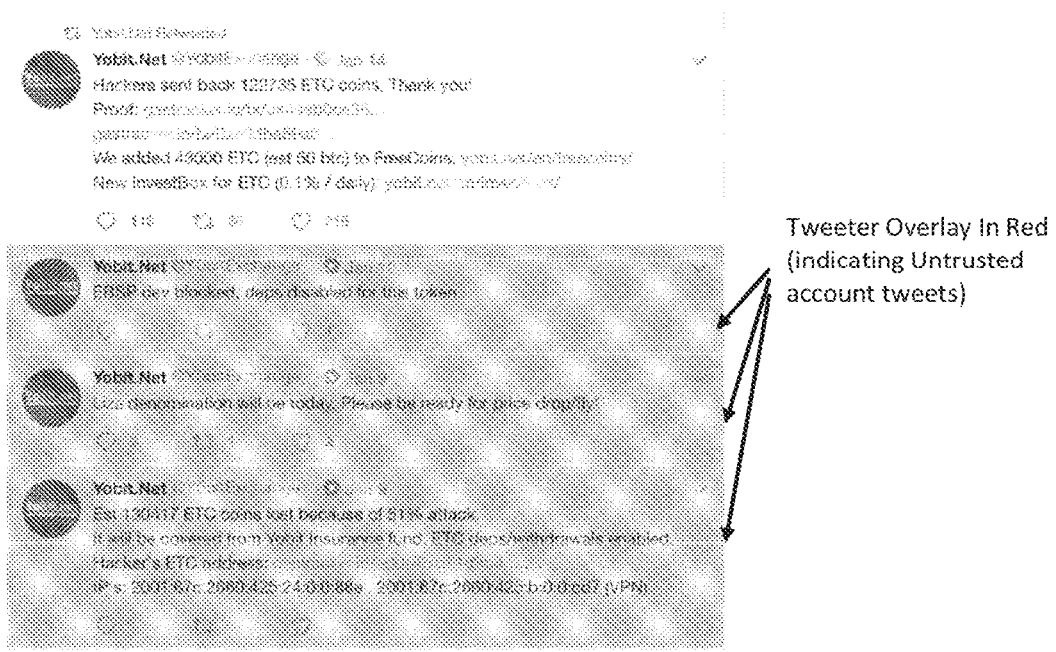
FIG. 18 shows how an overlay can be implemented on a tweeter post to indicate that there is malicious content in the post in accordance with an example of the present disclosure.

Utilizing the whitelisted and blacklisted Twitter Data in the TRDB, other than displaying a badge can be displayed in proximity to the profile name to indicate to a user that the associated twitter account is trusted/untrusted, an overlay may also be used. For example, as shown in FIG. 18, an untrusted account has a red colour filter overlayed on the untrusted account tweets. In one implementation of such filter overlay, the overlay that highlight to the user about the untrusted tweets can also apply to re-tweets. This filter may be configured to display as any colour other than red colour (default).

3. Whitelist:
   a. Safe Bar (on/off)
   b. Displaytime (sec)
   c. Popup Layout Type (top, bottom)
   d. Typeface Size
4. Blacklist (FIG. 13):
   a. Instead of Overlay (i.e. default setting), redirection is also possible.
   b. Include a new Punycode URL block function. If a user would to type in the address bar to go to the Punycode URL, the Sentinel Protocol can block or overlay it immediately. It should be noted that many phishing websites uses Punycode.

Optionally, the Sentinel Protocol is configured to detect on-page malicious crypto wallet addresses. Optionally, the Sentinel Protocol is configured to allow users to select page redirection if they reached a blacklisted site.

5. Case Registration button (Report Now)
   a. Put the case registration button on the front It is also possible to include filehash support for malware protection on the Sentinel Protocol. For instance, the filehash support may include MD5 and SHA256 filehash support for malware payload detection. Data in the Blockchain network based on the Sentinel Protocol may be hashed according to these filehash techniques.

Further features of an example of the proposed apparatus and method for cybersecurity are as follows.

Crypto Analysis Risk Assessment (CARA)

Malicious actors have been using cryptocurrencies extensively for money laundering activities due to its inherent properties like pseudonymity and difficulty in tracing their transactions across multiple hops in their respective blockchain systems/networks. Thus, cryptocurrency transactions are a lucrative avenue for malicious actors to operate, and this results in public dissent for use of block chain technologies.

The proposed apparatus and method for cybersecurity described in the present disclosure may further comprise a method for identifying malicious wallets used by malicious actors within a cryptocurrency ecosystem, such as an Ethereum ecosystem. In one example of the method, such malicious wallets are identified only from the nodes in the same blockchain network. A 2-class anomaly detection algorithm, also termed as the Crypto Analysis Risk Assessment (CARA) algorithm in the present disclosure, is proposed to be used in the method.

CARA Algorithm

CARA algorithm learns behaviour exhibited by known malicious wallets and normal wallets, in order to look for similar patterns in unknown wallets to classify them as malicious, highly suspicious, suspicious or normal wallets. The CARA algorithm is considered as a 2-Class anomaly detection algorithm because artificial intelligence in the CARA algorithm is configured to learn the behaviour of both malicious and normal wallets, which is more efficient in comparison to another possible 1-Class algorithm that learns mostly only from normal wallets and then work out what may be suspicious wallets after the learning.

There are some differences in the behavioural patterns of a malicious wallet and a normal wallet. Malicious wallets involved in activities such as scam, phishing, ransomware campaign try to evade tracking by relevant authorities by distributing their tokens through multiple intermediate wallets over multiple hops. In a blockchain, a hop is a connection between two nodes, which represents a transaction between the two nodes. The transaction involved can be the purchase or sale of tokens. In the present disclosure, "tokens" or "token" refer to a native coin of a cryptocurrency of a blockchain or a secondary token created in the blockchain. In the case of Ethereum, its native coin is ether, and a secondary token can be another means for transaction that is built in the Ethereum blockchain. Such secondary token begins with zero value and its subsequent value is determined by its supply and demand in the market (e.g. after trading in Exchanges).

Distribution of tokens by malicious wallets often includes many instances of continuous splitting of received tokens into smaller amounts, which are later aggregated many hops away. This distribution is performed by the malicious actors in order to make it difficult to track the transactions from malicious wallets to exchanges. In this manner, the malicious actors can successfully encash the collected ether or tokens and the like. Malicious actors can also employ service-providers, such as cryptocurrency tumblers or mixers, which offer services that work in the same way as described above to obscure the trail back to the fund's original source.

In contrast, a normal wallet such as a trading wallet, or a mining wallet will rarely use such obfuscation techniques to cover their tracks and will mostly transact with exchanges or other services (smart contracts) directly or through a fewer number of hops (as compared to the behaviour of a malicious wallet). Hence, by learning the obfuscation patterns employed by malicious actors, the CARA algorithm can identify malicious wallets and intermediate malicious wallets used by the malicious actors for multiple hops of relay and blacklist these wallets. For instance, the blacklisting can be performed by sending a report on malicious activity through the Sentinel Protocol, or through automatic updating of the blacklist records of the TRDB.

Figure 19A:
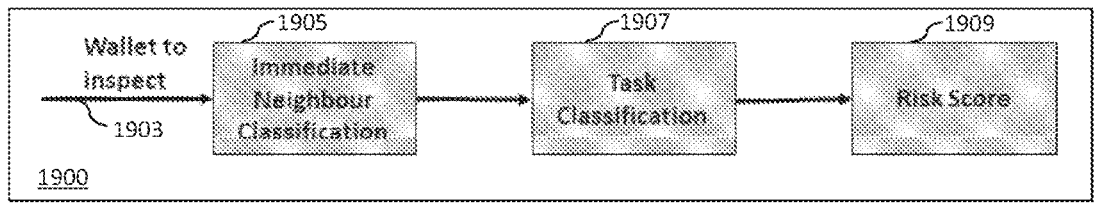
FIG. 19A illustrates 3 functions of a Crypto Analysis Risk Assessment algorithm.

In one example, illustrated by FIG. 19A, there is a flowchart 1900 illustrating the CARA algorithm. In a first step 1903, an input from a user, a machine or an input from a database is received to inspect a particular cryptocurrency wallet to determine a likelihood of anti-money laundering (AML) activity for the inspected wallet. The CARA algorithm has 3 functions 1905, 1907 and 1909 to compute a risk score indicative of a probability that the inspected wallet is a malicious wallet. In the present example, higher risk score refers to higher probability that the inspected wallet is malicious. In this example, a processor may be configured to execute instructions in a memory to perform the 3 functions of the CARA algorithm. The 3 functions are described as follows.

Function 1 1905: Immediate Neighbour Classification

Function 1 1905 performs classification of immediate neighbour wallets of the inspected wallet to indicate whether they are non-malicious wallets, suspicious wallets or malicious wallets. An immediate neighbour wallet refers to an immediate source neighbour wallet sending tokens to the inspected wallet or immediate destination neighbour wallet receiving tokens from the inspected wallet. After obtaining information of a block chain transaction, for example, a wallet address of the inspected, a transaction hash, a transaction identifier, and the like, the CARA algorithm maps out one or more immediate neighbour wallets which were directly involved in at least one transaction with the inspected wallet.

Figure 19B:
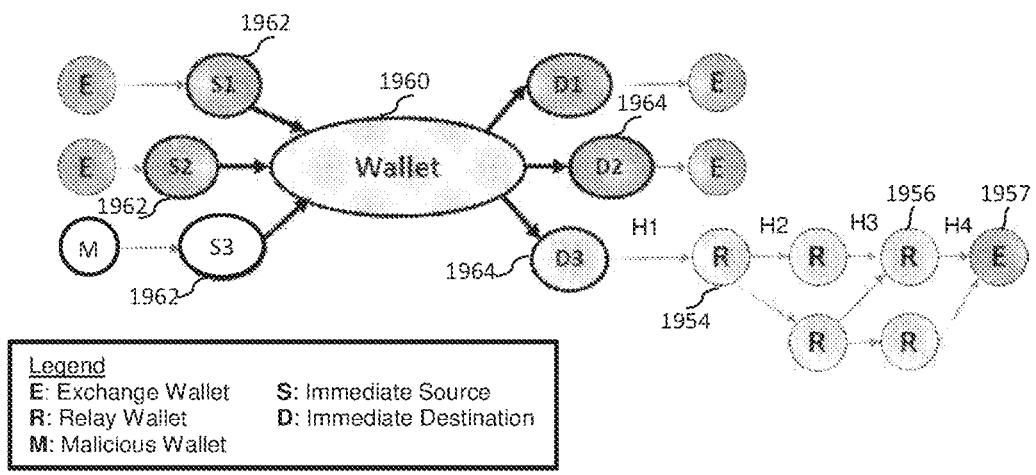
FIG. 19B shows a map showing a transaction flow stemming from an inspected wallet and introduces features of the map.

FIG. 19B shows a map defining transactional paths of the inspected wallet 1960 and those of its immediate neighbour wallets 1962 and 1964. The map is generated for a predefined time period. During this period, transactions occurring between every two wallets are represented as one arrow indicating direction of net flow of tokens in the map. If in the predefined time period, there are several transactions between two specific wallets, the final net transacted amount between the two wallets would be calculated and the direction of the arrow will be configured accordingly. Immediate neighbour wallets include immediate source wallets 1962 involved in upstream transaction of the inspected wallet 1960 and immediate destination wallets 1964 involved in downstream transaction of the inspected wallet 1960. Such map is generated by the Function 1 1905 for purposes of identifying trends of malicious activity in the transactional paths of the inspected wallet 1960. Specifically, FIG. 19B shows the inspected wallet 1960, immediate neighbour source wallets 1962 of the inspected wallet 1960 labelled as S1 to S3, and immediate destination wallets 1964 of the inspected wallet 1960 labelled as D1 to D3. In FIG. 19B, Wallets marked as R refers to relay or relaying wallets downstream of D3 that are involved in splitting or aggregation of tokens prior to transaction with an exchange. Wallets marked as E refers to Exchange Wallets belonging to Exchanges that typically pool tokens from various source wallets for transactions. The term "Exchange" in the present disclosure refers to a service provider for facilitating transactions of tokens, which can be done off-chain or on-chain. When done off-chain, the Exchange is deemed as a centralised Exchange. When done on-chain, the Exchange is deemed as a decentralised Exchange (DEX). Wallet marked as M is a malicious wallet already known (i.e. its information are available), for example, it is listed in the blacklist of the Threat Reputation Database (TRDB). The TRDB can be a decentralised database built on a block chain (e.g. 110 of FIG. 1).

The CARA algorithm takes into consideration as a parameter, number of hops, stemming from the immediate neighbour wallets 1962 and 1964 (i.e. S1 to S3 and D1 to D3). For example, starting from D3, there are 4 hops H1 to H4 to an Exchange Wallet E. The CARA algorithm also takes into consideration as a parameter, a factor of splitting or aggregation of tokens, for every wallet. For example, a relay wallet 1954 in FIG. 19B is deemed to have 2 factors of splitting, which is calculated by the ratio of the number of output transactions (i.e. 2 in this case) vs the number of input transactions (i.e. 1 in this case). A relay wallet 1956 in FIG. 19B is deemed to have 2 factors of aggregation, which is calculated by the ratio of the number of input transactions (i.e. 2 in this case) vs the number of output transactions (i.e. 1 in this case). Information of the inspected wallet 1960 and/or the other wallets in FIG. 19B can be retrieved for instance using a blockchain explorer application. A blockchain explorer application herein refers to an application that acts like a search engine for viewing and querying a blockchain to allow a user to retrieve transaction information about a wallet or node in the blockchain and track transactions of the wallet or node. An example of a blockchain explorer for ethereum is bloxy.info. One can make use of bloxy Application Programming Interfaces (API) to send filtered queries to retrieve information for one or more nodes in the ethereum blockchain.

The map of FIG. 19B is generated for up to 5 hops downstream from the immediate destination wallets 1964, D1 to D3, in the present example. The upstream transactions of the inspected wallet 1960 are limited to 1 hop away from the immediate source wallets 1962, S1 to S3, to avoid unnecessary tracking. Notably, once a transaction hits an exchange (i.e. exchange wallet E), it is not necessary to track further transactions because the tokens (which includes ether or a secondary token) are mostly encashed. If further tracking of transactions is conducted from an exchange wallet E, there is a risk of examining tracks that a malicious attacker never took. For instance, in the example of FIG. 19B, the tracking of transactions downstream of D3 stops at 4 hops because it hits an exchange 1957. Furthermore, in the creation of the CARA algorithm, it has been discovered that most malicious activities are typically conducted within 5 hops away. Details on this discovery would be explained later. In the example of FIG. 19B, immediate source neighbour wallets S1 and S2 received tokens through direct transactions from exchange wallets. Such behaviours of S1 and S2 are deemed by the CARA algorithm to be similar to a normal wallet (i.e. non-malicious wallet). However, the immediate source neighbour wallet S3 is deemed by the CARA algorithm to be a malicious wallet S3 as this wallet S3 directly interacts with a known malicious wallet M, which is listed in a blacklist of the TRDB.

To prevent unnecessary tracking (and computing/processing) of malicious activity in a particular map such as the one generated in FIG. 19B, a list of stopping mechanism criteria to stop tracking is proposed as follows:
1. Encountering Known Exchange and DEX wallets (E);
2. Encountering Known Malicious Wallets (M) blacklisted in the TRDB; and
3. Encountering Wallets with abnormally high number of transactions that could mimic the behaviour of exchanges or DEX.

In the cryptocurrency space, many exchanges or similar services tend not to publicly disclose their wallet addresses to users. Hence, one cannot tell whether a particular wallet address belongs to an exchange or similar service. However, they can be identified based on a similar characteristic, that known exchanges also have. Such characteristic is that there is abnormally large number of transactions with immediate neighbour wallets. From a research conducted in the creation of the CARA algorithm, it was identified that this number of immediate neighbour wallets is at least 10,000 to regard an unknown wallet as mimicking a very active exchange, and the number of immediate neighbour wallets is at least 500 to regard an unknown wallet as mimicking a less active exchange. These numbers were learnt from a training dataset comprising immediate neighbour statistics of known exchange wallets found in extended paths of known malicious and normal wallet instances that is used for machine learning to establish various features of the CARA algorithm.

Back to the example of FIG. 19B, similar to the analysis performed on the upstream transactions from the immediate source neighbour wallets 1962, the same analysis is performed for the immediate destination neighbour wallets 1964. The downstream transactions from D1 and D2 are considered to be normal and D1 and D2 should be regarded as normal wallets (i.e. non-malicious wallets) because they transact directly with an exchange (i.e. exchange wallet E). However, D3 is deemed by the CARA algorithm as suspicious because tokens were sent from the immediate destination neighbour wallet D3 to an exchange wallet E by relaying through intermediate wallets that has some aggregation and splitting of tokens. This form of token relaying via several relay wallets R is deemed to be suspicious as it exhibits obfuscation techniques used by malicious actors. Consequently, the immediate destination neighbour wallet D3 is flagged as a suspicious wallet by the CARA algorithm.

During token relaying, malicious actors can use different types of relaying wallets to launder tokens to an exchange wallet. One type of relaying wallet is often found near immediate neighbour wallets 1962 and 1964 (e.g. S1 to S3 and D1 to D3), specifically about 1 or 2 hops away from the immediate neighbour wallets 1962 and 1964. This type of relay wallet often has very few immediate neighbour wallets, specifically less than or equal to 10 since they are in close proximity with the main malicious wallet. In the CARA algorithm, such relaying wallets are classified as low transaction relay wallets RL. Another type of relay wallet can be found further away from the immediate neighbour wallet 1962 and 1964 (e.g. S1 to S3 and D1 to D3), specifically about 3 or more hops away from the immediate neighbour wallets 1962 and 1964. Such relay wallets will start aggregating tokens that were split previously by low transaction relay wallets RL found in earlier hops. Hence, these relay wallets will start to interact with many wallets, specifically greater than 10 and less than 500. This type of relay wallet is classified as a medium transaction relay wallet RM. As for relay wallets with 500 transactions and above, they would be regarded as exchange wallets by the CARA algorithm.

During operation, the CARA algorithm looks into each path both from immediate destination wallets 1964 and immediate source wallets 1962 in an inputted map such as the one shown in FIG. 19B. Specifically, the CARA algorithm looks out for suspicious paths, for example, the downstream transactions of D3 are suspicious. Such suspicious paths are identified by the CARA algorithm based on characteristics learnt from machine learning. Applying principal component analysis, the characteristics that resemble different obfuscation techniques employed by malicious actors are learnt from a training set during the machine learning stage. For example, the characteristics may be as follows.

Figure 20A:
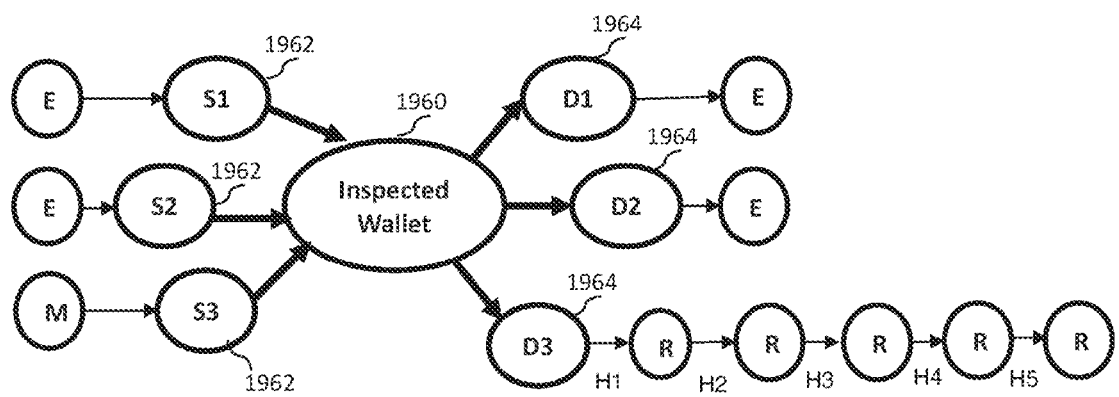
FIGS. 20A to 20F show maps having different permutations of transaction flow stemming from an inspected wallet that may determine an immediate neighbor wallet of the inspected wallet in a blockchain to be malicious, non-malicious or suspicious.
Figure 20B:
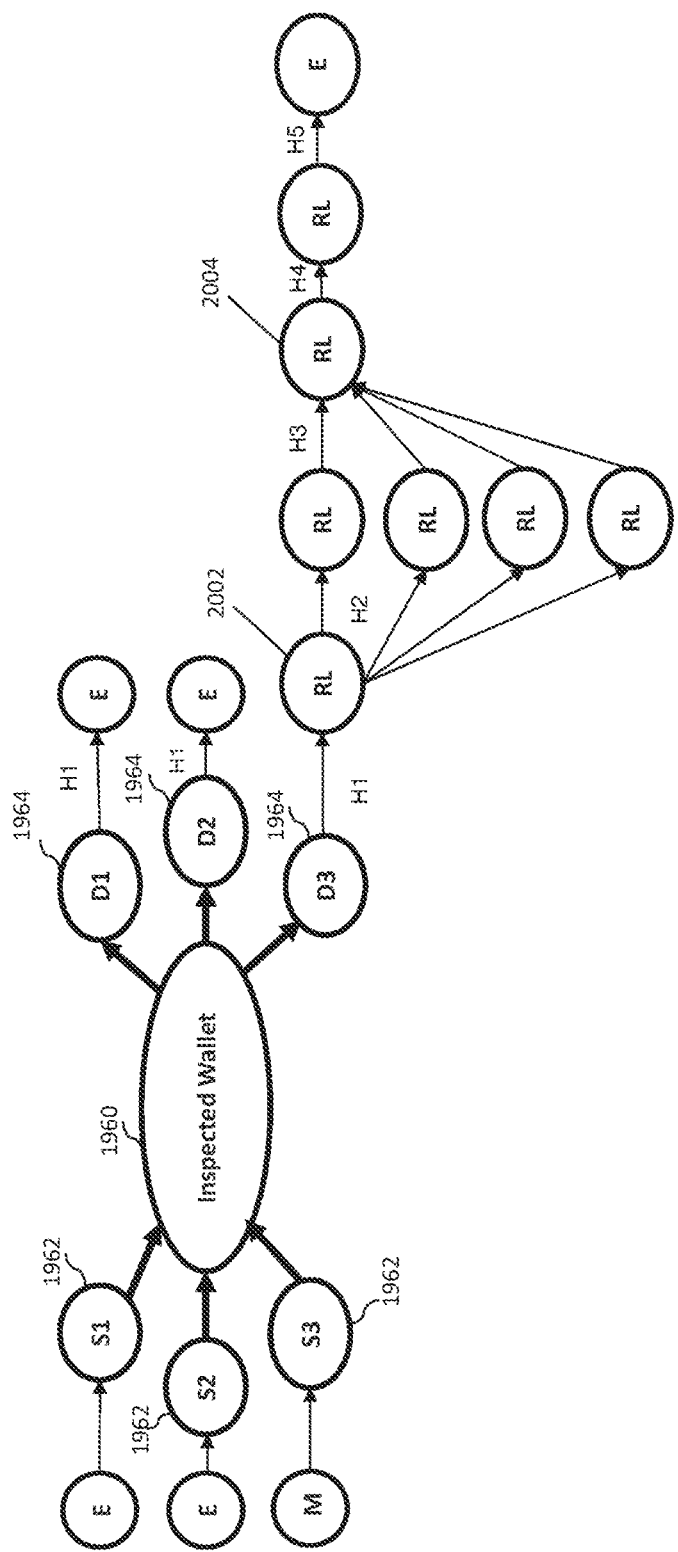
Figure 20C:
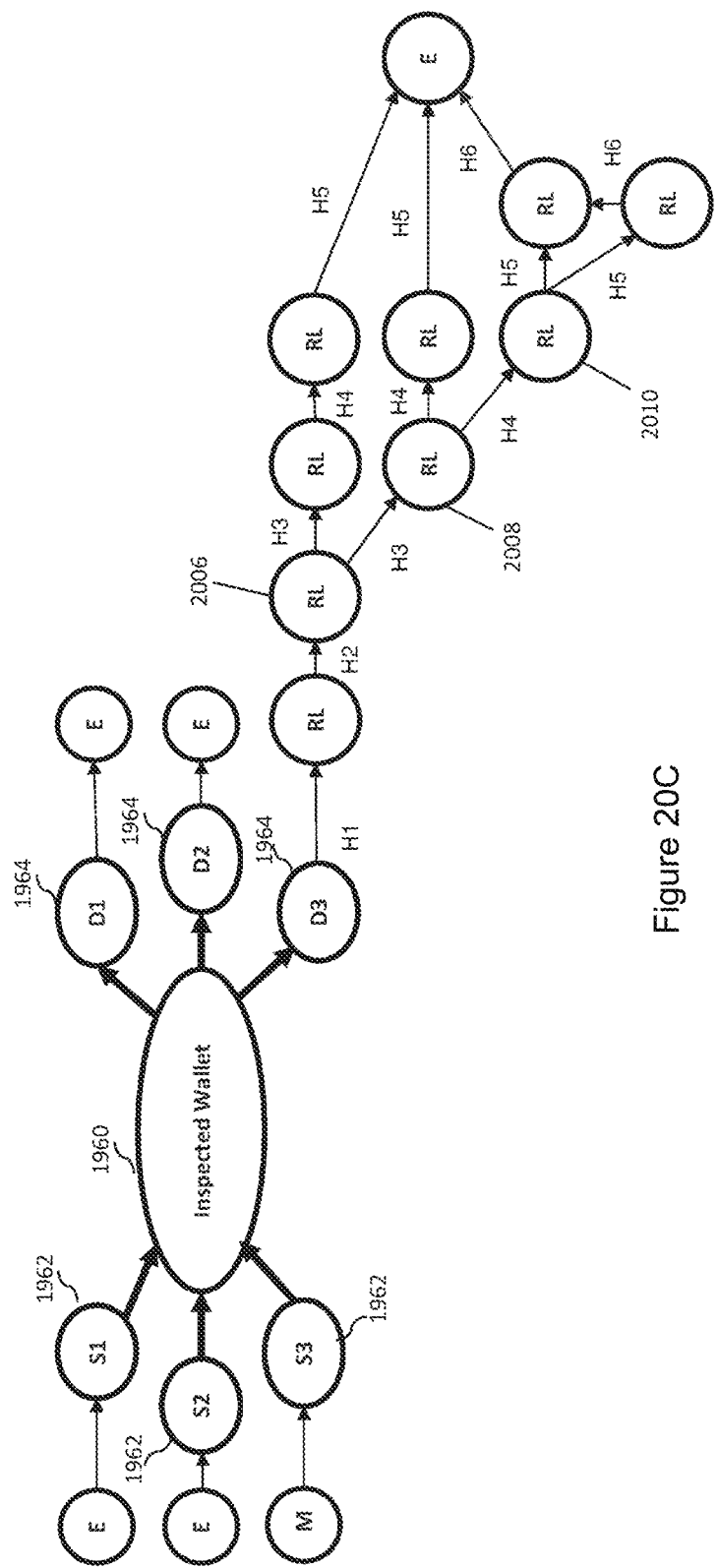
Figure 20D:
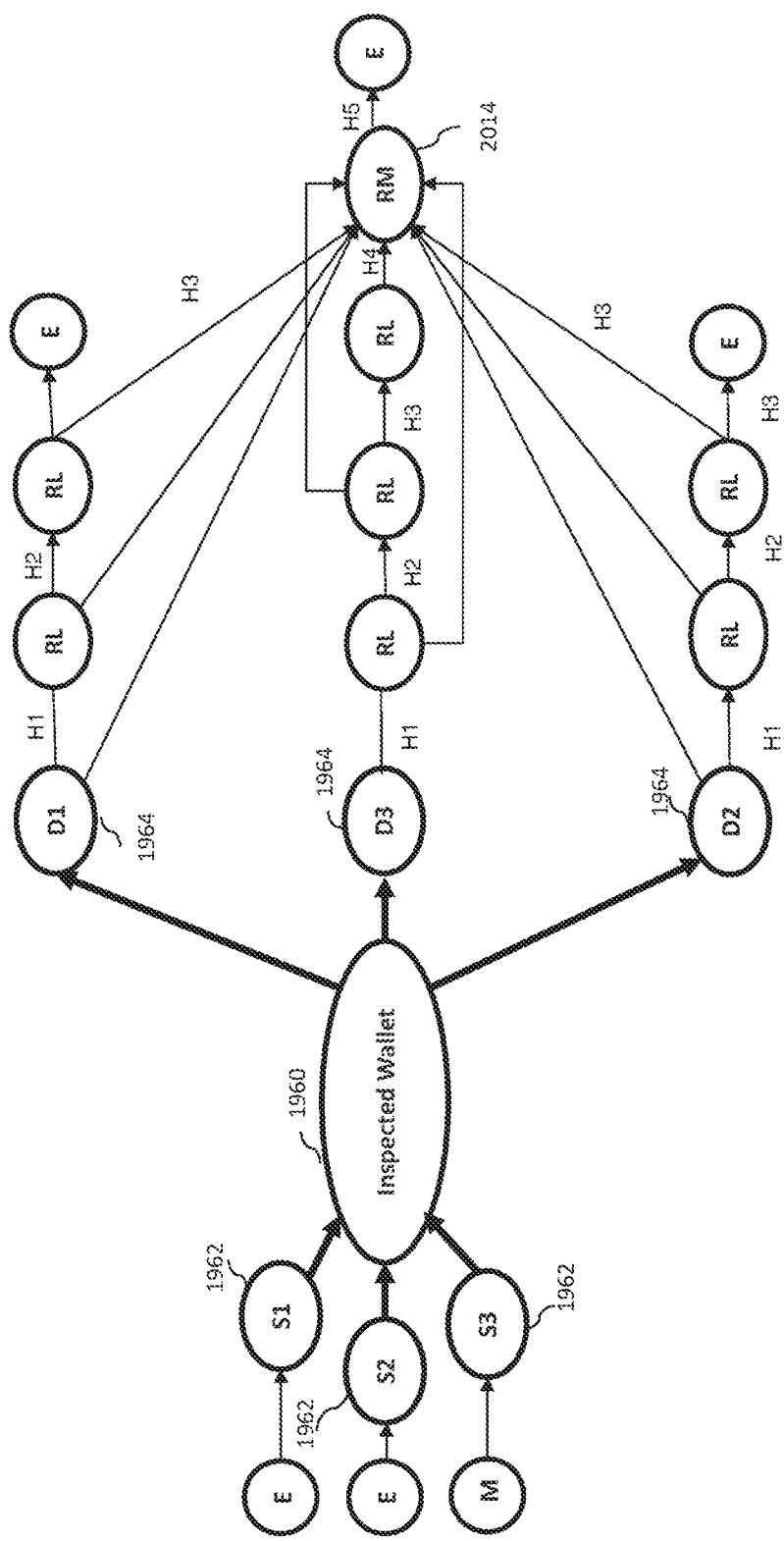

1. At least 5 hops, from an immediate source 1962 or destination wallet 1964 of an inspected wallet 1960, of direct relaying without aggregation or splitting of tokens. To illustrate this characteristic, see for example upstream transactions of a wallet D3 in FIG. 20A, which would be deemed as suspicious under this characteristic by the CARA algorithm. The upstream transactions of D3 involve 5 hops from D3 of direct relaying.
2. At least 4 hops, from an immediate source 1962 or destination wallet 1964 of an inspected wallet 1960, of relaying with at least 4 factors of splitting or aggregation of tokens by a low transaction relay wallet RL. To illustrate this characteristic, see for example upstream transactions of a wallet D3 in FIG. 20, which would be deemed as suspicious under this characteristic by the CARA algorithm. The upstream transactions of D3 involve at least 4 hops of relaying from D3. Specifically, the upstream transaction path of D3 has a maximum of 5 hops from D3 to an exchange wallet E, which meets the criterion of at least 4 hops from D3. Furthermore, in the transaction path, there is involved an RL 2002 with 4 factors of splitting (i.e. 4 outputs vs 1 input) and another RL 2004 with 4 factors of aggregation (i.e. 4 inputs vs 1 output).
3. At least 4 hops, from an immediate source 1962 or destination wallet 1964 of an inspected wallet 1960, of relaying with at least 8 factors of splitting or aggregation of tokens by a medium transaction relay wallet RM. To illustrate this characteristic, see for example upstream transactions of a wallet D3 in FIG. 20D, which would be deemed as suspicious under this characteristic by the CARA algorithm. The upstream transactions of D3 involve at least 4 hops of relaying from D3. Specifically, the upstream transactions of D3 have a maximum of 5 hops from D3 to an exchange wallet E, which meets the criterion of "at least 4 hops of relaying from D3". Furthermore, in the transaction path of these 5 hops, there is involved an RM wallet 2014 with 9 factors of aggregation (i.e. 9 inputs vs 1 output), which is more than the threshold of 8 factors of aggregation.

4. At least 3 hops, from an immediate source 1962 or destination wallet 1964 of an inspected wallet 1960, of relaying with at least 2 factors of aggregation or splitting of tokens that involves a minimum of 2 relay wallets (RL and/or RM). To illustrate this characteristic, see for example upstream transactions of a wallet D3 in FIG. 20C, which would be deemed as suspicious under this characteristic by the CARA algorithm. The upstream transactions of D3 involve at least 3 hops of relaying from D3, and in the transaction path, there is involved at least 2 relay wallets with at least 2 factors of aggregation or splitting of tokens. Specifically, in FIG. 20C, there is a minimum of 5 hops in the transaction path from D3 to an exchange wallet E, which is more than the criterion of "at least 3 hops of relaying from D3". The criterion of "at least 2 relay wallets with at least 2 factors of aggregation or splitting of tokens" is met in FIG. 20C because, in the transaction path to the exchange wallet E, there is included 3 RLs, each with 2 factors of splitting of tokens. Specifically, an RL 2006 with 2 factors of splitting (i.e. 2 outputs vs 1 input), an RL 2008 with 2 factors of splitting (i.e. 2 outputs vs 1 input), and an RL 2010 with 2 factors of splitting (i.e. 2 outputs vs 1 input).

5. Single instance of at least 10 factors of aggregation or splitting of tokens just before or after an exchange wallet that involves a minimum of 2 relay wallets. To illustrate this characteristic, see for example upstream transactions of a wallet D3 in FIG. 20F, which would be deemed as suspicious under this characteristic by the CARA algorithm. The upstream transactions of D3 have a transaction path of 3 to 4 hops to an exchange wallet E. In the transaction path to the exchange wallet, there are involved at least 2 relay wallets, in which one of the 2 relay wallets, RM wallet 2016, has 10 factors of aggregation (i.e. 10 inputs vs 1 output) just before transacting with the exchange wallet E.

Figure 20E:
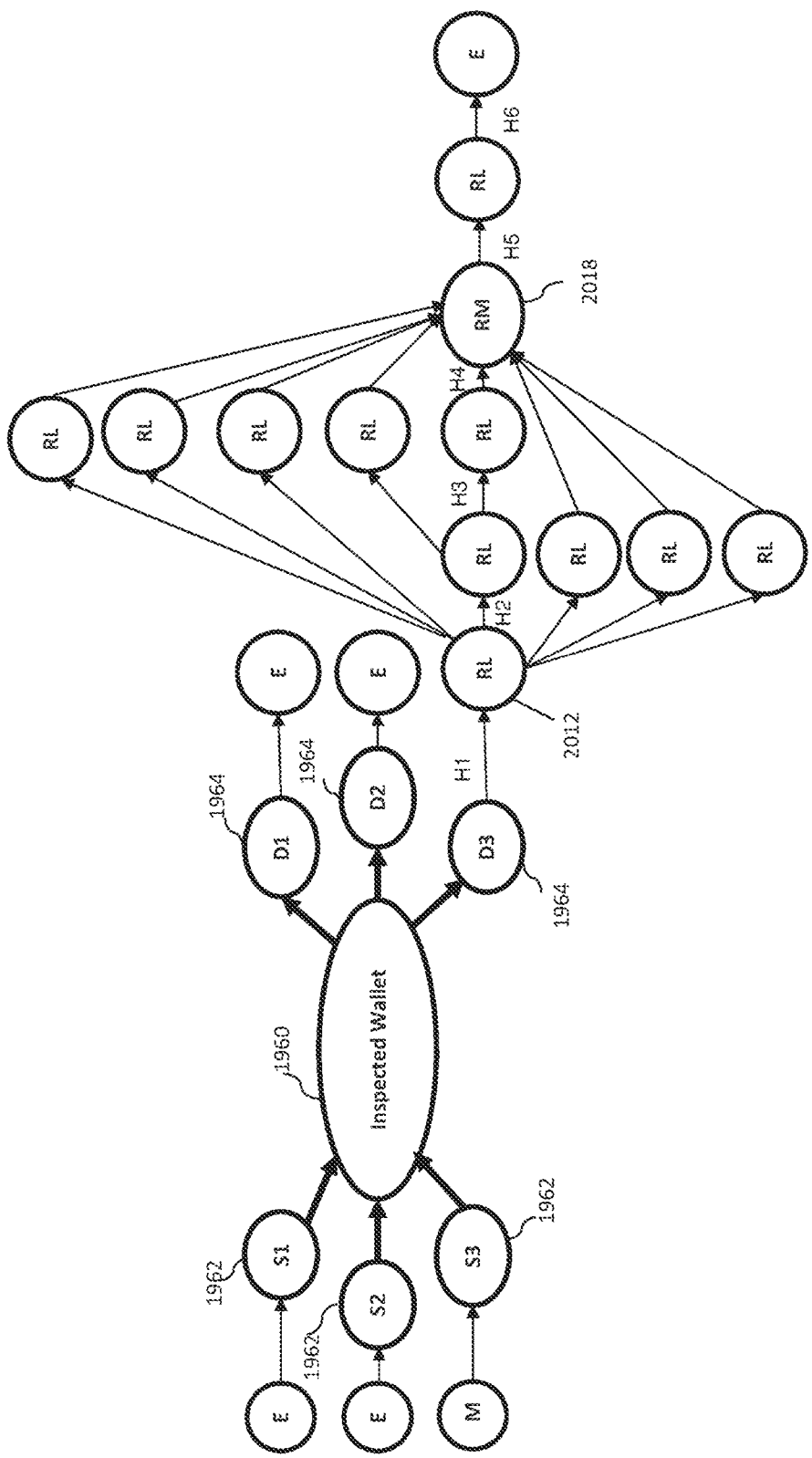
Figure 20F:
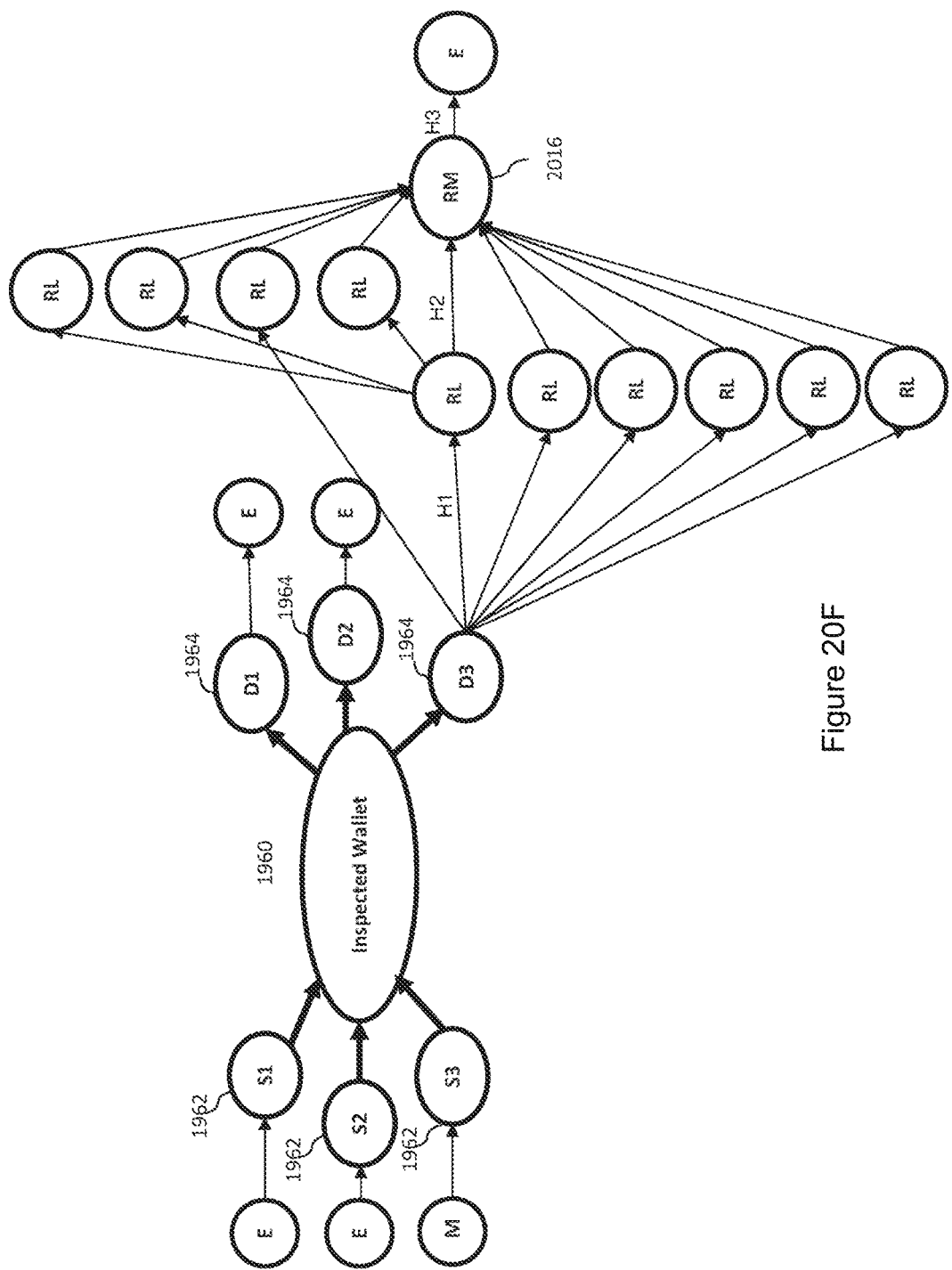

FIG. 20E illustrates a scenario in which the characteristics defined by 2 and 3 above satisfy to deem a wallet D3 as suspicious. There is involved at least 4 hops of relaying from D3 (specifically, a minimum of 5 hops to an exchange wallet E) in the upstream transaction path of D3. In the transaction path, there is an RL 2012 with at least 4 factors of splitting, in fact, it has 7 factors of splitting (i.e. 7 outputs vs 1 input). Hence, the characteristic defined by 2 is satisfied. Furthermore, in the transaction path, there is an RM wallet 2018 with 8 factors of aggregation (i.e. 8 inputs vs 1 output). Hence, the characteristic defined by 3 is also satisfied.

All the values (e.g. at least 4 hops, at least 8 factors of aggregation, minimum of 2 relay wallets, etc.) in the characteristics defined 1 to 5 above represent the threshold for each characteristic. In the present example, they are obtained based on machine learning from extended paths of known malicious and normal wallet instances that represented a good degree of distinction between malicious and normal wallets. The transactional information of this set of wallets form the training set used to derive the threshold values for each characteristic during the machine learning stage.

Back to FIG. 19B, the immediate destination neighbour wallet D3 is flagged as a suspicious wallet by the CARA algorithm because it fits the characteristic defined by 4 above because there are two relay wallets R with 2 factors of splitting.

Therefore, the Function 1 1905 is processed such that immediate neighbour wallets are labelled as "malicious" if, for example, they are found in the blacklist of the TRDB, "suspicious" if determined as such based on the characteristics defined by 1 to 5 above, or "normal (i.e. non-malicious)". Those wallets labelled as normal, malicious or suspicious are passed on to the next Function 2 1907 for further processing. In another example, only those wallets labelled as malicious or suspicious are passed on to the next Function 2 1907 for further processing.

Function 2 1907: Task Classification

After labelling the immediate sources/destination wallets in Function 1 1905, a query is made to obtain information from a blockchain explorer or a database containing data of a particular blockchain (which the inspect wallet operates in), about how frequently an inspected wallet interacts with each of the immediate neighbour wallets, and the amount of tokens involved during the transactions. This is done in order to quantify the severity of maliciousness exhibited by the inspected wallet. While a malicious wallet will interact frequently with malicious and/or suspicious immediate neighbour wallets, a normal wallet will seldom interact with them. Hence, through Function 2 1907, the true positives (correctly guessing malicious wallet as malicious) can be increased and the false positives (guessing a normal wallet to be malicious) can be reduced.

Figure 21:
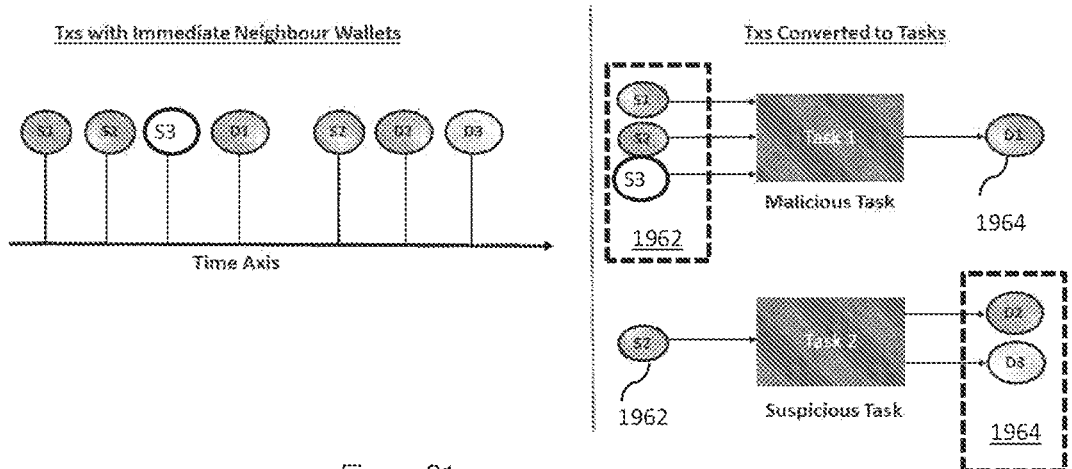
FIG. 21 illustrates how transaction flow information is converted into tasks representing how an inspected wallet transacts with other wallets.

Function 2 1907 starts by a query for information from the blockchain explorer or the database containing data of the particular blockchain (which the inspected wallet operates in). For example, Ethereum, bloxy APIs may be used for the query. The information queried would be about all transactions the inspected wallet conducts directly with immediate source wallets 1962 and immediate destination wallets 1964. FIG. 21 illustrates information to be obtained about each transaction an inspected wallet 1960 conducts with immediate neighbour wallets 1962 and 1964. FIG. 21 shows the information relating to the example of FIG. 19B. That is, the inspected wallet now described refers to the inspected wallet 1960, immediate source wallets 1962 (i.e. S1 to S3) and immediate destination wallets (i.e. D1 to D3. Assuming that the inspected wallet 1960 operates in the Ethereum blockchain, the information obtained using Bloxy APIs in the operation of Function 2 1907 is pictographically represented on the left side of FIG. 21. Specifically, there is shown each individual transaction between the inspected wallet 1960 and its immediate neighbours S1 to S3 and D1 to D3 in the order of the time of occurrence of each individual transaction. After obtaining such information about the time of occurrence of each individual transaction, this information is transformed by Function 2 1907 into an object which is referred to as a task. A task can be defined as an aggregation of transactions of the inspected wallet with immediate source and destination wallets. According to time axis information on the left side of FIG. 21, the individual transactions occurred in the following order S1, S2, S3, D1. This can be interpreted as the inspected wallet 1960 received tokens from S1, S2 and S3 and then it was transferred to D1. This can be visually represented as a transaction flow pertaining to a Task 1 on the right side of FIG. 21. After task 1 and its transaction flow is generated, the inspected wallet 1960 may have some balance tokens. The inspected wallet 1960 then receives tokens in yet another transaction with S2, which is later sent to D2 and D3. This can be visually represented as a transaction flow pertaining to Task 2, which is located below the transaction flow diagram for Task 1 in FIG. 21. With reference to the classification of S1 to S3 and D1 to D3 for the example of FIG. 19B, Task 1 is a malicious task because S3 was classified as a malicious wallet using Function 1 and Task 2 is a suspicious task because D3 was classified as suspicious using Function 1.

As an example, the rules to associate immediate neighbour wallets (e.g. 1962 and 1964 of FIG. 19B) of an inspected wallet (e.g. 1960 of FIG. 19B) with one task based on transactions (occurring in a time axis) between the inspected wallet and the immediate neighbour wallets can be as follows:

1) for a given time axis comprising transactions of the inspected wallet with immediate source and destination wallets, look for a first immediate source wallet that the inspected wallet transacted with in the time axis;

Using the example illustrated in FIG. 21, the first immediate source wallet is S1.

2) after finding the first immediate source wallet, go down the time axis to look for a first immediate destination wallet that the inspected wallet transacted with;

Using the example illustrated in FIG. 21, the first immediate destination wallet is D1.

3) after finding the first immediate destination wallet, find the next immediate source wallet that the inspected wallet transacted with and the last immediate destination wallet that transacted with the inspected wallet just before the next immediate source wallet; and Using the example illustrated in FIG. 21, the next immediate source wallet after the first immediate destination wallet D1 is S2. The last immediate destination wallet just before the next immediate source wallet S2 remains as D1 because there is only one immediate destination wallet.

It should be appreciated that if there is absence of a next immediate source wallet after the first immediate destination wallet and if there are more immediate destination wallets found after the first immediate destination wallet, all the nodes starting from the first immediate source wallet would be associated with one task.

For instance, in the example of FIG. 21, the first immediate source wallet for the second task is S2 and the first immediate destination wallet is D2. However, there is absence of a next immediate source wallet occurring after the first immediate destination wallet D2. Consequently, all the nodes (i.e. S2, D2, D3) starting from the first immediate source wallet S2 are associated to task 2.

4) after finding the next immediate source wallet and the last immediate destination wallet, all the nodes (i.e. immediate neighbour wallets) starting from the first immediate source wallet to the last immediate destination wallet would be associated with one task. In the example illustrated in FIG. 21, all the nodes starting from S1 to D1 are associated to task 1. The next immediate source wallet (i.e. S2) would be the starting point (i.e. the first immediate source wallet) for a next task and the steps 2) 3) and 4) are repeated.

The rationale behind the construction of the afore-mentioned tasks is as follows.

Malicious wallets usually exhibit behaviour of immediately spending all transactions from source wallets to destination wallets or holds the tokens from a source wallet for a considerable amount of time before spending it through one or more destination wallets. Through such tasks classification performed through Function 2 1907, one can capture similar behaviour characteristics, which are:

1. Immediate spending of all source transactions to destination wallets (balance of about 0 tokens & hold time less than or equal to 1 day); and
2. Spending of all source transactions after considerable hold time (balance of about 0 tokens & hold time greater than or equal to 10 days).

Principal component analysis may be applied to learn the values (e.g. balance of about 0 tokens, hold time less than or equal to 1 day, greater than or equal to 10 days, etc.) in the two characteristics above through machine learning on an appropriate training set such as the training set used for determining the 5 characteristics for Function 1 1905.

Therefore, through the Function 2 1907, the above 2 characteristics can be checked for tasks that involve immediate neighbours to further increase the suspicion that the tasks classified through Function 1 1905 are malicious or suspicious. Specifically, the above 2 characteristics would help to provide a weight score to each task, which is the job of the next Function 3 1909.

Function 3 1909: Risk Score

Through Function 3 1909, the risk score for an inspected wallet is calculated from the list of tasks outputted by the previous Function 2 1907. In the present example, higher risk score means the inspected wallet is more likely to be malicious. It is appreciated that in another example, it could be configured such that lower risk score is indicative of higher likelihood to be malicious. In a first step of Function 3 1909, each task is classified as normal, suspicious, highly suspicious or malicious based on the following criteria and a weight is associated with each task to represent the severity of maliciousness of the task in the range of 0 to 1.

1. Normal Task: The immediate neighbour wallets involved in a normal task did not receive or send any tokens/ether through obfuscated paths or known malicious wallets present in our TRDB. Such normal task is given a weight of 0.
2. Suspicious Task: At least one immediate neighbour wallet receive and/or send tokens through obfuscated paths, but they did not immediately spend all incoming transactions or hold it for more than 10 days. Such activities indicate a suspicious task and is given a weight of 0.5.
3. Highly Suspicious Task: At least one immediate neighbour wallet receive and/or send tokens through obfuscated paths, and they immediately spend all incoming transactions or they spend all incoming transactions after holding it for more than 10 days, thereby increasing the suspicion. Such activities indicate a highly suspicious task and is given a weight of 0.75.
4. Malicious Task: At least one immediate neighbour wallet received and/or send tokens to known malicious wallet blacklisted in the TRDB. Such activities indicate a highly suspicious task and is given a weight of 1.

Information Regarding Risk Score Computation

In the present example, the risk score of a wallet under inspection is computed using three metrics namely amount of bad tokens, number of bad tasks, and number of bad days. A bad day is defined as a day where a wallet under inspection was involved in at least one suspicious, highly suspicious or malicious task. Hence, if a day involved only normal tasks, it is considered as a good day. The reason why the 3 metrics above are chosen is to make sure that only wallets that behave maliciously through a majority of its lifetime in existence (number of bad days is almost equal to lifetime), and transact almost entirely with bad tasks (number of bad tasks is almost equal to number of total tasks) that involve large amounts of bad tokens would have a high risk score of greater than 60 out of 100. Malicious wallets belonging to malicious actors that engage in malicious tasks for majority of its lifetime in existence justifies having a high risk score. However, it is recognised that normal users could accidentally be involved in a malicious transaction by being scammed to send tokens to a malicious wallet. Otherwise, a normal user involved only in normal transactions would likely be just sending tokens directly to an exchange. The 3 metrics mentioned above will help to compute a low risk score for cases such as a normal user wallet involved in only 1 bad task that occurred only on 1 bad day and which only involved a small amount of token transferred in comparison to the total tokens transacted over all tasks.

Also, in order to compute the risk score, the absolute bad value of each of the three metrics (i.e. amount of bad tokens, number of bad tasks, number of bad days) and their percentages are considered. For example, % of bad tokens is computed by comparing total bad tokens transacted over all bad tasks with total good and bad tokens transacted over all tasks. This ensures that for an inspected wallet to have a high risk score, both the absolute bad value and % of bad value of each metric must be high. This is because in some instances, a wallet under inspection can be seen to be involved in many suspicious tasks, which makes majority of its days as bad days. However, the amount of bad tokens actually transacted by the wallet under inspection is little e.g. 1 or 2 tokens even althought the % of bad tokens is likely to be 100%. Such wallets, although suspicious, should have a lower risk score than a similar wallet, which transacted, for instance, 100 bad tokens that is significantly more than 1 or 2 tokens are thus regarded as more suspicious. The risk score computation technique adjusts the risk score for each case by considering both the absolute bad value and the bad % of each of the three metrics.

Explanation of Risk Scoring Technique Using an Example

Figure 22:
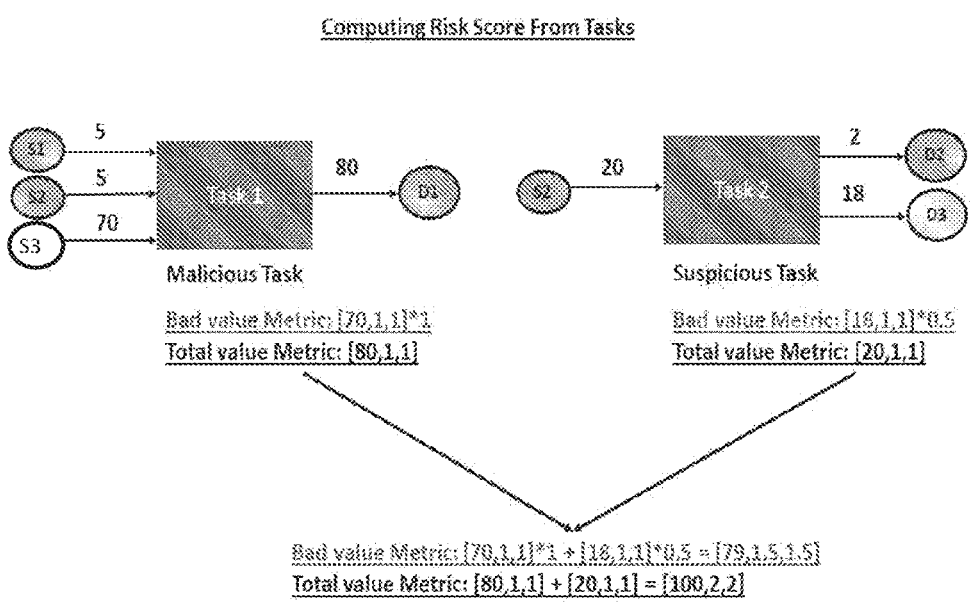
FIG. 22 illustrates how a risk score indicative of maliciousness is calculated for an inspected wallet.

FIG. 22 shows an example illustrating calculation of risk score. FIG. 22 shows two tasks, task 1 and 2, outputted by the previous block, Function 2 1907. The tasks 1 and 2 are the same as the tasks 1 and 2 in FIG. 21. Each task 1 and 2 shows the amount of tokens transacted for each immediate wallet in FIG. 22. For the example of FIG. 22, it is assumed that the 2 tasks did not happen on the same day but on 2 different days.

Task 1 is classified as a malicious task, and it involves total transaction of 80 tokens, of which 70 tokens came from a malicious source, S3. The risk score is computed by firstly obtaining a matrix representing the above 3 metrics that is in a format of [amount of bad tokens, number of bad tasks, and number of bad days] multiply by an assigned weight. The bad value metric for task 1 is calculated as [70,1,1]*1 as 70 bad tokens came from a malicious source, making the task and the day both malicious or bad, and correspondingly the number of bad tasks is 1 and the number of bad days is 1. The matrix [70,1,1] is multiplied by 1 because 1 is the weight assigned to the malicious task 1. An important aspect to mention is that the absolute value for bad tokens and the absolute value of total tokens are considered and calculated for the tasks 1 and 2. As shown in FIG. 22, task 1 receives 80 tokens from 3 immediate sources S1 to S3 and then sends all 80 tokens to D1. In this case, the total tokens transacted by task 1 is 80 tokens and not 160 tokens (80 tokens from source+80 tokens to destination) because it is assumed that the same 80 tokens received from immediate source wallets are consumed entirely by the immediate destination wallet D1. In this manner, the total tokens transacted by any task is always the total amount of tokens sent to immediate destination wallets i.e. the total outgoing tokens for any task. Hence, the absolute value of total tokens transacted by task 1 is 80 tokens. Since 70 bad tokens were received from the malicious source S3 and these 70 tokens of the total 80 tokens sent to the destination D3 are deemed to be bad, the number of bad tasks is 1. The number of bad days is 1 as task 1 occurred in 1 day. The matrix [80,1,1] is thus calculated as the total value metric for task 1.

Task 2 is considered only as a suspicious task and the inspected wallet transacts 18 bad tokens to immediate neighbour destination wallet D3 out of a total of 20 tokens. Since task 2 is not confirmed to be definitively malicious from the known list of malicious wallets in the TRDB, but is suspicious, it is associated with a weight of 0.5. Since task 2 is a suspicious task, the number of bad tasks is 1. Since task 2 only occurs on 1 day, the number of bad days is 1. Therefore, the bad value metric of task 2 is equivalent to [18,1,1]*0.5. The total value metric of task 2 is [20,1,1] as the total outgoing tokens for task 2 is 20.

Next, the total bad value metrics and total value metrics from task 1 and task 2 are added up. After adding up, a bad value metric [79,1.5,1.5] is obtained against a total value metric of [100,2,2]. This means that only 79 tokens is considered bad from a total of 100 tokens (i.e. 79% bad tokens), 1.5 tasks are considered bad from a total of 2 tasks (i.e. 75% bad tasks) and 1.5 days out of the 2 days involved bad tasks (i.e. 75% bad days). Accordingly, the absolute bad values and percentage bad values of the 3 metrics are computed as shown below. These absolute bad values and percentage bad values of the 3 metrics would be utilised to compute a risk score for the inspected wallet pertaining to tasks 1 and 2. The risk score would be calculated using the equations presented below.

Absolute Bad value metric: [79,1.5,1.5]

Absolute Bad % metric: [79%, 75%, 75%]

In a scenario in which task 1 and task 2 happens on the same day, the CARA algorithm would calculate the bad day absolute value as 1 and the bad day % as 100% because the same day now contains 2 bad tasks of which 1 task (i.e. task 1) is malicious. Priority of consideration is given to the malicious task in the calculations.

There are exceptions to how the absolute bad value metric and the absolute bad % metric can be calculated for certain tasks. Such different cases of tasks handling are described as follows.

Figure 23A:
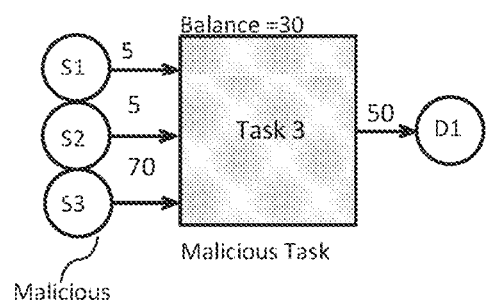
FIG. 23A to FIG. 23C show examples of three different tasks that require specific consideration to calculate metric values for determining risk score.
Figure 23B:
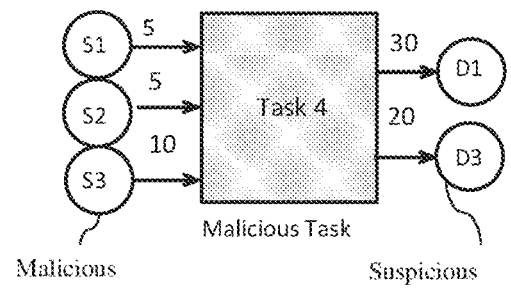

With reference to FIGS. 23A and 23B, there are illustrated two tasks, task 3 and task 4, that would be subject to calculations different from the tasks 1 and 2 shown in FIG. 22. Tasks 3 and 4 have been previously classified as malicious tasks by Function 1 1905. An immediate source wallet S3 in these tasks 3 and 4 is classified as a malicious wallet and an immediate destination wallet D3 in these tasks 3 and 4 is classified as a suspicious wallet. Tasks 3 and 4 are each performed in 1 day and task 3 was performed before task 4. Tasks 3 and 4 are tasks pertaining to a common wallet under inspection and they have the following features.

1. Total tokens received from immediate source wallets are of a different amount from total tokens sent to immediate destination wallets. In task 3, with reference to FIG. 23A, a total of 80 tokens are received from 3 immediate source wallets S1 to S3 of the inspected wallet, while only 50 of the total 80 tokens received are sent to an immediate destination wallet D1 of the inspected wallet. The total tokens transacted in a task is equivalent to the total tokens sent by an inspected wallet to an immediate destination wallet, which is D1 in task 3. Hence, task 3 transacts 50 tokens with D1 and the inspected wallet thus has a balance of 30 tokens at this point. In task 4, with reference to FIG. 23B, the wallet inspected receives a total of 20 tokens from the 3 immediate source wallets S1 to S3, while the inspected wallet sends, in task 4, 50 tokens to 2 immediate destination wallets D1 and D2. This is because the inspected wallet had a balance of 30 tokens after task 3, which was then spent in task 4. Hence, although task 4 received only 20 tokens, task 4 is said to have transacted a total of 50 tokens. Therefore, the total absolute value metrics (taking into consideration both good and bad transactions) calculated for tasks 3 and 4 are [50,1.1] and [50,1,1] respectively.

2. In task 3, total bad tokens received from immediate source wallet S3 is greater than the total tokens send to immediate destination wallet D1. In this case, since S3 is a malicious wallet, the weight assigned to task 3 is 1 and the CARA algorithm would give priority to malicious tokens coming from S3 in the calculations. Giving priority to malicious tokens coming from S3 means that it would be assumed that the 50 tokens sent to immediate destination wallet D1 all comes from S3, and not from S1 and S2. This is because usually malicious actors will try to relay bad tokens as soon as possible in order to encash them via an exchange. Hence the absolute bad value metric for task 3 is [50,1,1]*1, and the absolute total value metric (taking into consideration both good and bad transactions) is [50,1,1] as discussed above. Accordingly, after task 3, 20 out of the balance of 30 tokens are bad tokens.

3. Task 4 includes interaction with both the malicious wallet S3 and the suspicious wallet D3. In task 4, the inspected wallet received 10 bad tokens from the malicious wallet S3. Hence, including the 20 bad tokens in balance from task 3, the number of bad tokens becomes 30. In this case, the CARA algorithm would assume that the inspected wallet sent 20 bad tokens to D3 because D3 is suspicious and thus given priority consideration, and only 10 tokens out of the 30 tokens sent to D1 would be assumed to be bad tokens. Furthermore, the CARA algorithm would consider the absolute value for bad tokens to be the greater of the 2 values. The greater of the 2 values is the 20 bad tokens sent to D3. Since the wallet inspected interacts with a malicious immediate source S3, task 4 is labelled as a malicious task, and hence the weight assigned to task 4 is 1. Therefore, the absolute bad value metric for task 4 is [20,1,1]*1 and the total value metric for task 4 is [50,1,1].

The rules governing the calculation of bad value of tokens considered for a task, determination of task label and determination of day label are summarised as follows. Firstly, it should be noted that for a task, the total amount of tokens received from immediate source neighbour wallets is considered and this is called total input token amount. Secondly, the total amount of tokens sent to immediate destination neighbour wallets is considered and this is called total output token amount. Hence, the total absolute value of tokens transacted by the task is always the total output tokens amount.

The if-else conditions for determining Bad value of tokens considered for a task is as follows.

if (total input bad value tokens>total output bad value tokens)      condition (1)

Condition (1) is observed when bad value tokens from immediate source wallets is>bad value tokens going to immediate destination wallets.

if (total input bad value tokens<=total absolute value of tokens transacted)      condition (2)

Condition (2) is a check to see if bad value tokens from immediate source wallets is<=total value of tokens transacted.

If conditions (1) AND (2) satisfies, bad value of tokens considered for the task=total input bad value tokens.

Figure 23C:
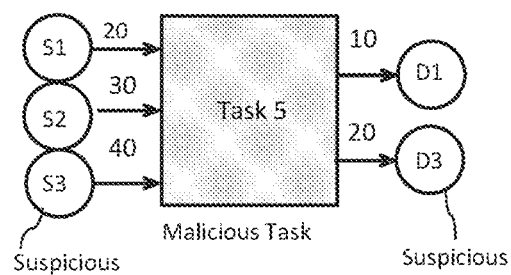

However, if the total bad value tokens from immediate source wallets is>total value of tokens transacted, a condition (3) applies and the bad value tokens is capped to total value of tokens transacted (like in the case of Task 5 of FIG. 23C). In this case, the bad value of tokens considered for the task=total absolute value of tokens transacted.

If bad value tokens from immediate destination wallets is>bad value tokens from immediate source wallets, a condition (4) applies and bad value of tokens considered for the task=total output bad value tokens. In order to calculate a risk factor, the following readings are obtained/computed:

Obtaining the total input token amount ($Total_{IN}$), total absolute value of tokens transacted by a task $Total_{transacted}$ (i.e. the total output token amount $Total_{OUT}$), total input bad value of tokens ($Total_{BAD\_IN}$), total output bad value of tokens ($Total_{BAD\_OUT}$)

Check whether any of conditions (1) to (4) is satisfied.

Determine Bad value of tokens based on the determination of the above conditions 1-4.

To compute bad value metric value for a task, priority in consideration is given to malicious immediate neighbour wallets, followed by highly suspicious, followed by suspicious, and lastly normal immediate neighbour wallets. Hence, in the case of Task 4 of FIG. 23B, task 4 transacts with malicious immediate source wallet S3 and suspicious immediate destination wallet D3. Priority in consideration is given to the malicious immediate source wallet S3 and task 4 is classified as malicious, and assigned with a weight of 1.

The if-else conditions for determining task label for a task are as follows.

Condition (1a): If the task contains at least 1 malicious immediate neighbour wallet.

If condition (1a) is met, Task Label='Malicious'.

Condition (2a): Else if the task contains at least 1 highly suspicious immediate neighbour wallet.

If condition (2a) is met, Task Label='Highly Suspicious'

Condition (3a): Else if the task contains at least 1 suspicious immediate neighbour wallet.

If condition (3a) is met, Task Label='Suspicious'

If none of the above conditions (1a) to (3a) satisfies, Task Label='Normal'.

The if-else conditions for determining Day label for a task are as follows.

Condition (1b): if day has at least 1 malicious task, Day label='Malicious'

Condition (2b): else if day has at least 1 highly suspicious task, Day label='Highly suspicious'.

Condition (3b): else if day has at least 1 suspicious task, Day label='Suspicious'.

If none of conditions (1b) to (3b) is met, Day label='Normal'.

Therefore, even each day of transaction can be considered by the CARA algorithm.

With reference to FIG. 23C, task 5 shows transactions involving immediate source wallets S1 to S3 of an inspected wallet and immediate destination D1 and D3 of the inspected wallet. In the case of task 5, both S3 and D3 have been recognised or classified in Function 1 1905 to be suspicious. The total input token amount (Total$_{IN}$) is 90, total absolute value of token transacted by a task Total$_{transacted}$ (i.e. the total output token amount Total$_{OUT}$) is 30, total input bad value token (Total$_{BAD\_IN}$) is 40, total output bad value token (Total$_{BAD\_OUT}$) is 20.

Consequently, the statuses of the following conditions are set out below:

Condition 1: Satisfied (40 from S3>20 to D3)

Condition 2: Not satisfied (40 from S3>30, where the total absolute value of tokens transacted in task 5 is only 30 tokens, taking into account of the 20 tokens sent to immediate destination wallet D3 and 10 tokens sent to immediate destination wallet D1)

Condition 3: Satisfied (40>30)

Condition 4: Not satisfied (20<40)

Giving priority to malicious/suspicious wallets, it would be assumed that all the bad 20 tokens received by suspicious immediate destination wallet D3 is from the 40 bad tokens received from suspicious immediate source wallet S3.

Since Condition 3, i.e. total input bad value tokens is>total absolute value of tokens transacted is satisfied, the absolute bad value tokens considered for task 5 would be the=total absolute value of tokens transacted, i.e. 30 tokens. Hence, % for bad tokens for task 5=absolute bad value considered for task 5/total absolute value of tokens transacted in task 5=30/30=100%.

Equations to Calculate Risk Score $$\text{Risk Score} = \text{average (normalized malicious token} + \text{normalized malicious tasks} + \text{normalized malicious days)} \quad (1)$$

$$\text{normalized malicious value} = (\text{normalized absolute bad value} + \% \text{ bad value without normalization})/2 \quad (2)$$

$$\text{normalized absolute bad value} = [(\text{absolute bad value of metric})*(\% \text{ bad value of metric})/(\text{maximum absolute bad value of metric}*\text{normalizer}) \quad (3)$$

Equation (1) shows how a risk score is computed from the three metrics (amount of tokens, number of tasks, number of days) after normalizing each of these metrics using equations (2) and (3).

In equation (2), only absolute bad value of each metric is normalized, while the % bad value is not normalized because % bad value for each metric has a nice range from 0 to 100 that can be directly used. However, the absolute bad value for each metric has no fixed range, making it difficult to use it as it is, for the risk score computation.

Hence using equation (3), the absolute bad value is normalised to fit into a range as well. To normalize the absolute bad value, both the absolute bad value of metric and % bad value of metric are included to ensure that the normalized absolute value increases the risk score only when the absolute bad value and the % are both high, which then increases the confidence of malicious activity involvement by the wallet under inspection. For each metric, a maximum cap is provided as shown in the equation (3) variable "maximum absolute bad value of metric" because when a metric hits a specific absolute bad value, it is already an indicator of malicious behaviour. Applying principal component analysis, the maximum absolute bad value for tokens, tasks and days are learnt by machine learning to be 100, 7 and 3. These threshold values are determined from machine learning based on appropriate training set or data such as the training set used for determining the 5 characteristics for Function 1 1905.

Also in equation (3), there is another variable called "normalizer" that further normalizes the absolute bad value based on the % of bad value for each metric. The rationale behind the normalizer variable is that if the % of bad value for a metric is high (e.g. 60% of tokens transacted are bad), then the chances are more that the wallet under inspection is specifically catering to malicious operations. While if the % of bad metric is low, then there is a high chance that the inspected wallet is normal and might have unknowingly transacted with malicious wallets as part of a scam. The normalizer values for different percentages of bad metric are as follows.

TABLE 1

Normalizer Value distribution for different percentages of bad value metric.

| Normalized Value | % of Bad Metric |
| --- | --- |
| 1 | 100% |
| 2 | 75 to a value less than 100% |
| 3 | 50 to a value less than 75% |
| 4 | 25 to a value less than 50% |
| 5 | 0 to a value less than 25% |

Continuation of an Earlier Example to Illustrate Risk Score Calculation

Back to FIG. 22, the absolute bad value metrics and % of bad value metrics are computed earlier as below.

Absolute Bad value metric: [79,1.5,1.5]

Absolute Bad % metric: [79%, 75%, 75%]

Derived from machine learning (principal component analysis), maximum absolute bad value metric: [100, 7, 3]

Using equation (3), normalized absolute bad value for token=(79*79)/(100*2)=31.2

Using equation (2), normalized malicious token=(31.2+79)/2=55.1

Using equation (3) normalized absolute bad value for tasks=(1.5*75)/(7*2)=8.0

Using equation (2), normalized malicious tasks=(8.0+75)/2=41.5

Using equation (3), normalized absolute bad value for days=(1.5*75)/(3*2)=18.75

Using equation (2), normalized malicious days=(18.75+75)/2=46.9

Using equation (1), the final calculated Risk score=(55.1+41.5+46.9)/3=47.83

It should be appreciated that the risk score is a value ranging from 0 to 100.

Crypto Analysis Transaction Visualization (CATV)

Blockchain explorer applications can be used to provide statistics and transaction histories of specific blockchains. A blockchain explorer generally refers to a web application to view and query blocks. It may work like a web browser that is connected to the Blockchain. The blockchain explorer allows a user with an internet connection to track in real-time all the transactions or interactions made by a cryptocurrency holder of a blockchain. However, conventional block explorer applications do not address fundamental issues of cryptocurrency transactions, such as indicating whether the transactions involve cybercrime activity, or where and with whom these funds are being transacted. It is desirable for a user to know that they are transacting with legitimate sources, so a risk indicator or confirmation made available to a user will be helpful before proceeding with any blockchain transactions, and deter money laundering activities.

An application that is configured to determine risk of transacting with a specified wallet in a blockchain is proposed. This application is referred in the present disclosure as Crypto Analysis Transaction Visualization (CATV) application. CATV application offers continuous availability, ease of tracking transactions, flow visualization, and automated management processes. This means that the CATV application can be used as part of a compliance process or know-your-client (KYC) process to prevent money laundering with respect to cryptocurrency assets. Transactions can be correlated with the earlier disclosed Threat Reputation Database (TRDB), and a risk assessment algorithm (also known as CARA in the present disclosure) that is configured to automatically flag high-risk crypto-addresses (or wallet addresses) as well as blacklisted addresses that have been verified or known to be involved in malicious activities. A high-risk crypto-address is defined as an address that is determined by the risk assessment algorithm (i.e. CARA algorithm) to have a reasonable likelihood to be a malicious threat, whereas a blacklisted crypto-address is defined as an address that is found to be malicious and is recorded in the TRDB. In one example, the CATV application is configured to include reporting capability so that a user can be provided with overviews of researched crypto-addresses (or wallet addresses), risks associated with all source and destination addresses, and crypto-address annotation.

Using collective transaction data cross-referenced with the TRDB, the CATV application is configured to provide flow visualizations from sources (i.e. source wallets) to destinations (destination wallets) of blockchain transactions performed. This is important in risk assessment as it provides a source of truth about where these crypto asset funds crypto (i.e. blockchain) transactions dataset which obtains data from public dataset available (such as in Google Cloud Platform) and/or integrated partner dataset. This database can be a local server or a cloud server.

2. Public Crypto Transaction Dataset: This dataset obtains all transaction histories gathered from available public datasets such as Google Cloud and/or analytics provided by a partner participating in the Sentinel Protocol.

3. Integrated Partners Transaction API: In one example, a third party application interface (API) may be integrated together with the CATV application. An integrated solution partner may provide transaction dataset via API subscription on demand. Specifically, a list of transactions can be obtained in a specified format suitable for use by the CATV application. For instance, a list of transactions within a predetermined number of hops from/to a specified wallet that are performed within a specified data range can be retrieved for generating a visualization map. Details performed by the visualization engine in FIG. 24 will be described later.

In other words, the CATV application collects transaction datasets from two sources:
- feeds from one or more integrated partners that provide all the relevant transaction information on demand through an API. Such source facilitates the retrieval of pre-processed transaction data that is customized to the CATV application for a faster and more efficient data analysis.
- Public transaction dataset retrieved by any available service providers. In one example, Google BigQuery that has all the most popular crypto datasets indexed may be used. Such source allows the CATV application to focus on delivering data analytics rather than transaction processing, which can be computationally expensive.

An example of a result returned by the Google BigQuery is as shown in table 2 below:

TABLE 2

An example of a Sample Dataset returned by Google BigQuery

| Type | Data |
| --- | --- |
| depth | 1 |
| tx_time | 2018-11-28T16:43:26.000+00:00 |
| tx_hash | 0x882d67d042052b0105999cca3fef21d9a094aaa5d688f139a41f2499c60de71b |
| sender_address | 0x5b4ff090d25d8340fc6ee79dc3a3c87199787586 |
| receiver_address | 0x624f0ec132d5d3da49e8635b906d13e5e0407f4f |
| amount | 1.000252 |
| sender_type | Wallet |
| sender_annotation | null |
| receiver_type | Wallet |
| receiver_annotation | null |

(or tokens) came from and where these crypto asset funds (or tokens) are sent to, especially if an address of a node (or wallet) is linked to cybercrime.

FIG. 24 shows an example of a system architecture framework of the Crypto Analysis Transaction Visualization (CATV) application. The CATV application is configured to communicate with at least one of the following 10 components (all shown in FIG. 24):

1. Collective Transaction Database (DB): The Collective Transaction Database refers to a database that contains 4. Sentinel Portal: This is a web-based framework for users to register before authentication access control is granted to interact with the Crypto Analysis Transaction Visualization (CATV) application.

5. Threat Reputation DB (TRDB): As described earlier, the threat reputation database provides a Collective Indicator of Compromises (IOC) such as crypto (or wallet) addresses of scammers/hackers, ransomware, malicious URLs, and malicious file hashes. In one example, in the TRDB, there are whitelisted records, blacklisted records and greylisted records for indicating secured/non-malicious records, malicious records and records that are being investigated respectively. A greylisted record may also refer to a record that is verified by a Security Analyst, but the result does not show that it is tied to a malicious wallet/website or a secured wallet/website.

6. Crowdsourced Malicious Crypto Addresses: This refers to Crypto (or wallet) address or addresses submitted by a community (or individual) via the Sentinel portal that is to be investigated and verified. In one example, a user that is part of a community can report a suspicious crypto address for a Security Analyst (i.e. a Sentinel) to verify. In another example, the CATV application is configured to retrieve new malicious websites that are known and published in other websites. A web-crawler may be used to retrieve such information from the websites. Such information may be sent to a Sentinel for verification to confirm that they are accurate.

7. Threat Hunt Malicious Crypto Addresses: Malicious crypto (wallet) addresses found by in-house security analysts are reported via the Sentinel Portal for a Security Analyst (i.e. a Sentinel) to verify whether the detected malicious crypto addresses are indeed malicious before the crypto addresses is updated as a blacklisted record.

8. Visualization Engine: Based on user inputs (e.g. required depth of analysis), flows of crypto transactions with a specified wallet are presented in a visualization diagram. An example of a visualization diagram generated by the visualization engine is shown in FIG. 26. Examples of the visualization diagram also include the maps found in FIG. 19B, and FIG. 20A to 20F. The visualization engine also highlights transaction details cross-referenced with the TRDB.

9. Transaction Normalization Engine: Based on user inputs, the CATV application is configured to provide in-depth details about the source and destination of an inspected crypto address using annotations from the TRDB. In one example, and with reference to FIG. 27, there is provided a transaction table that lists all the nodes involved with a user inputted crypto address (i.e. crypto address that is being searched). The transaction table can be displayed. In addition, the visualization diagram (provided by the Visualization Engine) can be provided to present the information in the transaction table in a graphical manner (e.g. charts, flowchart etc.). The Transaction Normalization Engine enables information to be presented in certain predefined formats. For example, Transaction Normalization Engine normalizes (or filters) information displayed through user options made available to hide certain information in the transaction table and/or visualization diagram to provide simplified/selected views. Important information (if available) such as source and destination addresses are annotated so a user can be aware of who transacted certain funds (or tokens) and/or where the funds are being transacted. A risk score may also be generated for each of the nodes listed in the transaction table and be displayed.

In another example, the transaction normalization engine may provide a dashboard indicative of the search results, and/or statistical results of the analysis performed. For instance, top 5 suspicious wallets with the highest number of transactions) or top 5 suspicious wallets with the highest number of ethers can be highlighted to a user. There may also be other filters to apply to the search results.

10. Data feed from a Crypto Analysis Risk Assessment (CARA) Engine (CARA is described above): Using a retrieved transaction dataset, there is provided an analytic risk score (calculated through the CARA algorithm) of all transaction related to a crypto (wallet) address inputted by a user for CATV application to generate a visualization diagram. In one example, a risk score may appear when a user mouse-over or clicks on an address displayed in a visualization diagram generated by the CATV application. An example of a label for an address that may appear is shown in FIG. 25. A label may comprise the full address of the node having the address, and node information that can be identified, and/or a risk score for the node. In one example, there is an option available on the CATV application to hide such labels.

Figure 28:
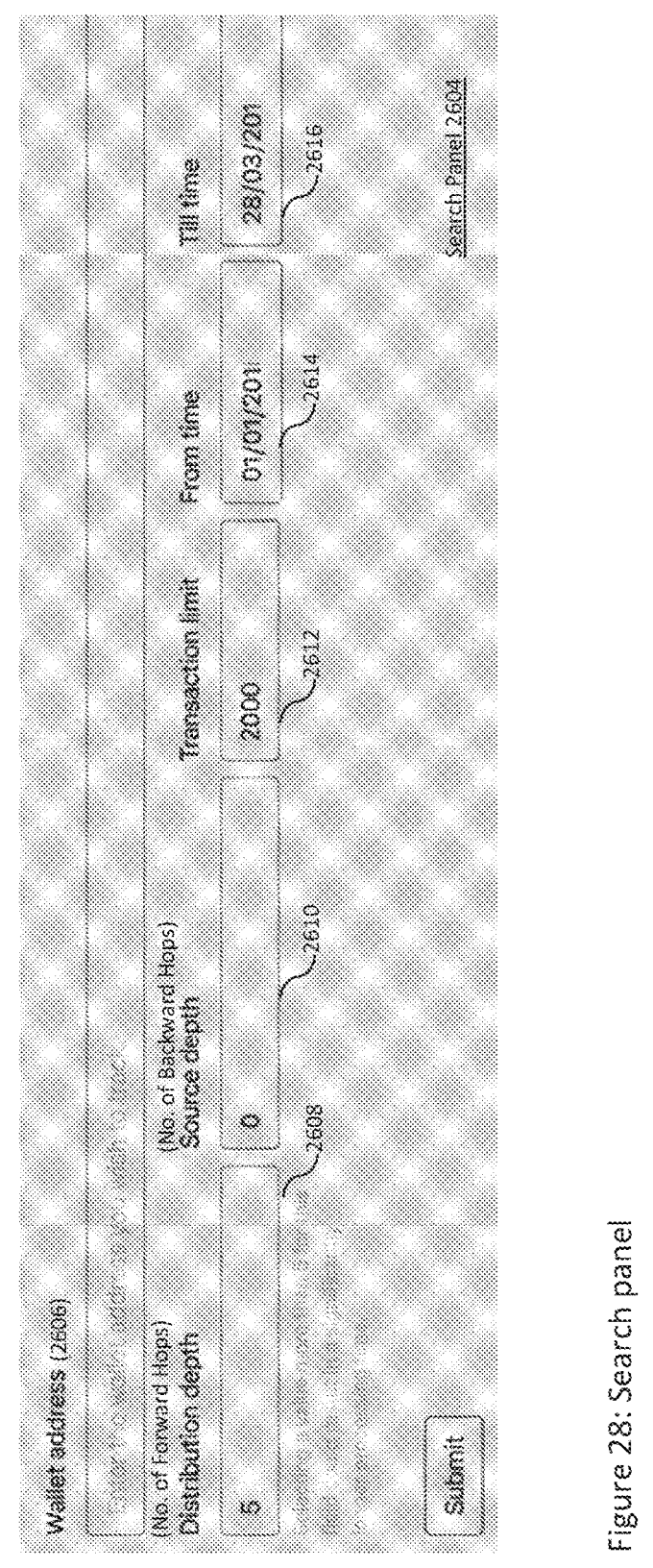

With reference to FIGS. 26 and 28, a user enters a crypto (or wallet) address to be searched and monitored (i.e. an origin 2606) by the CATV application by providing inputs to a search panel 2604. The search panel 2604 is for entering data to be retrieved to generate a visualization diagram 2602. The search panel 2604 may have the following search fields:

Distribution Depth 2608—This refers to number of Layers/hops indicative of transactions involving sending of funds or tokens downstream from a wallet being queried. Each hop refers to a transaction between two wallets. In FIG. 26, the distribution depth is set as 1 (i.e. 1 hop) for showing a simple visualization diagram. The distribution depth can be changed as desired by a user. However, setting the distribution depth to a higher value (e.g. more than 5, depending on computing speed) may result in a longer duration in generating a visualization diagram.

Source Depth 2610—This refers to number of Layer/hops indicative of transactions involving receipt of funds or tokens upstream of a wallet being queried. In FIG. 26, the source depth is set as 5 (i.e. 5 hops) for showing more upstream information. Similarly, setting the source depth to a higher value (e.g. more than 5, depending on computing speed) may result in a longer duration in generating a visualization diagram.

Transaction Limits 2612—This refers to a user-specified number of transactions that a generated visualization diagram would process for presentation of a particular node. The transaction limit can be set using the search panel as a stopping criteria for the generation of a visualization diagram. For instance, if a user enters 2000 as the transaction limit, the visualization diagram does not show transactions of nodes with more than 2000 transactions. Each of the nodes with more than 2000 transactions may still be displayed as a node, just that the transactions are not shown. This feature reduces the time taken to generate a visualization diagram and makes the diagram more readable to the user.

Date Range—A specified field to indicate a start date 2614 and an end date 2616 to search transactions stemming from a wallet being searched and upstream and/or downstream transactions of the wallet in a blockchain. In another example, the date range can be a field selected from a drop down list, for instance, last 30 days, last 6 months, last one year and the like.

In one example, the details of the transactions to be retrieved from the blockchain is determined first by the date range, followed by the distribution depth and/or source depth, followed by the transaction limits. The priority for filtering based on such fields can be pre-specified and/or made configurable by a user or a machine.

Once the transactions of the crypto address that is being searched (i.e. a queried wallet) are retrieved, a visualization diagram is generated as a visualization panel. In one example, the queried wallet is depicted as an origin in such panel. A label containing information of the origin may be indicated on the visualization diagram. The one or more nodes involved in downstream and upstream transactions stemming from the queried wallet may be classified into one or more of the following categories 1 to 9:

1. Blacklist: A node that is associated with a blacklisted record in the TRDB.
2. Whitelist: A node that is associated with a whitelisted record in the TRDB.
3. Exchange: A node that is associated to a known centralized exchange. A centralised exchange is typically owned by an entity that has central powers over the operations of the exchange. This entity holds the funds that users deposit into its exchange, and manages the trades that happen on it. These trades are recorded in an internal ledger that only the exchange has access to. In the event of suspicious activity, the exchange has the right to reverse certain trades and freeze user assets.
4. Decentralised exchange (DEX): A node that is associated to a known decentralised exchange in the TRDB. A decentralized exchange is typically not governed by any entity. It follows a set of rules required for executing trades, and these rules are set in what is called a smart contract that lives in the blockchain. This smart contract is akin to a program that users can interact with, by sending transactions encoded with instructions to the smart contract. In this way, buy and sell trades are executed, as users who are buying X with Y will send an amount of Y with buy instructions to the smart contract, and users who are selling X for Y will send an amount of X with sell instructions to the smart contract. Then, according to program logic, if there is a match between a buyer and a seller, the trade will execute automatically and both parties will get what they bought or sold as soon as the transaction is confirmed. Hence, there is no central authority over how such trades are executed on the blockchain. Every trade in the DEX occurs as a transaction that is verified on the blockchain and is irreversible.
5. Scamming wallet: A node that is associated with a scamming record provided by an Integrated partner (e.g. a trusted source/database providing information of malicious/suspicious wallets), and not found in the TRDB. This means that this node is labelled by an Integrated partner.
6. Phishing wallet: A node that is associated with a phishing record provided by an Integrated partner (e.g. a trusted source/database providing information of malicious/suspicious wallets), and not found in the TRDB.
7. Smart contract: A node that is associated with a known smart contract. Two examples of crypto asset (e.g. tokens) movements from a smart contract are token sales addresses and a smart contract that is used for deposit wallets.
8. Annotated: A node that is annotated with information from the TRDB. However, such node is not associated with the blacklist or whitelist records in the TRDB.
9. No information found: A node that does not fall in any one of the categories 1 to 8.

Figure 30:
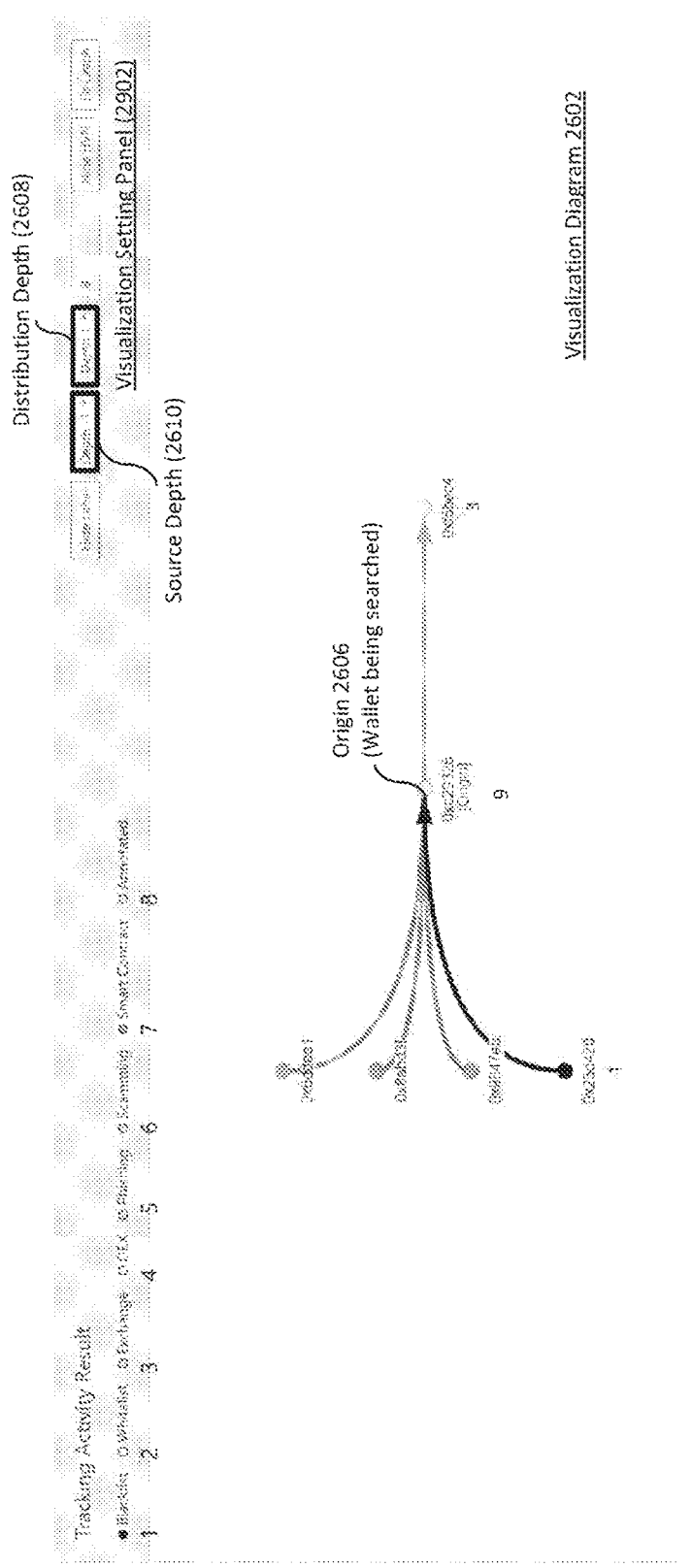
FIG. 30 illustrates another example stemming from the transaction flow of FIG. 29 (source depth=1; destination depth=1).

In another example, the legend of a visualization diagram generated by the CATV application for categorizing different types of nodes may not list category 9 but lists only categories 1 to 8. In such example, a node that does not fall into categories 1 to 8 will not be labelled. An example of such legend (without category 9) is shown in FIG. 30. In yet another example, as shown in FIG. 52, a category may be used for both Exchange and DEX collectively, and a category may be used for Scamming Wallet and Phishing Wallet collectively. In the example shown in FIG. 52, the category "no information found" is labelled as "no tag"

One or more of these categories may be color-coded for easy reference, and/or each category can be labelled according to a legend. Flow of funds (or tokens) from a source wallet to a destination wallet is represented by a line with an arrow. Note that the direction of the arrow is depicted from the source wallet to the destination wallet. The colour of the line from the source wallet can be configured to be the same colour as that of the source wallet. The thickness of the line can be configured to determine the amount of cryptocurrency (or tokens) being transferred between a source wallet and a destination wallet. For instance, the higher the amount of cryptocurrency is being transacted, the thicker is the line between the nodes. For instance, L2 is thicker than L1 in FIG. 26 because the amount of tokens (in this case, ethers) transacted between the nodes represented by L2 is more than the amount of ethers transacted between the nodes represented by L2.

The visualization diagram may include colour representation that allows ease of identification of types of nodes and the transaction flow. For example, the following categories 1 to 9 can be color-coded and/or labelled in the following manner:

1. Blacklist: Black, labelled as 1
2. Whitelist: White, labelled as 2
3. Exchange: Orange, labelled as 3
4. Decentralised exchange: Yellow, labelled as 4
5. Scamming wallet: Light Pink, labelled as 5
6. Phishing wallet: Light Pink, labelled as 6
7. Smart contract: Purple, labelled as 7
8. Annotated: Grey, labelled as 8
9. No information found: Green or Blue, labelled as 9

In one example, different layers (or hops) may be represented by different shades of a color. For instance, a first hop from a queried wallet 2606 is represented by a lighter shade of blue as compared to a fifth hop from the queried wallet 2606, which has a darker shade of blue. The visualization diagram can also be represented by how funds (or tokens) are transacted into a queried wallet and out from the queried wallet. For example, the visualization flow may be arranged in one of the following order:

Source Depth n . . . >Source Depth 3>Source Depth 2>Source Depth 1>Origin wallet>Distribution Depth 1>Distribution Depth 2>Distribution Depth 3> . . . Distribution Depth n Distribution Depth n . . . <Distribution Depth 3<Distribution Depth 2<Distribution Depth 1<Origin wallet<Source Depth 1<Source Depth 2<Source Depth 3<Source Depth n . . .

In one example, a first visualization diagram generated by the visualization engine is configured to display nodes that, for example, transact a native coin (e.g. ether) in a blockchain network (e.g. Ethereum). A second visualization diagram may be generated for displaying nodes that transact a particular secondary token created in the blockchain network of the native coin. The second visualization diagram can be displayed as an overlay in the first visualization diagram. In cases where there are more than one type of secondary token, more visualization diagrams, each diagram for one type of token, can be generated and displayed as an overlay. Hence, there may comprise one or more search panels and/or visualization settings panels for controlling what to display for the first visualization diagram, the second visualization diagram, and so on.

Figure 29:
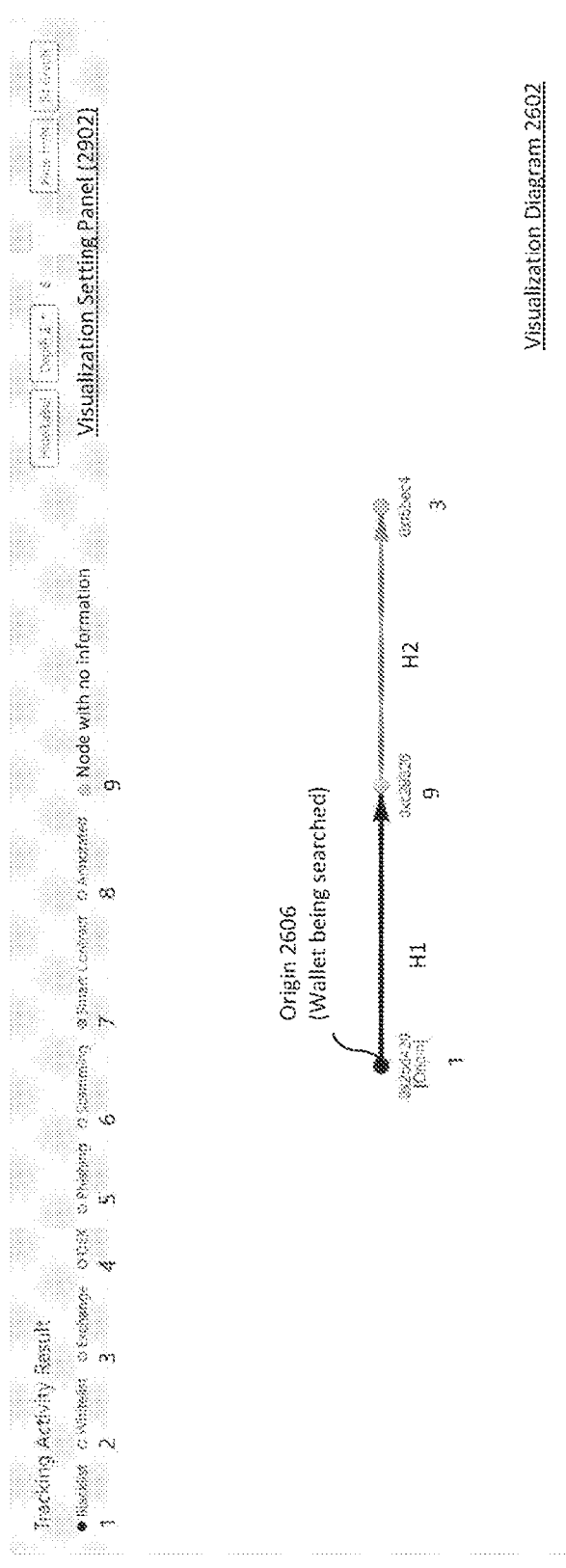
FIG. 29 illustrates an example of a flow diagram of forward transactions of a crypto wallet address being searched (destination depth=2).

FIG. 29 illustrates an example of a give-away scam on a Twitter post. In this example, a wallet address "0x25d4201d7F689dC195db0bf03322144189744636" (in short, 0x25d420) is being queried. The source depth for the query is set as 0 (and thus not appearing on the visualization settings panel 2902), and the destination depth is set as 2. In this example, the queried wallet 2606 is detected as a malicious wallet (labelled as '1' in FIG. 29) used by malicious actors to scam people because it is a blacklisted record in the TRDB. It can be seen from the visualization diagram 2602 generated by the CATV application that funds were moved to an intermediate wallet labelled as '9' in FIG. 29 and having an address "0xc29326019d172cc3d02c779e1df46dcf10b277c2" (in short, 0x293260). This intermediate wallet is a deposit wallet for a known exchange (in this example, yobit) that eventually transacts with an exchange (labelled as '3' in FIG. 29) having an address "0xf5bec430576ff1b82e44ddb5a1c93f6f9d0884f3" (in short, 0xf5bec4).

FIG. 30 illustrates a visualization diagram 2602 that queries the intermediate wallet labelled as '9' of FIG. 29. In this example, the source depth 2610 is set as 1 and the destination depth 2608 is set as 1. In this example, there are 3 other wallets that have sent funds to the queried wallet (now represented as 'origin' 2606 in FIG. 30). If, for example, these 3 wallets are classified as suspicious wallets by the CARA algorithm disclosed earlier, a risk score indicative of such high risk may be displayed by the CATV application for each of these 3 wallets. In this example, the 3 other wallets have strong relationship with the queried wallet having the address 0xc29326019d172cc3d02c779e1df46dcf10b277c2 (in short, 0xc29326), thus, a risk score of above 0.5 (but below 0.75) is likely to be allocated to these 3 other wallets according to the CARA algorithm.

Figure 31:
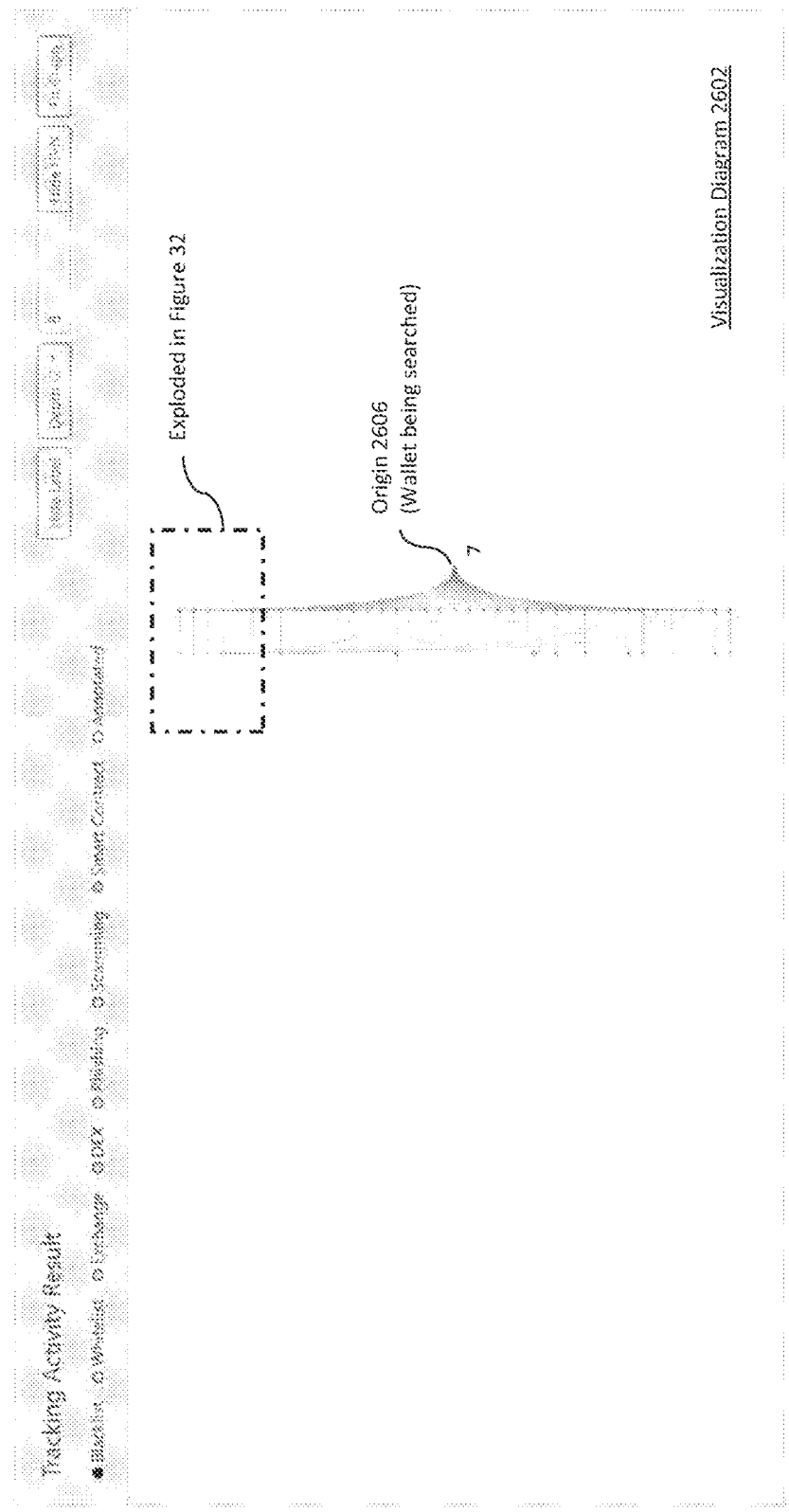
FIG. 31 illustrates an example of a flow diagram of backward transactions of a crypto wallet address being searched (destination depth=2).
Figure 32:
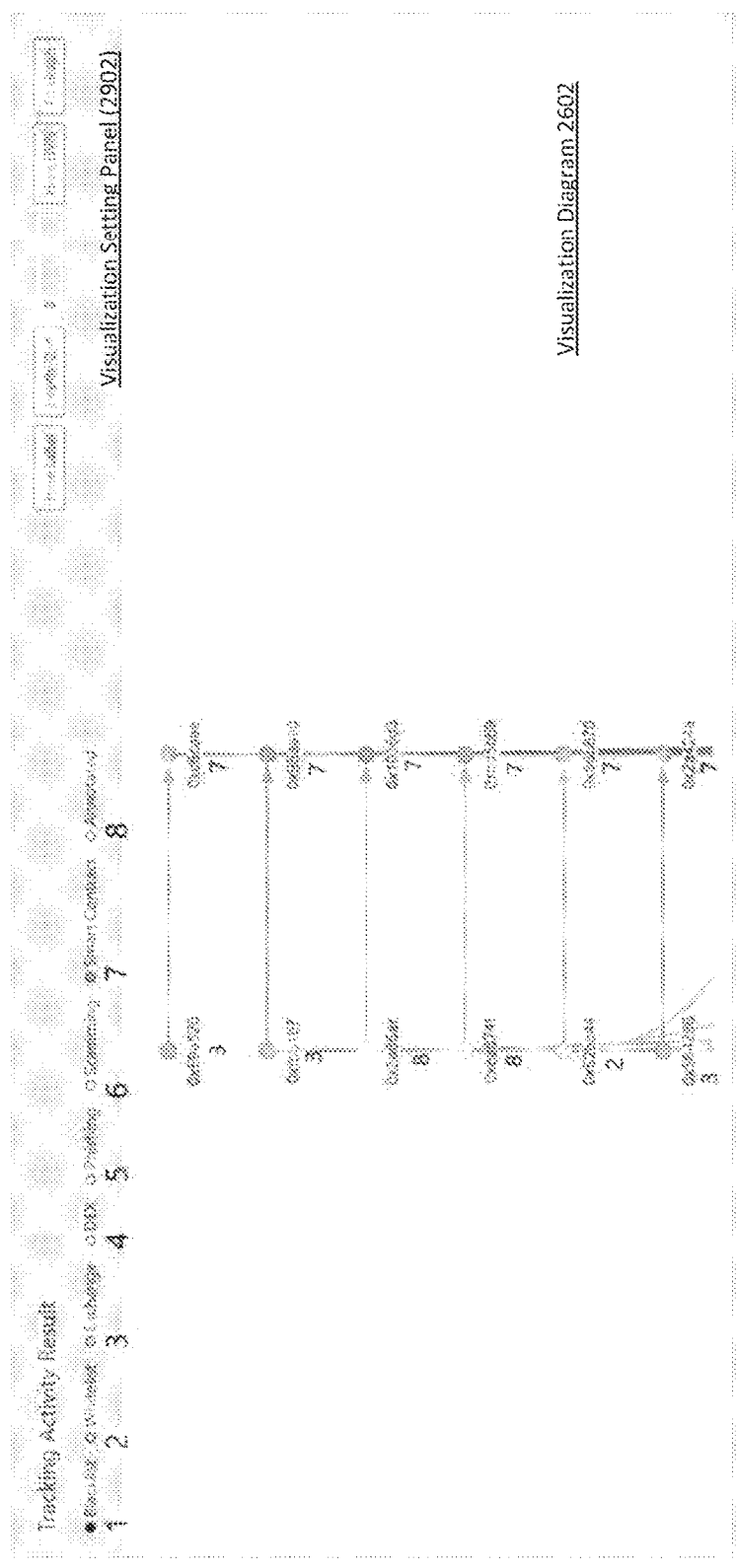
FIG. 32 illustrates an expanded view of a portion of the flow diagram of FIG. 31.

FIG. 31 illustrates an example that queries a wallet with an address "0xaf1931c20ee0c11bea17a41bfbbad299b2763bc0" (in short, 0xaf1931) and having transactions in a date range 28 Mar. 2019 to 28 Mar. 2019, wherein Distribution depth 2608 and source depth 2610 are set as 0 and 2 respectively. 0 setting causes the distribution depth to be not displayed on a visualization settings panel in FIG. 31. Specifically, the wallet being queried in FIG. 31 is related to a decentralised exchange, Luno that uses smart contracts as deposit wallets. FIG. 32 is a zoomed in portion or expanded view (for instance, activated by control of a mouse or a shortcut key) of a visualization diagram 2602 shown in FIG. 31 that is generated by the CATV application. Advantageously, it is possible for a user to identify relationships of other wallets that interacts with the queried wallet. For example, different exchanges have sent crypto assets into different deposit wallet addresses (smart contracts and labelled as '7' in FIG. 32) of the Luno exchange. The node that is being labelled as '2' in FIG. 32 is a mining pool, or otherwise known as a nanopool.

Figure 33:
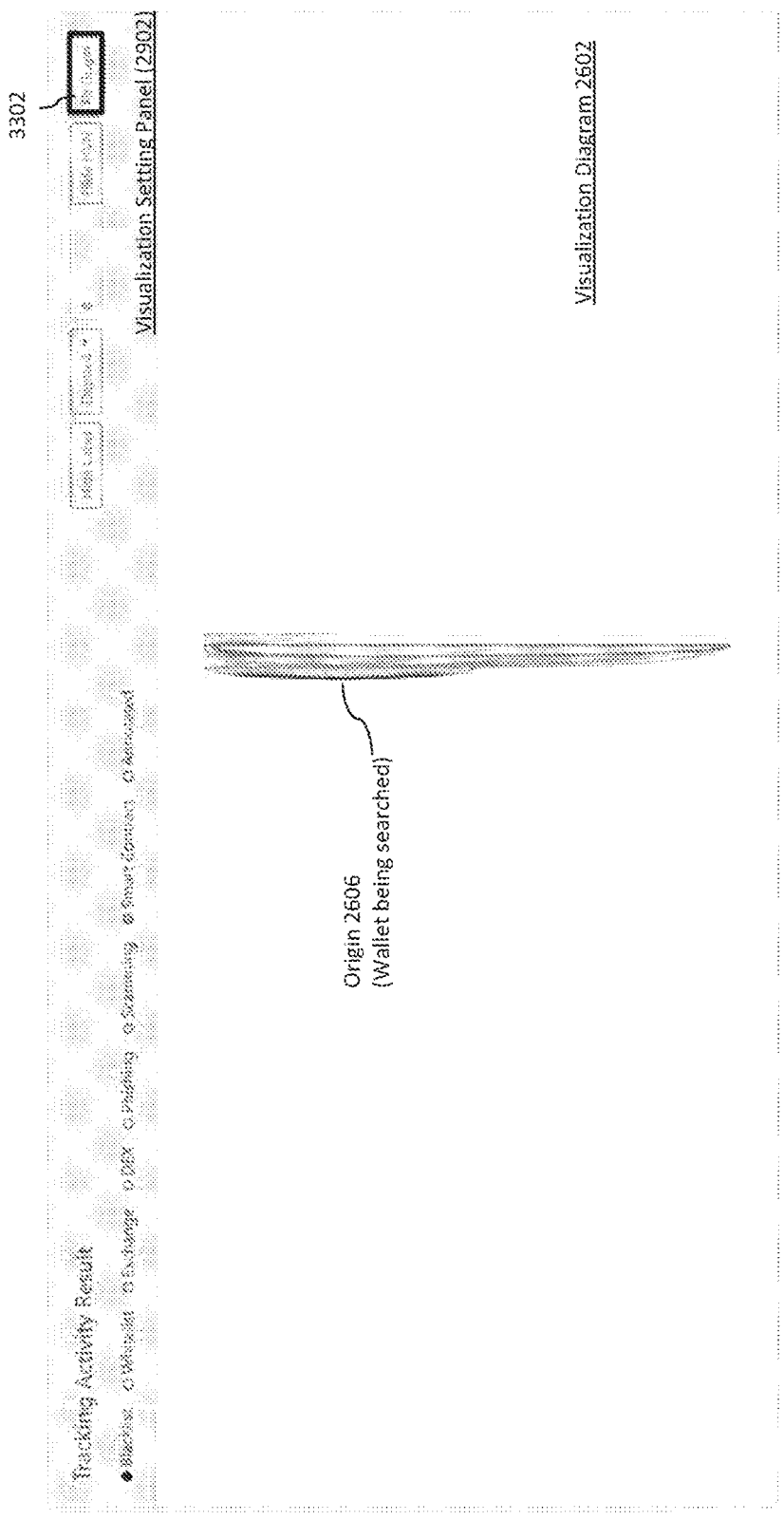
FIG. 33 illustrates an example of a flow diagram of forward transactions of a crypto wallet address being searched (destination depth=4).
Figure 34:
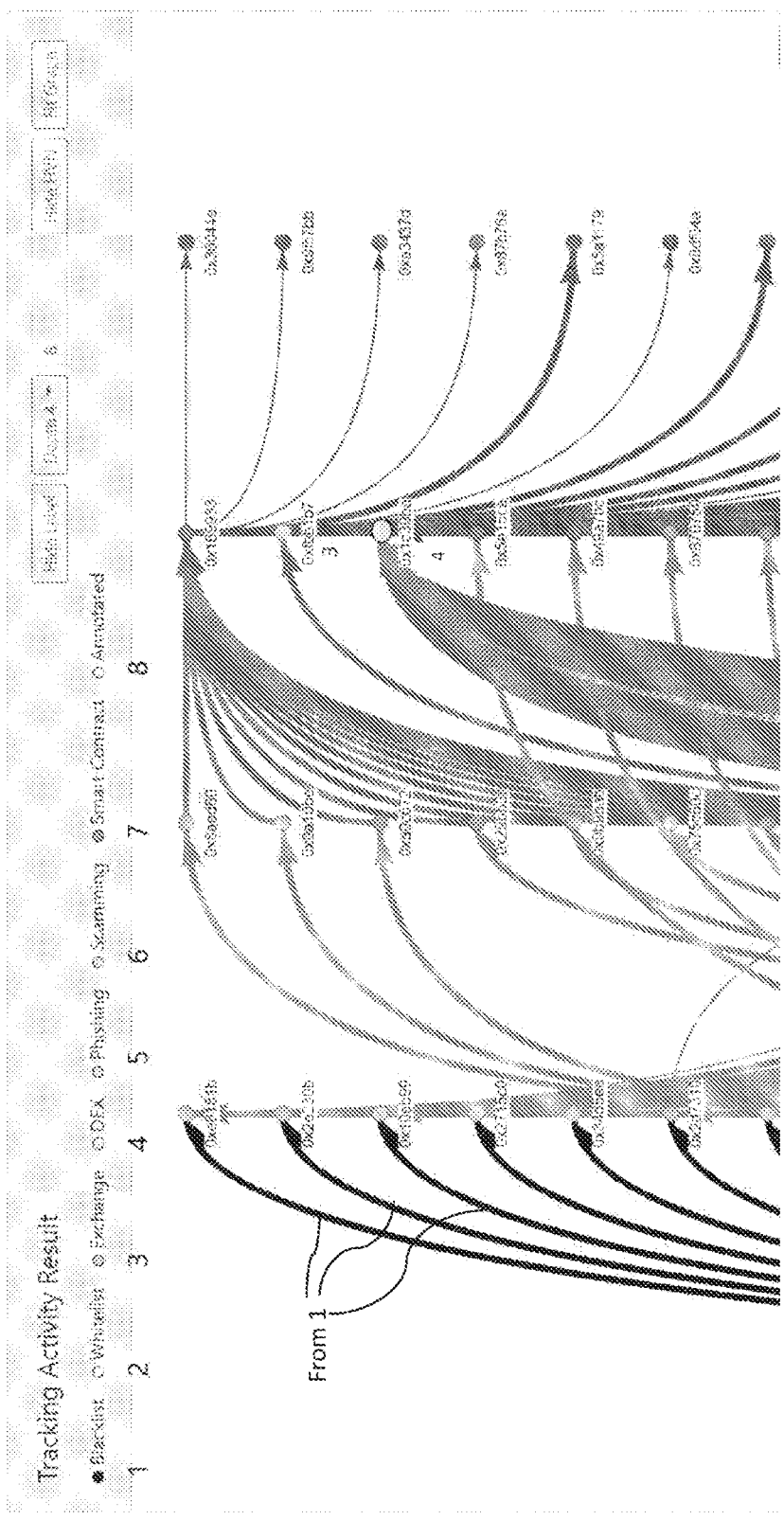
FIG. 34 illustrates an expanded view of the flow diagram of FIG. 33.

FIG. 33 is an example illustrating stolen funds associated with malicious wallets (depicted by lines associated with a node of type 1) that has gone through tumbling activities to avoid detection by the relevant authorities. In this example, the wallet queried has an address of "0xc5d431EE2470484B94CE5660aA6aE835346abb19" (in short, 0xc5d431), and the distribution depth is set as 4. The source depth is set as 0, and thus this field is not displayed on the visualization settings panel. When a "Fit graph" button 3302 on the visualization settings panel 2902 is clicked, the visualization diagram 2602 is arranged to fit on a viewing panel. The overall pattern of the visualization diagram 2602, when the "fit graph" button is clicked, is shown in FIG. 33. FIG. 34 is a zoomed-in portion or expanded view of the visualization diagram 2602 in FIG. 33. The flow of funds can be viewed more clearly in FIG. 34. Exit points of crypto assets can also be seen more clearly in FIG. 34. Specifically, most of the transaction lines converge to a wallet address 0x1c39ba39e4735cb65978d4db400ddd70a72dc750 (in short, 0x1c39ba) (labelled as '4" in FIG. 34) that is associated with a DEX named Shapeshift in Switzerland.

In one example, on the visualization settings panel 2902, there is provided a Hide HVN (High Volume Node) feature. The HVN (High Volume Node) feature is a setting to interact with a graph in the visualization diagram that has already been plotted based on the settings of the search panel. This feature is particularly desirable if the generated graph is very large, because it can be difficult for users to see what is happening in a limited display area. Therefore, the user may choose to only analyse a few nodes. This can be done by varying the settings to the Destination Depth (i.e. limiting the number of forward hops) or the Source Depth buttons (i.e. limiting the number of backward hops). Note that if the Source Depth is set as zero, the visualization diagram (such as FIG. 29) will only indicate the flow of funds sent from a wallet being inspected. Likewise, if the Destination Depth is set as zero, the visualization diagram (such as FIG. 31) will only indicate the flow of funds sent to a wallet being inspected.

Alternatively, the user may vary the setting of a threshold of the HVN feature. Specifically, the HVN feature is arranged to disable the appearance of a node that has more than a specified number of flow paths into a source node or a specified number of flow paths away from a destination node respectively. For instance, if a user chooses 4 as the threshold for the HVN feature and clicks on the "Hide HVN" button, as in an example illustrated by FIG. 36, the CATV application is configured to hide the nodes in the following manner:

1. If a node X on the distribution side (downstream of an inspected node) has more than 4 outbound paths, the CATV application will hide the node X and the flow paths going out from the node X.

2. If a node Y on the source side upstream of an inspected node) has more than 4 inbound paths, it will hide node Y and the flow paths going into node Y.

Figure 35:
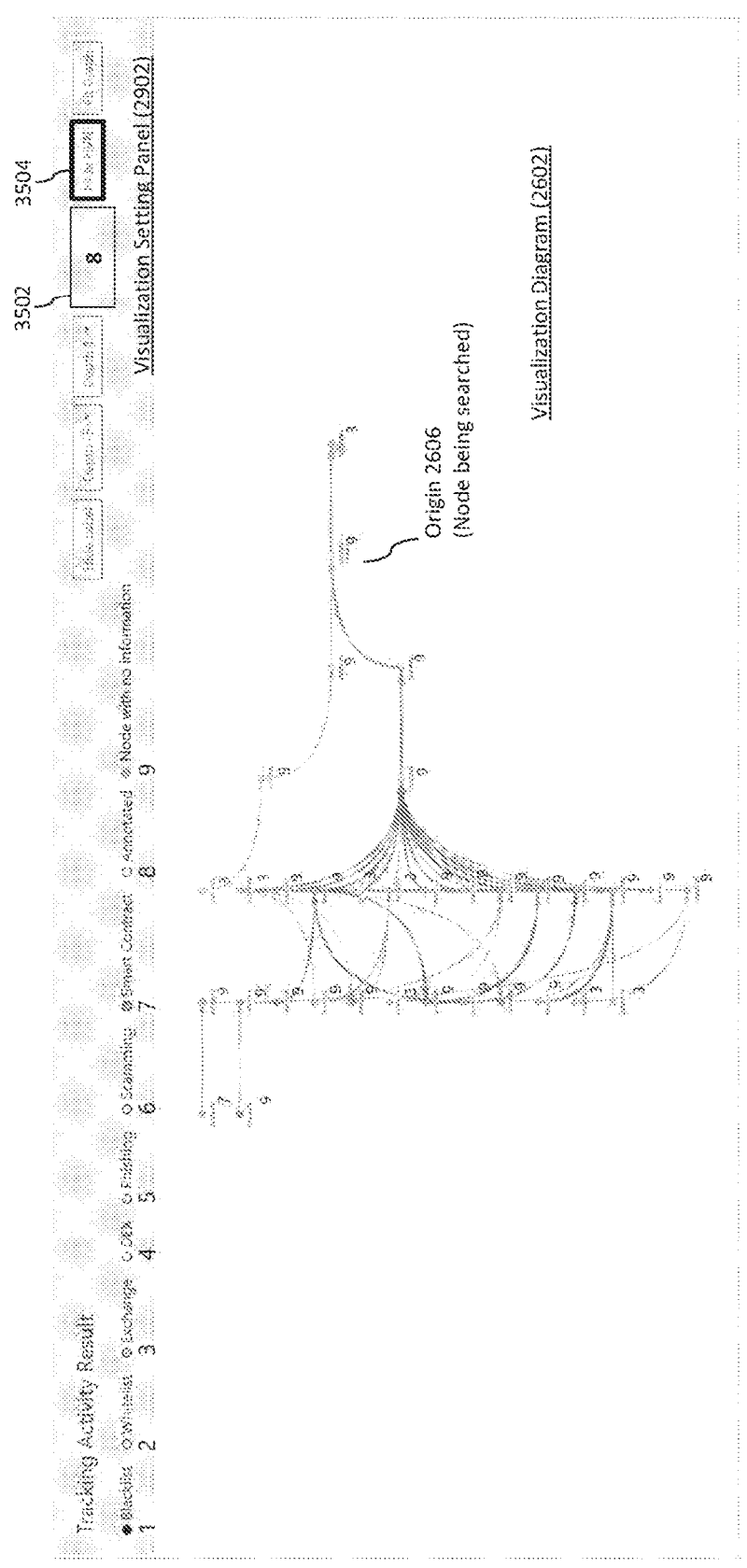
FIG. 35 illustrates another example of a flow diagram of a node being searched with threshold of a HVN (High Volume Node) parameter set as 8.
Figure 36:
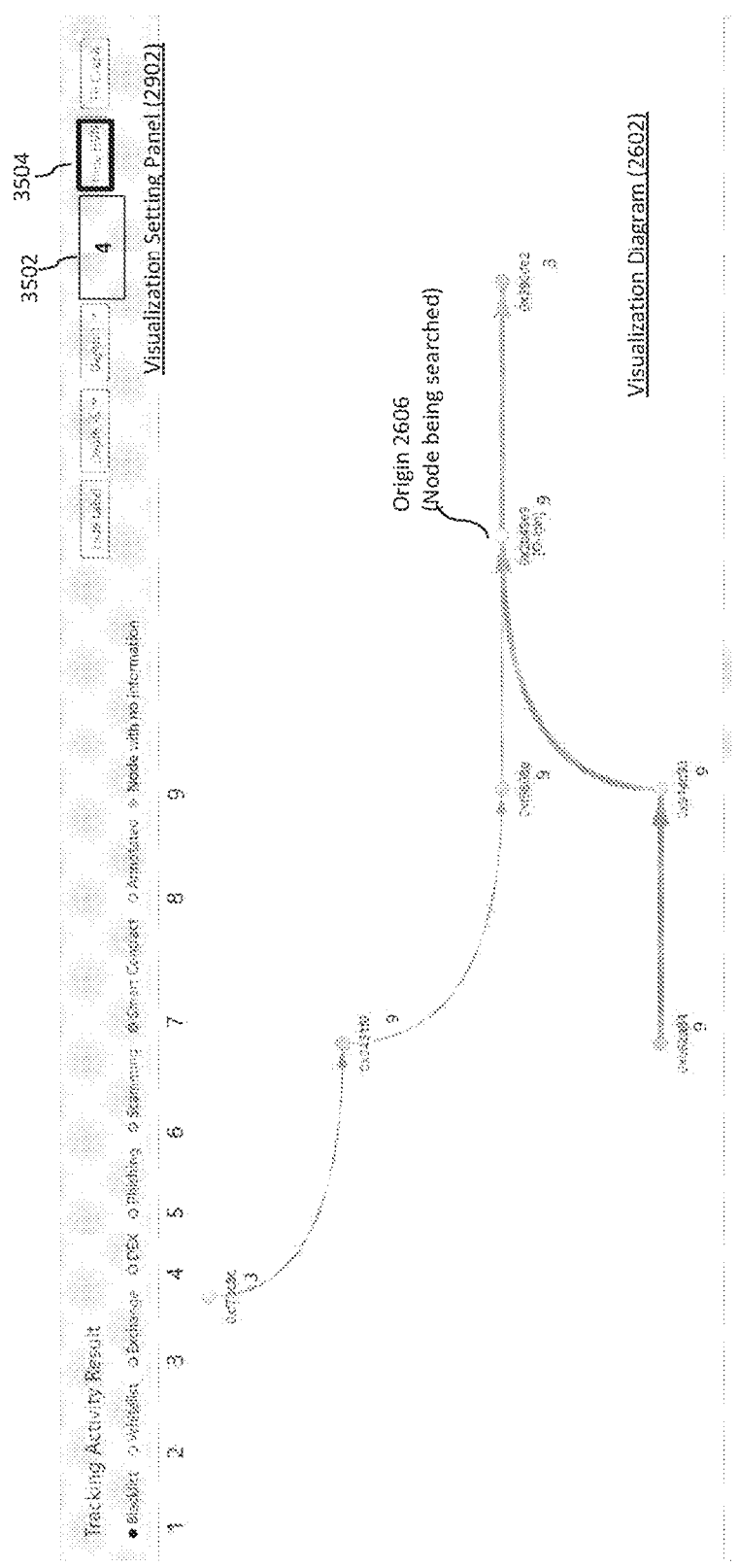
FIG. 36 is the revised flow diagram of FIG. 35 when the threshold of the HVN parameter is set to 4.

FIGS. 35 and 36 are respective before and after drawings illustrating what happens when a threshold value 3502 of the HVN feature is changed. Once the threshold 3502 of the HVN feature is changed from a value of 8 to a value of 4, the nodes that have more than 4 inbound paths and displayed in FIG. 35 are not displayed in FIG. 36. It should be appreciated that in a visualization diagram with the HVN feature enabled, the visualization diagram 2602 is considerably simplified. The CATV application may be configured to refresh the displayed visualization diagram once the threshold value of the HVN feature changes. In another modification, as shown in FIG. 52, the HVN feature can be further differentiated into Hide high volume inbound node and Hide high volume outbound node. This allows more flexibility while considering high volume inbound nodes and high volume outbound nodes independently. As shown in FIG. 52, there may be settings to assist a user to zoom in or out of a part of a virtualization diagram or to save a current virtualization diagram that is displayed as documentary evidence.

In another example, there may be provided an option to filter a path between two nodes of a virtualization diagram. As shown in FIG. 52, a user selects a blacklisted node with address 0xd2b89 in short and an exchange node with address 0x137ad9 in short as inputs to a path filter function. On receiving such "path filter" command, the CATV application is able to highlight the path between the two selected nodes. It can be seen that the virtualization diagram is much simplified in FIG. 53, as compared to FIG. 52. In this example illustrated by FIGS. 52 and 53, the path filter function is able to show how a blacklisted wallet address cashes out with an exchange. In addition, by clicking on a node of a virtualization diagram, details (such as wallet information, and transaction information) associated with the node can be displayed to the user.

Reports containing the visualization diagrams generated by the CATV application is different from reports generated by conventional transaction analytical tools. Conventional transaction analytical tools focus on tracking the flow of crypto assets no matter where they have been traded, including tracking of transactions of exchanges, which is inefficient. Tracking of transactions of exchanges is inefficient because it is difficult to track where bad tokens have been transacted as tokens (good or bad) are pooled to be transacted. Furthermore, the reports generated by conventional transaction analytical tools are simplistic and merely identify major sources of the crypto assets, which may be not relevant and/or outdated. For example, an exchange called MTGOX was one of the biggest exit scam in year 2014. The crypto assets should have already changed hands by now, but current reports (of year 2018/2019) generated using conventional transaction analytical tools are outdated as they still present MTGOX as the source of crypto assets. In contrast, the CATV application is configured to produce reports (comprising the visualization diagrams) that show detailed flow of crypto assets and the information of the nodes involved, which are more relevant then merely stating the source of crypto assets. Furthermore, the CATV application is a more efficient tool as it provides features to stop tracking transactions of an exchange. In one example, the CATV application is configured to display a node that has more than 500 transactions as just an exchange node (without displaying any inbound or outbound paths representing transactions). It would thus be advantageous for a gateway (including an exchange) to implement the CATV application as a layered security for tracking/monitoring crypto asset flow and for producing useful reports that allows convenient identification of malicious/suspicious/highly suspicious transactions that can be stopped in time.

Wallet Crawler System (WCS)

In the above examples described, a Wallet Crawler System (WCS) may be further implemented to collect and increase the number of annotated wallets in the threat reputation database (TRDB) i.e. the database 110 in FIG. 1. In particular, information relating to wallets associated to exchanges, such as Exchange Wallets and User Wallets issued by the Exchange to the users of the Exchange, would help to complement the above-discussed transaction tracking tool, CATV. Advantageously, a user will be able to better understand the transaction flow in a visualization diagram generated by the CATV if he or she is able to identify what kind of wallet money or token is flowing thereto or what kind of wallet money or token is flowing therefrom. A simple indication of a wallet's address does not provide useful information to a user. The term "Exchange" used in the present disclosure refers to decentralized exchanges and centralized exchanges that use centralized wallets or decentralized wallets collectively, unless specified to the contrary. In one arrangement, an Application Programming Interface (API) can be created to link the TRDB with the wallet crawler system.

A decentralized exchange (DEX) typically uses smart contracts, and individual user wallets interact directly with the smart contracts of a DEX. Some examples of DEX are EtherDelta and Bancor. A centralized exchange can use either regular wallets or smart contracts. Some examples of centralized exchanges are Bithumb and Upbit.

A personal user wallet is owned by an individual, and may be a hardware wallet, software wallet, MyEtherWallet and the like. The private key to the user wallet is held by the individual who owns the user wallet, and the user wallet can be used for a number of purposes, e.g. trading, gaming, token storing, etc.

An exchange wallet is owned by the Exchange and may be a centralized wallet or decentralized wallet. In some examples, the exchange wallet is used for only one transfer. The private key to the exchange wallet is held by the Exchange and the user wallet is for a single purpose, i.e. to facilitate trading on the Exchange.

Table 3 below is a guide to the various terms used within the WCS and their corresponding annotations used in the present example (if applicable). These annotations are used in the above-discussed Crypto Analysis Transaction Visualisation CATV application, and are stored in the threat reputation database (TRDB). The same annotations are also saved in a separate database local to the wallet crawler system (hereinafter wallet crawler DB), Note that unidentified wallets in the wallet crawler DB) is a node with no information in CATV. Information of such unidentified wallets will not be saved in the TRDB. Information of such unidentified wallets can be stored in the separate database local to the wallet crawler system. The unidentified wallets can be recorded in the TRDB once they are identified.

TABLE 3

Annotations used in the wallet crawler system (WCS) for use in CATV

| Term | Description | Examples | Annotation Used in CATV |
|---|---|---|---|
| Exchange | Centralized Exchanges | Binance, Upbit | <Exchange's Name> |

TABLE 3-continued

Annotations used in the wallet crawler system (WCS) for use in CATV

| Term | Description | Examples | Annotation Used in CATV |
|---|---|---|---|
| Exchange-Owned Wallet | Exchange-owned wallet refers to all wallets owned by an Exchange (Exchange Wallet, Storage, Gas Provider) | — | — |
| > Exchange Wallet | Hot Wallets used by Exchanges | 0x3f5ce5fbfe3e9af3971dd833d26ba 9b5c936f0be (Binance Exchange Wallet) | Exchange |
| > Gas Provider | | 0x007abbe8057433641acb791d966d 33a12cf82d01 (Poloniex Gas Provider) | Gas Provider |
| > Storage | Addresses used as cold storage by Exchanges (Cold Wallets) | 0x33683b94334eeBc9BD3EA85DDBD A4a86Fb461405 (Coinbene Cold Wallet/Storage) | Storage |
| > Controller | | 0x8ce4270cc607cc27d8abf21b6fdcd 3724ed5d513 (Bithumb Controller) | Controller |
| Wallet Creator Address | Contracts/ Addresses used by Exchanges to create new User Wallets | 0x2E05A304d3040f1399c8C20D2a9F 659AE7521058 (Luno Wallet Creator Address) | Creator |
| User Wallet | Deposit wallets used by Exchanges. Users deposit money into these wallets, which thereafter usually transfer any balance to the Exchange Wallets. | 0xef17710649cd06c52822c325d95a5 6590a606447 (Binance User Wallet) | User Wallet |
| DEX | Decentralized Exchanges - No user wallets provided by DEX. Smart contracts will facilitate P2P transactions. | 0x02B5e0C10862c8D24585C00282b DE99D09831a6c (Bancor Contract Address) | DEX |
| OTC | Over-the-Counter (Entities that facilitate trading outside of an exchange)/Escrows | | OTC |
| Token Contract Address | Address of token contract that manages all logic/transactions of particular token. | 0xc86d054809623432210c107af2e3f 619dcfbf652 (Uppsala Token Contract Address) | Token Address |
| Unidentified Wallet | Unannotated wallets. | — | Node with no Information |

The term "gas" discussed in relation to the wallet crawler system is a special unit used in the Ethereum block chain system. It measures how much computational resources are required to work on an action or set of actions. For example, to calculate one keccak256 cryptographic hash it will take 30 gas each time a hash is calculated, and a cost of 6 more gas for every 256 bits of data being hashed. Every operation that can be performed by a transaction or contract on the Ethereum platform costs a certain number of gas, with operations that require more computational resources costing more gas than operations that require few computational resources.

Figure 38A:
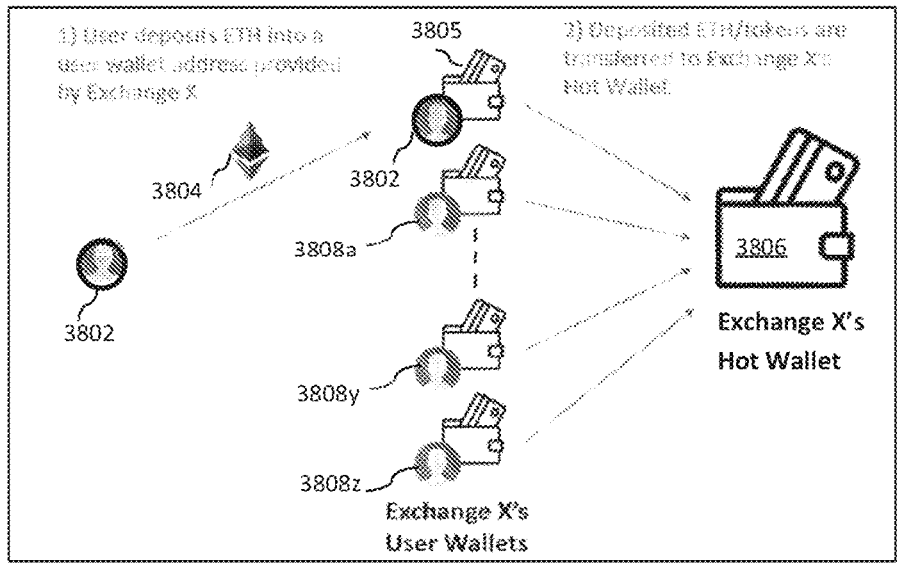
FIGS. 38A and 38B illustrate an example of flow of funds when a user made a deposit to an exchange according to an example of the present disclosure.

Most centralised exchanges have been observed to follow a 2-step process/behaviour when handling deposits received from user wallets. The observed 2-step process is illustrated in FIG. 38A. A user 3802 deposits an amount of crypto currency, in this case, ether 3804 into a user wallet address 3805 provided by an Exchange X. Exchange X is a centralised exchange that uses regular wallets. The user wallet 3805 is associated with the user 3802. Subsequently, the ether 3804 deposited into the user wallet address 3805 is transferred into a hot wallet 3806 owned by the Exchange X. The exchange hot wallet 3806 is also used for the transfer of cryptocurrency from other user wallets owned by other users of Exchange X, such as user 3808a, 3808y and 3808z. Although not illustrated in FIG. 38A, it should be appreciated that the exchange hot wallet 3806 is rarely used for withdrawal, i.e. transfer of cryptocurrency from the exchange hot wallet 3806 to the user wallets (e.g. 3805). In a transaction involving withdrawal, the exchange hot wallet is likely to transfer money to a relay wallet and use the relay wallet to perform the withdrawal.

Figure 38B:

As an example, using a blockchain explorer application, the wallet crawler system can crawl the transactions made by a known user wallet address to identify an exchange wallet. Using the example illustrated in FIGS. 38A and 38B, the user 3802 transfers an amount of 0.00160583 ether from his or her individual wallet 3807 (address 0Xbb6b14026136fc in short,) to a user wallet 3805 (having an address 0X64db1b94a0304e in short) that is provided by the Exchange X. Subsequently, the user wallet 3805 transfers ether to the hot exchange wallet 3806 (having an address of 0X257274276a4e5 in short). In this case, the user wallet 3805 transfers ether to the exchange wallet 3806 upon receiving instructions from the Exchange X. Typically, the address of the hot exchange wallet address 3806 will not be provided to the user 3802 for performing direct transfer of cryptocurrency in order to deter tracking and/or hacking by malicious actors.

Figure 38C:
FIG. 38C illustrates how an exchange wallet can be used to identify additional user wallets according to an example of the present disclosure.

The wallet crawler system can also be further configured to crawl back transactions of hot exchange wallet 3806 (having an address of 0X257274276a4e5 in short) in order to identify more user wallets. Continuing from the example in FIG. 38B, after identifying the exchange wallet 3806 from the user wallet 3805, the blockchain explorer application can be used to identify incoming funds transfer to the hot exchange wallet 3806. Therefore, as illustrated in FIG. 38C, more user wallet address can be identified. In one example, a wallet 3815 having an address 0X2140efd7ba3116 in short is a wallet that is identified to be an exchange-issued user wallet. However, the wallet 3815 is subjected to a verification process before storing and/or classifying the wallet 3815 as an user wallet in the TRDB 110.

Figure 38D:
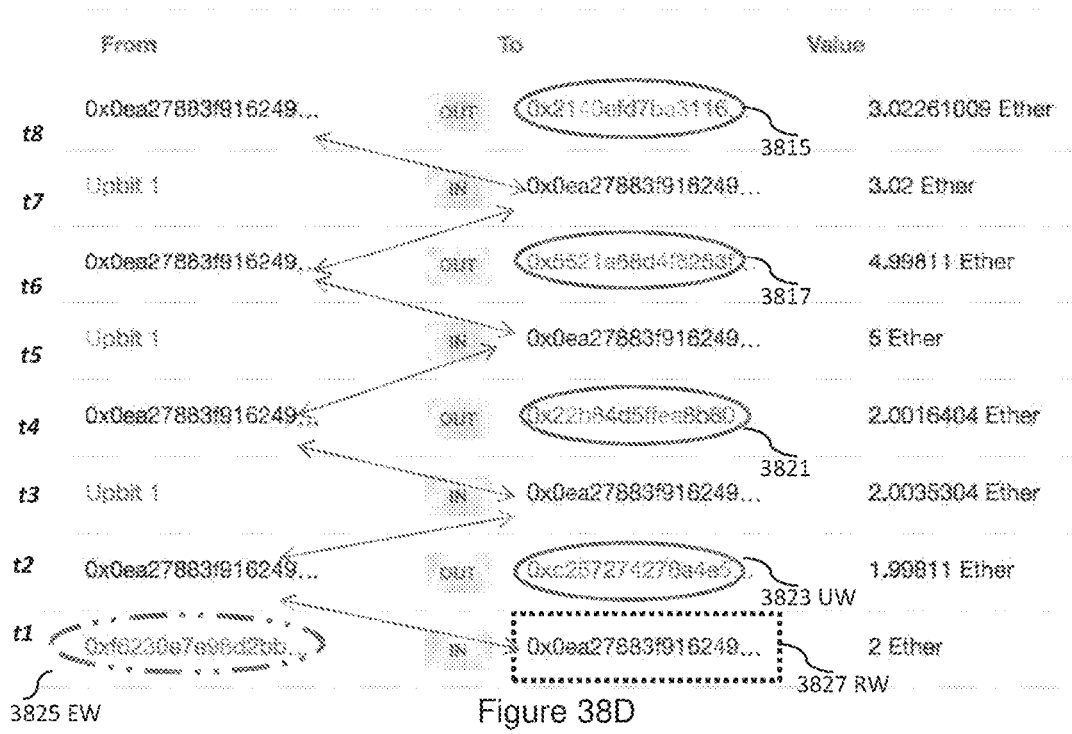
FIG. 38D illustrates how a relay wallet can be used to identify additional exchange wallets and/or user wallets according to an example of the present disclosure.

Likewise, the wallet crawler system can also be further configured to crawl (obtain) inwards and outwards transactions of a known relay wallet using a block chain explorer application. With reference to FIG. 38D, inwards and outwards transactions of a known relay wallet 3827 (having an address 0X0ea27883f916249 in short) of an exchange (e.g. Upbit) are crawled. In this example, some cryptocurrency has been sent to the relay wallet 3827 from a wallet 3825 (having an address 0Xf6230e7e98d2bb in short) at time t1, and some cryptocurrency has been sent from the relay wallet 3827 to a wallet 3823 (having an address 0X25727276a4e5 in short) at time t2. It can be seen in this example that some cryptocurrency has been sent to the relay wallet 3827 from a wallet labelled as Upbit 1 at time t7, and some cryptocurrency has been sent from the relay wallet 3827 to a wallet 3815 (having an address 0X2140efd7ba3116 in short) at time t8. Such characteristics reflects a typical withdrawal transaction made by a user wallet. Hence, in this manner, the wallet crawler system is able to identify additional exchange-issued user wallets 3817 (having an address 0X5521a68d4f8253f in short), 3821 (having an address 0X22b84d5ffea8b80 in short), and additional exchange hot wallet 3825 (having an address 0Xf6230e7e98d2bb in short). Although the other exchange hot wallet is labelled as "upbit1" in FIG. 38D, there is a wallet address associated with it (but not illustrated in FIG. 38D). The user wallet 3815 in FIG. 38D is a user wallet identified through the example discussed in FIG. 38C. Hence, during crawling, the wallet crawler system may identify the same user wallet and/or exchange wallet multiple times, and thus the wallet crawler system may be configured to check and if necessary update the data in the TRDB to avoid duplicate records.

Figure 38E:
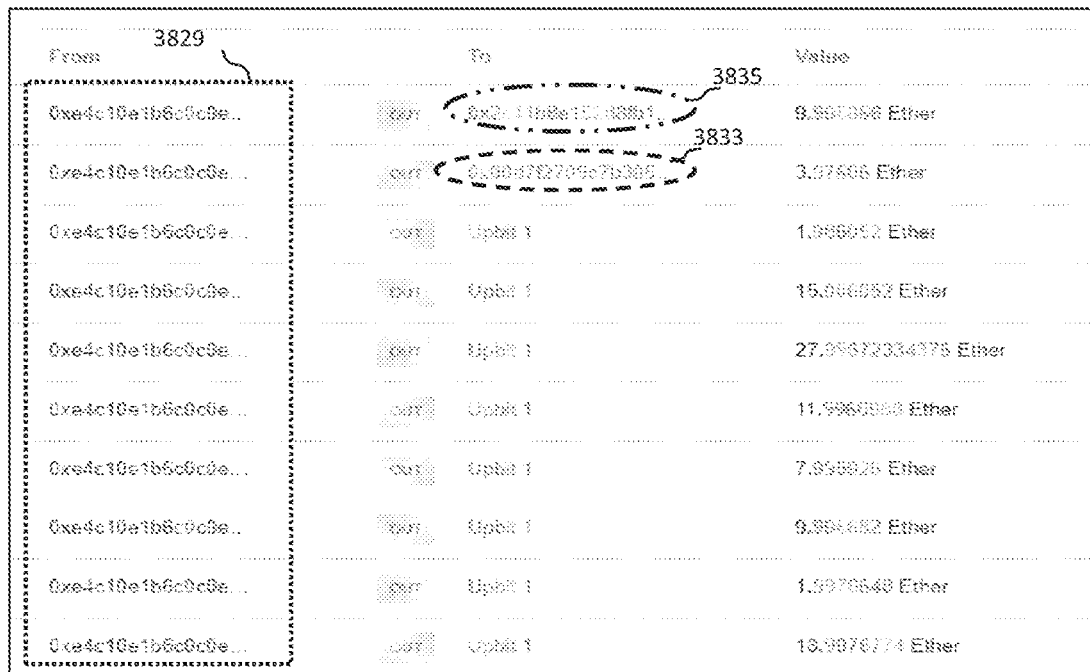
FIG. 38E illustrates how a user wallet can be used to identify additional exchange wallets and/or user wallets according to an example of the present disclosure.

The wallet crawler system can also be further configured to crawl (obtain) other exchange wallets address that interact with a user wallet. With reference to FIG. 38E, the block chain explorer application can be used to obtain past transactions of the user wallet 3829 (having an address 0Xe4c10e1b6c0c0e in short). In this example, additional exchange wallets 3833 (having an address 0X00d7f2709c7b305 in short), and 3835 (having an address 0X2c41b8e152d8fb1 in short) are identified.

Figure 44:
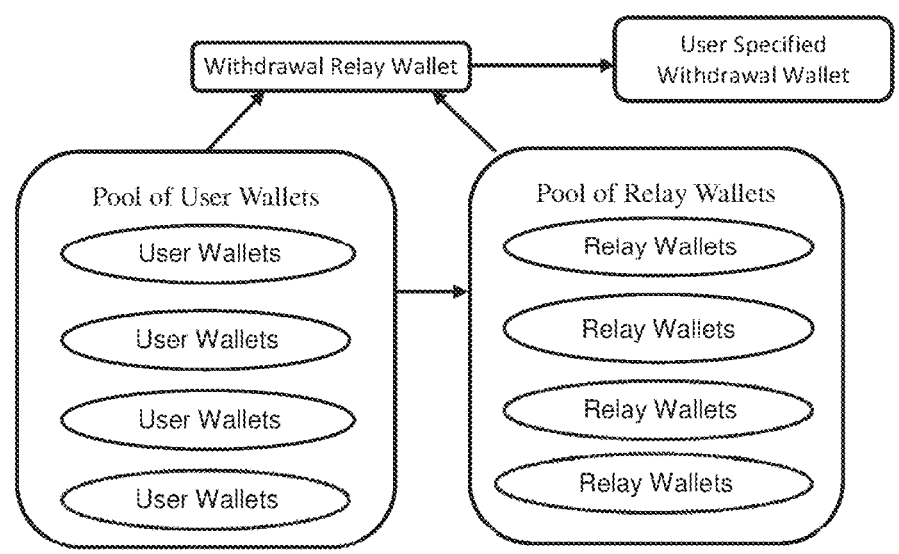
FIG. 44 is a schematic diagram showing how user wallets can interact with a centralised exchange with decentralised wallets.
Figure 46:
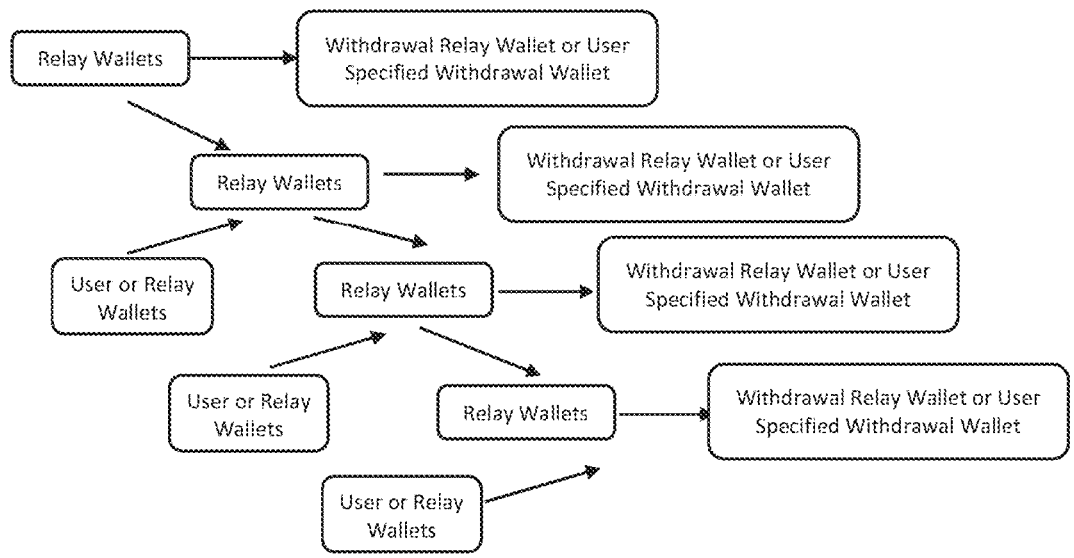
FIG. 46 is a schematic diagram showing how a relay wallet of a centralised exchange (with decentralised wallets) interacts with other user wallets, withdrawal relay wallets and/or relay wallets of the exchange.

User wallet may also be identified when an individual interacts with a centralised exchange with decentralised wallets (e.g. Coinbase). A schematic diagram showing how user wallets can interact with a centralised exchange with decentralised wallets is shown in FIG. 44. However, the user wallets may change after each transaction. Specifically, deposited coins in a user wallet can be used by the exchange for withdrawal by other individuals, and relay wallets may be used to move the balance in the user wallet (after the withdrawal) to the Exchange. Such transaction can be seen in a schematic diagram of FIG. 46 showing how individual wallets can interact with DEX.

In an example, and with reference to FIG. 41A, an individual deposits a value of 0.02 ether from an individual wallet (having an address 0Xdbb903b977a665 in short) into a specified user wallet 4105 provided by the Exchange at t1. The specified user wallet 4105 in this example has an address of 0Xeafa2b5bed5e4c. It can be seen that there are transactions made by the user wallet 4105. At t2, the user wallet 4105 transfers a value of 0.04 ether to a wallet 4111 (having an address of 0Xbe7fb8c3eccbd8). At t3, the user wallet 4105 transfers a value of 0.00859883 ether to a wallet 4109 (having an address of 0X242edd6abb67ec). At t4, the user wallet 4105 transfers the remaining value of 0.00541917 ether to a relay wallet 4107 (having an address of 0X6c839d71cc6916). A typical relay wallet can also be used for funds withdrawal, however, relay wallets are moved (e.g. divided) whenever a withdrawal is performed. As illustrated in FIG. 42C, when a value of 0.20215127 ether is withdrawn from a relay wallet 4212 having an address of 0Xd2a228a61cf14a8 in short, the relay wallet 4212 is split into three other relay wallets 4214*a*, 4214*b*, 4214*c*. Each of the relay wallets 4214*a*, 4214*b*, 4214*c* is being transferred a different amount of ether.

It should be appreciated that a relay wallet may be associated with fund transfer from other user wallets. This means that additional user wallets can be identified through a relay wallet. For example, and with reference to FIG. 41B, using a blockchain explorer application to obtain the IN txs (inward transactions) of the relay wallet 4107, additional user wallets (e.g. a user wallet having an address 0X2ed62af7df45f0c) can be obtained.

Referring now to FIG. 42A, it can be seen that a withdrawal of 0.00817883 ether was made from the wallet 4109 (having an address of 0X242edd6abb67ec in short) by a wallet having an address 0X869939a578d994 in short. This means that the wallet 4109 has only one IN Tx and one OUT Tx (outward transaction), and such observation is typical of a withdrawal relay wallet. Note that the withdrawal relay wallet is used for withdrawal only once. Hence, it can be deduced that the wallet 4109 is a withdrawal relay wallet.

Referring now to FIG. 42B, it can be seen that a transfer was made to other user wallet as gas payment (ZRX token), and the remaining amount of 0.00321716 ether is transferred to another relay wallet 4210 having an address 0X058b022501fe91.

Figures 42E, 42F, 42G:
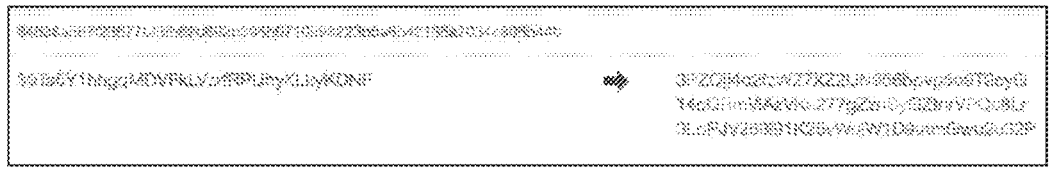
FIG. 42E to 42G illustrate how transactions history of a wallet can be used to determine a hot wallet or relay wallet from the example of FIG. 42D.

In another example, and with reference to FIGS. 42D-42G, the Sentinel is able to analyse, from obtaining OUT transactions of a user deposit wallet of Upbit Exchange, hot wallets or relay wallets of Upbit. In the present example, there are 3 wallets being identified. In order to identify whether each wallet is a relay wallet or hot wallet of Upbit, transaction history (e.g. number of transactions, balance) of each wallet is obtained. As seen in FIG. 42E, the first two wallets has only 2 transactions, and there is no balance remaining in the wallet. This suggests that the first two wallets, having respective address 0X3CvJQBKizTehMyAtZjKG47aev6kzBhaeJf and 0X39Ta6Y1hhgqMDVFkLVzrf RP UhyX LkyKDNF are one time use relay wallets. It can also be seen from transaction history of the second wallet (illustrated in FIG. 42F) that the second wallet has made transfer to a third wallet having the address 0X14cQRmViAzVKa277gZznBByGZtnrVPQc8Lr. With reference to FIG. 42G, it can be easily concluded that the third wallet is a hot wallet of Upbit because it has more than 20000 transactions, and the remaining balance is about 738 bitcoin. Since a hot wallet of the Upbit Exchange is identified, the wallet crawler system can be configured to retrieve all the IN transactions in order to identify more relay wallets and/or user deposit wallets of Upbit Exchange (see FIG. 42H).

In general, the wallet crawler system makes use of this 2-step behaviour to help identify the below wallets:

1) Exchange Wallets (Hot Wallet)

Exchange wallets can be identified through known user wallets. One way to obtain a known user wallet is to sign up the services of an exchange, and transfer a minimum sum to the wallet address provided by the Exchange. If many known user wallets of a certain exchange initiates transaction with a certain unannotated address (i.e. an unidentified wallet in the TRDB), it is highly likely that the address is an Exchange wallet of that exchange. Details have been discussed with reference to FIGS. 38A and 38B.

2) User Wallets

The leading condition for an unannotated wallet to be classified as a User Wallet of an exchange X is that the unannotated wallet should only send crypto currency (OUT Tx) to Exchange-Owned wallets of that exchange X. An outward transaction (OUT Tx) indicates cryptocurrency being sent from a wallet. User validation of user wallets can thus be performed by the wallet crawler system to quickly identify user wallets that only perform transfer to known exchange wallets or unannotated wallets that are validated by the Sentinels to be exchange wallets after analysis.

Figure 43:
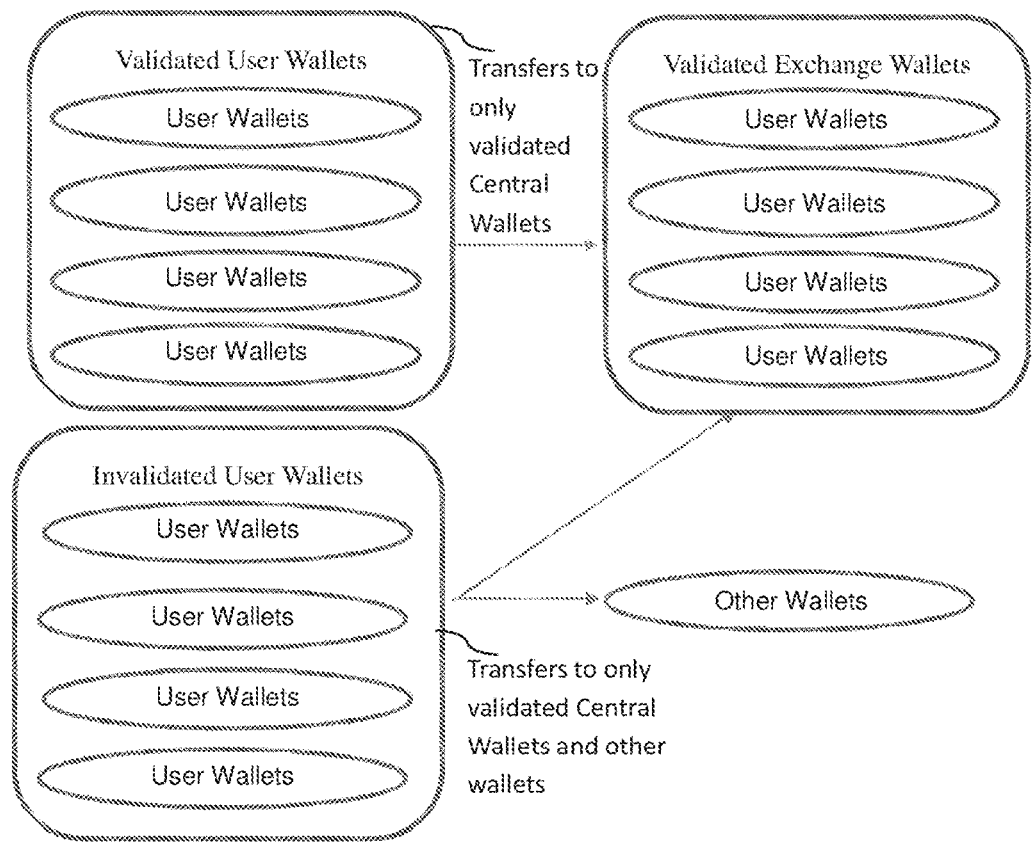
FIG. 43 is a schematic diagram showing how user wallets can interact with a centralised exchange with centralised wallets.

However, it is possible that in the case of an unannotated wallet, that is a user wallet, to have OUT Tx with other wallets that are not Exchange-owned wallets of the exchange X. For example, during token swaps, a User Wallet sends out to token swap addresses that are not owned by the exchange X. In such cases, the Sentinels (e.g. 150) would have to manually intervene. For instance, inwards transactions and outwards transactions of the address that transacted with the unannotated user and is not owned by the Exchange wallet will have to be analysed by a member of the Uppsala Security before determining whether the unannotated wallet should be recorded in the TRDB as an user wallet issued by the exchange. With reference to FIG. 43, validated user wallets are stored in the TRDB 110 and these wallets only perform transfers to exchange wallets, preferably to those exchange wallets that are verified and stored in the threat reputation base 110.

Figure 45:
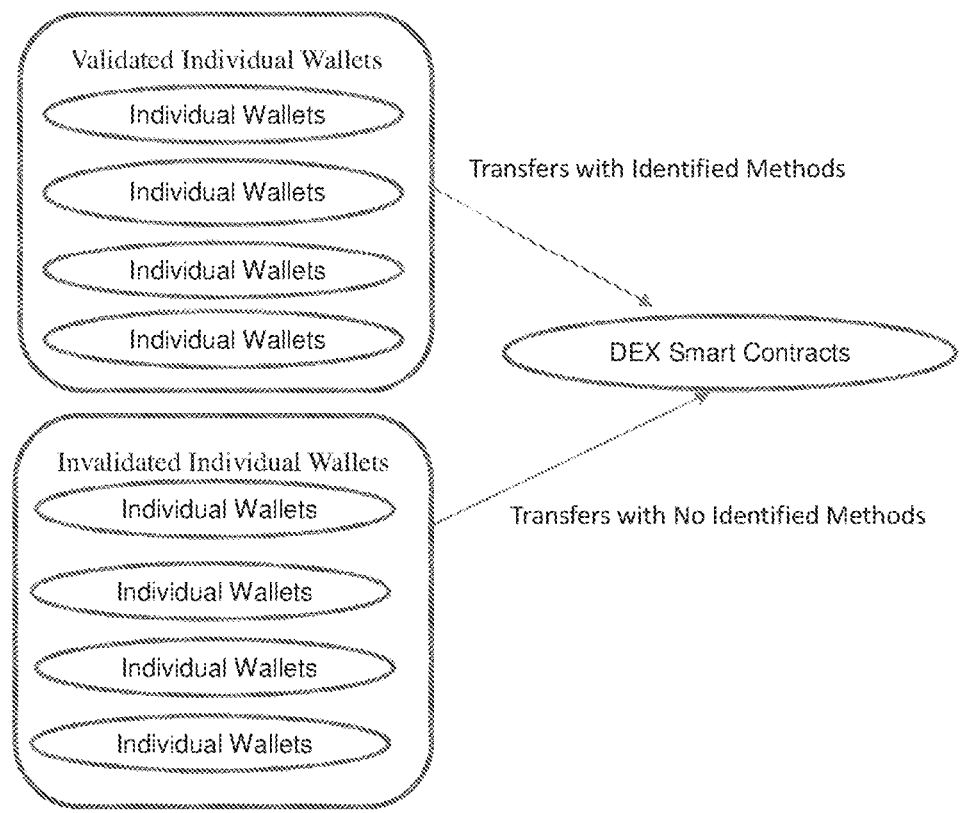
FIG. 45 is a schematic diagram showing how individual wallets can interact with DEX.

A schematic diagram showing how individual wallets can interact with DEX is shown in FIG. 45. As discussed earlier, individual user wallets typically interact directly with the smart contracts of a DEX. Hence, individual user wallets can also be identified by monitoring interactions with the smart contracts. The common methods used in smart contract can be broadly classified as a deposit, trading or withdrawal function, as illustrated in FIG. 37. Each method used in a smart contract is typically associated with a method identifier. In an example shown in FIG. 39, when an individual interacts with the DEX, such as EtherDelta, and the individual deposits a value of 1 ETH, a smart contract address "0x8d12a197cb00d4747a1fe03395095ce2a5cc6819" that is provided by the DEX can be collected and/or used for further analysis using a block chain explorer application (e.g. Etherscan). A simple schematic diagram shows how individual wallets (either validated or invalidated) can interact with DEX, for example with identified methods as discussed in FIG. 37 or unidentified methods.

Figure 40:
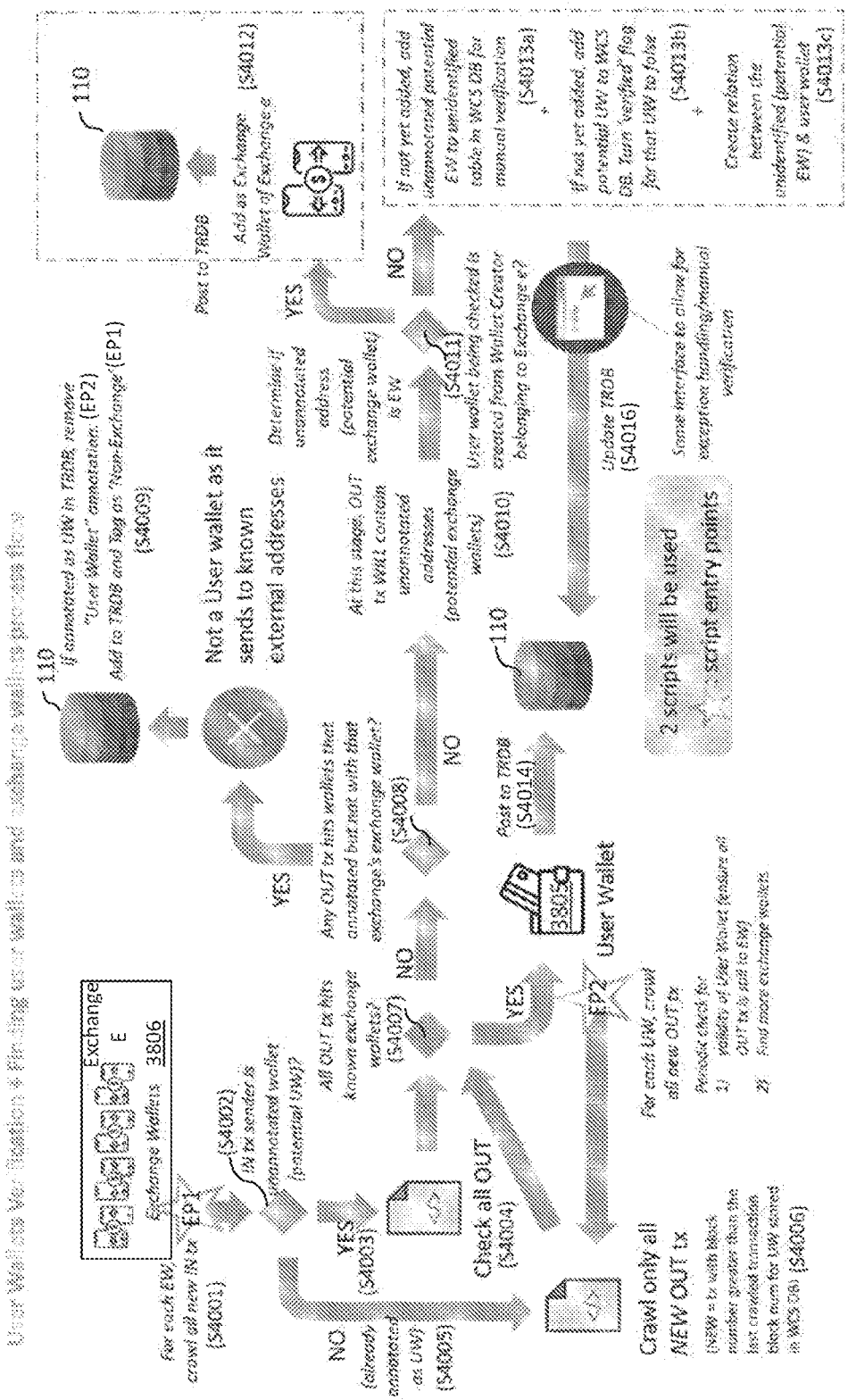
FIG. 40 is a schematic diagram of user wallet verification according to an example of the present disclosure.

In one example of the wallet crawler system, user wallets can be identified through a 2-step crawl-validate process as shown in FIG. 40.

User wallets can be crawled from 2 different sources:

1) Looking at the IN TX of Exchange Wallets

Since a key purpose of exchange wallets is to aggregate funds from user wallets, crawling the IN tx of Exchange Wallets is able to help to identify many user wallets.

With reference to FIG. 40, the WCS is configured to crawl all new inwards transactions (i.e. IN Tx) to each known Exchange Wallet address associated to a particular Exchange at a step S4001 (start of EP1). Known exchange wallet addresses can be retrieved from annotated data of the TRDB 110 or a database local to the wallet crawler system (WCDB). An inward transaction indicates cryptocurrency being received by a wallet. New IN Tx can be obtained by using a blockchain explorer application (such as Etherscan) to obtain new addresses that have sent cryptocurrency to a known exchange wallet. It should be appreciated that IN TX can be polled regularly, i.e. hourly, daily or weekly. In order to reduce the number of results returned from the blockchain explorer application, the latest result (transaction block identifier) returned by the blockchain explorer application in the last poll may be flagged, indexed before storing in the WCDB so that the next polling can start from the index stored in the WCDB.

Subsequently, the retrieved IN Tx of each known Exchange wallet addresses are processed to obtain a list of wallet addresses that have sent cryptocurrency to the respective known exchange wallet address. This list of wallet addresses are then compared with annotated data of the TRDB 110 or WCDB to obtain a list of unannotated wallet addresses at a step S4003. This list of unannotated wallet addresses are potential user wallets issued by the Exchange wallet. The list of unannotated wallet address for each exchange wallet may be processed individually or consolidated before further processing at step S4004.

At S4002, when the list of wallet addresses obtained by polling IN Txs of known exchange wallets is compared with annotated data of the TRDB 110 or WCDB, a list of annotated user wallet addresses can also be obtained at step S4005. It should be appreciated that S4003 and S4005 may be processed simultaneously. The list of annotated wallet address for each exchange wallet may be processed individually or consolidated before further performing re-validation at a step S4006. Re-validation of user wallet is desirable because it maintains data integrity of the TRDB and/or WCDB and reduces wrong classification of wallet addresses as user wallets of a particular exchange (i.e. false positives). User wallet re-validation at S4006 can also be initiated independently (i.e. start of EP1). In one example, the wallet crawler system may be configured to check all user wallets issued by an Exchange (e.g. Upbit, Binance) regularly. It should be appreciated that if user wallet re-validation is initiated independently (i.e. EP1), there are no potential user wallets to consider. Only annotated wallets (already present in TRDB) are analysed.

For each user wallet in the list of annotated user wallet addresses obtained at S4005, all new OUT tx are being crawled (e.g. using a block chain explorer application such as Etherscan). It should be appreciated that only new transactions associated with the annotated user wallets are crawled for computational efficiency, for instance, by obtaining new transactions that have a transaction identifier larger than a predefined transaction block identifier. In one example, the wallet crawler system is configured to store transaction block identifier of the last transaction of each annotated user wallet in the last crawl in a WCDB, and such parameter is used for crawling new transactions. It should be appreciated that the transaction block identifier in the WCDB is updated after each crawl.

In comparison, at S4005, all OUT tx are being crawled (e.g. using a block chain explorer application such as Etherscan) for each user wallet in the list of unannotated wallet addresses obtained at S4003. The list of obtained wallet addresses for each unannotated wallet address may be processed individually or consolidated before further processing at step S4007.

In other words, the respective OUT Tx are being crawled (e.g. through a blockchain explorer) for each of the list of unannotated wallet address and for each of the list of annonated wallet address. For the avoidance of doubt, only new OUT Tx for each of the list of annonated wallet address are being crawled, while all OUT Tx for each of the list of unannotated wallet address are being crawled. It is then determined at a step S4007 whether all the respective OUT Tx of each unannotated wallet address or each annotated user wallet address are related to known exchange wallets of the exchange being investigated (i.e. Exchange E). If it is determined at step S4007 that all the respective OUT Tx of one particular unannotated address are related to known exchange wallets of Exchange E (i.e. YES), the wallet crawler system is configured to classify such unannotated address as user wallets 3805 issued by Exchange E, and update the TRDB 110 and/or WCDB with the newly identified user wallet (together with the latest transaction block identifier) accordingly at a step S4014. Likewise, if it is determined at step S4007 that all the respective new OUT Tx of one particular annotated user wallet address are related to known exchange wallets of Exchange E (i.e. YES), the wallet crawler system is configured to update WCDB with the latest transaction block identifier. No update to the TRDB 110 is necessary because there is no change to the annotated user wallet. Steps S4006 and S4007 is the start of the user wallet verification process.

If it is determined at step S4007 that not all the respective OUT Tx of one particular unannotated address (which is a potential wallet address) or one particular annotated user wallet address are related to known exchange wallets of Exchange E (i.e. NO at S4007), the wallet crawler system is configured to determine, by using data stored in the WCDB, whether any of the respective OUT Tx of the potential user wallet address or annotated user wallet address matches any wallet address that are annotated, but not annotated as exchange wallets of the exchange under investigation (i.e. Exchange E) at a step S4008. In other words, the wallet crawler system is configured to determine if the (newly identified) potential user wallet address or the user wallet address (that is saved in WCDB) is sending tokens to an annotated address of the TRDB 110 and said annotated address is not associated with an exchange wallet belonging to the same entity of exchange wallet 3806 (i.e. Exchange E) that is being crawled at S4001.

If it is determined to be "YES" at step S4008, the potential user wallet address or annotated user wallet address that fits the determination condition (i.e. sends cryptocurrency to an annotated wallet, but not an exchange wallet of Exchange E) can be determined that it is not a user wallet. This is because the potential user wallet address or annotated user wallet is sending tokens to known external addresses that are not exchange wallets of Exchange E. Therefore, for the potential user wallet address, it is tagged as a "non-exchange wallet" before saving the newly identified wallet address in the TRDB 110 and WCDB at S4009. In comparison, for the annotated user wallet (that has been saved in the TRDB and WCDB), it will retagged as "non-Exchange" and updated in the TRDB 110 and WCDB at S4009 accordingly.

If it is determined to be "NO" at step S4008, the wallet crawler system is configured to obtain a list of unannotated addresses that are potential exchange wallets of Exchange E at S4010. Each of the potential exchange wallet address obtained at S4010 is determined at a step S4011 whether the corresponding potential user wallet address or annotated user wallet address is created by a wallet creator address of Exchange E. This can be done by checking a creatorAdd flag of the corresponding annotated user wallet address. For unannotated address (potential user wallet address), the wallet crawler system is configured to determine if the unannotated address is created by a wallet creator address of exchange E and set the value of creatorAdd flag accordingly. In this example, if creatorAdd flag is true, the corresponding wallet is created by a wallet creator address of an Exchange.

If the creatorAdd flag is true for an annotated user wallet address or a potential user wallet address at S4011, the potential exchange wallet address will be classified as an exchange wallet and the TRDB 110 will be updated to include the newly identified exchange wallet of Exchange E at S4012. Thereafter, the wallet crawler system is configured to annotate the potential user wallet address as a user wallet issued by exchange E, if the potential user wallet address has not been registered in the TRDB 110 or WCDB. In comparison, for an annotated user wallet address, there will be no update to the TRDB or WCDB required (since data is unchanged).

However, if the creatorAdd flag is false for the annotated user wallet address or the potential user wallet address, the potential exchange wallet address will be saved in WCDB as an unidentified list for manual verification by a member of Uppsala Security at S4013a. The wallet crawler system is further configured to annotate the potential user wallet address as a user wallet issued by exchange E, if the potential user wallet address has not been registered in the WCDB. Subsequently, a verified flag of these annotated wallet address is set to "off" at a step S4013b and a table indicating relationship between each potential exchange wallet address and each potential user wallet address and/or annotated user wallet address is updated in WCDB at S4013c. In this example, the verified flag being false indicates that the annotated user wallet fails user wallet verification. At step S4013b, if the annotated address where the verified flag is being set to "off" and found to be recorded in the TRDB, the wallet crawler system will update the TRDB accordingly.

It should be appreciated there is some interface (e.g. menu in FIG. 47) operable by Uppsala Security to allow for exception handling and/or manual verification. Once investigation of an unannotated address in the unidentified list is complete, the TRDB 110 will be updated accordingly at a step S4016. This means that if a wallet address has not been verified to be a user wallet or an exchange wallet, it will not be saved in the TRDB 110 (i.e. only recorded in WCDB). However if a user wallet address in the TRDB 110 fails the user wallet re-validation process, the verified flag of such user wallet will be turned off (but the record will not be deleted).

It should be easily envisaged by a skilled person that not all of the IN txs to Exchange wallets originate from user wallets. For example, exchanges have been observed to transfer funds between their exchange wallets. In another example, there might be individuals who for different reasons (e.g. advertising), incorrectly send money or tokens directly to Exchange wallets.

To counter the false positives, the Wallet Crawler System will run its user wallet validity check on newly identified user wallets. The user wallet validity check process has been elaborated earlier (i.e. EP2 of FIG. 40).

2) Looking at Wallet Creator Addresses

Wallet Creator addresses are contracts/addresses used by some Exchanges to create new User Wallets. Once manually identified and verified by member(s) of Uppsala Security, these addresses can then be crawled to retrieve the addresses of the user wallets it creates.

These crawled addresses are very likely User Wallets, and such wallet addresses can be stored directly into TRDB 110 and WCDB (if it has not been saved). However the Wallet Crawler System can be configured to run its validity check on these wallets ($2^{nd}$ step of the process—validate), as more exchange wallets can be potentially identified here. Validation of user wallets is elaborated with reference to FIG. 40, EP2.

It should be appreciated that the crawled addresses include both newly identified address and user wallet addresses that have been saved in the TRDB 110 and WCDB. For each user wallet identified in this manner, the user crawler system is configured to crawl all OUT tx at S4006 (using data from a block chain explorer application).

For computational efficiency, only new transactions associated with the user wallet that are annotated in the TRDB are crawled, for instance, by obtaining new transactions that have a transaction identifier larger than a predefined transaction block identifier. In one example, the wallet crawler system is configured to store transaction block identifier of the last transaction of each annotated user wallet in the last crawl in a WCDB, and such parameter is used for crawling new transactions. It should be appreciated that the transaction block identifier in the WCDB is updated after each crawl.

The list of obtained wallet addresses for each user wallet at step S4006 may be processed individually or consolidated before further processing. Steps S4007, S4008, S4009, S4010, S4011, S4012, S4014, and S4013a-c following S4006 will not be discussed again as these steps have been discussed above, and with reference to FIG. 40C. The only difference is that there are no potential user wallets to consider, but annotated wallets.

Therefore, the wallet crawler system is capable of identifying new exchange wallet and/or new user wallet issued by exchange from the data provided by a block chain explorer application. Such information increases the number of annotated wallets in the threat reputation database (TRDB), such as the database 110 in FIG. 1. In particular, information relating to wallets associated to exchanges, such as Exchange Wallets and User Wallets issued by the Exchange to the users of the Exchange, would help a user better understand the transaction flow in a visualization diagram generated by the CATV if he or she is able to identify what kind of wallet money or tokens is flowing thereto or what kind of wallet money or tokens is flowing therefrom. A simple indication of a wallet's address does not provide useful information to a user.

Main Functionalities of Wallet Crawler System

The functions of the wallet crawler system can be accessed through a graphical user interface (GUI) to a member of Uppsala Security. The GUI may be presented as a menu, as shown in FIG. 47A. With reference to FIG. 47A, one can view the current running processes/crawls at the top of the menu. Advantageously, this is to prevent resources from being allocated to an identical crawling query. In simpler words, this feature is to prevent users who have access to the wallet crawler system from crawling blockchain transactions using the same parameters.

The functionalities of the wallet crawler system can be segregated into two main segments—Exchange and Non-Exchange. In general, the Exchange segment is configured to obtain Centralised Exchange related wallets, while the Non-Exchange segment is configured to obtain Non-Exchange wallets, such as those relating to DEX, Gaming or OTC addresses. The below paragraphs will described the functionalities relating to the Exchange segment.

User Wallet Validity Check (FIG. 48)

Following the assumption that all valid User Wallets should only have OUT tx to other Exchange-owned wallets of their parent exchange, the wallet crawler system has built in functionality to identify any annotated User Wallets that does not fulfil this requirement.

During the validity check process of the user wallets obtained through crawling, both normal and ERC20 OUT transactions will be tracked. This require a user to enter details of an exchange wallet to crawl.

During crawling of normal OUT transactions, the transactions having TX value of 0 are ignored. This is because destination of such transfers are usually to Token Contracts and are for ERC token transfers. The actual destination of token transfer will be accounted when crawling ERC 20 transactions.

During crawling of ERC 20 OUT transactions, transactions that are related to spam tokens defined within WCS. (such as blockwell.ai KYC Casper Token, tinyurl.com/nicetokens) are ignored.

When the wallet crawler system detects an OUT transaction made from an annotated user wallet to any destination address that has not been annotated as an Exchange-owned wallet of the user wallet's parent exchange (by comparing the TRDB), the destination address will be marked as an unidentified wallet. In addition, association between user wallet and unidentified wallet will be recorded in the WCS DB (e.g. S4013c in FIG. 40).

Preferably, when validity check is done in bulk, the wallet crawler system is configured to skip validity check for addresses with more than 500 transactions for efficiency. These addresses with more than 500 transactions can either be manually checked by a member of Uppsala Security or through a special validity check function in the wallet crawler system that can be invoked by accessing through a 'User Wallet validity check (Big Tx)' on the main menu (e.g. option 24 in FIG. 47A).

Upon completion of the validity check, all unidentified wallets that have 10 or fewer associations with user wallets of the Exchange under inspection will be automatically classified as 'Non-exchange', and all the associated user wallets will be sent to the portal to be declassified. This means that annotation of these wallets will be changed from 'User Wallet' to 'Non-exchange' (e.g. in S4009 of FIG. 40). The rationale behind this is that Exchange-owned wallets typically have a substantial amount of interaction with user wallets. Hence, if an unidentified wallet does not interact with at least user wallets, it can be safely assumed that the unidentified wallet is likely not an Exchange-owned wallet. Advantageously, false positives can be reduced. It should be appreciated that the value "10" in the condition of "10 or fewer associations" can be a variable that is defined through machine learning.

At the end of every validity check, all User Wallets that have not been posted to the portal and do not have any associations with unidentified wallets, will be posted to the portal. In other words, only validated user wallets that are not duplicates of the data in TRDB will be posted. It should be appreciated that the User Wallet validity check is automatically invoked at the end of every wallet creator or exchange wallet crawl. However, user wallet validity check can also be manually invoked by users through the 'User Wallet validity check (Exchange)' function via the main menu (e.g. option 23 in FIG. 47A). This is to allow the Sentinel to run the validity check on all User Wallets of a specified exchange, if required, to ensure data integrity.

In summary, the 'User Wallet Validity Check' process can be used to do the following:
1) Identify new exchange wallets: Unidentified wallet could be exchange wallet, reinforcing that annotated user wallets are valid.
2) Identify false positive User Wallets: In the event that unidentified wallet is verified as non-exchange wallet, all annotated user wallets that transfer to it will be identified as false positives.
3) Identify token contract addresses: OUT tx info can include token contract addresses.
4) Track wallet relationships (Form associations between wallets) M2M tables are created to store transaction relationship between following wallet types
   i. User Wallet↔Exchange Wallets
   ii. User Wallet↔Token Contract Addresses
   iii. User Wallet↔Unidentified Wallets After every validity check, the Uppsala Security will be alerted of the unidentified wallets so that he or she can perform further analysis to handle the unidentified wallets.

To handle unidentified wallets, the Sentinel can access the 'Handle Unidentified Wallets' function of the Wallet Crawler System.

In one example, a table showing all unidentified addresses with the exchange that these unidentified addresses are suspected to belong to, and the number of User Wallets it received from will be displayed to a member of the Uppsala Security. With reference to FIG. 49A, the unidentified address, 0X2bb97b6cf6ffe53576032c11711d59bd056830ee, has an identifier 3993 and is associated with the Kraken exchange. It has transactions with 434 user wallets. Likewise, the unidentified address, 0X097511b9af934c6acb44ba110c24783f57fb4cbb, has an identifier 5625 and is associated with the Bitbay exchange. This unidentified wallet has transactions with 470 user wallets.

The member of the Uppsala Security is required to enter the identifier of the unidentified wallet he would like to handle from the list of unidentified addresses. Following from the example in FIG. 49A, the member selects unidentified wallet having the identifier 5625. A more thorough breakdown for the selected wallet can also be displayed upon the request of the Uppsala Security member. For instance, the addresses of the user wallets that transacted with the unidentified wallet are displayed (see FIG. 49B). Such information is able to help the member of the Uppsala Security to decide on how the unidentified wallet should be handled. For instance, if an unidentified wallet is associated with a large number of User wallets, it is highly likely that it is an Exchange-owned wallet.

In one example of the wallet crawler system, unidentified wallets can be handled in four main ways. The Sentinel can input any one of the four actions. As shown in FIG. 49C, if the Sentinel enters 'y', the unidentified wallet can be reclassified as Exchange wallet, and all user wallets that sent tokens to this address will remain as valid user wallets.

If the Sentinel enters 'n', the unidentified wallet can be rejected as Exchange wallet, and all previously identified user wallets that sent to this address cannot be user wallets and thus these identified user wallets will be re-annotated as "Non-Exchange Wallet". If the Sentinel enters 'nv', the unidentified wallet will be rejected as exchange wallet, but the user wallets that sent to this address is still valid. This option is applicable if the unidentified wallet is for token swap. Alternatively, the unidentified wallet can remain in the list by entering "1" because no decision has been made by the Sentinel.

To prevent spam addresses from being wrongly identified as user wallets, the Wallet Crawler System is configured to ignore certain transactions that involve spam tokens, such as blockwell.ai, during the crawling of user wallets via exchange wallets IN. However, in the event that some spam broadcast addresses is being captured, these spam addresses can be detected by the wallet crawler system when validity check process is performed on these spam addresses.

When validity check is run on these wallets, a lot of unidentified OUT wallets will be found (because it is a spam address). For example, as shown in FIG. 50, there are a total of 133,406 transactions associated with the spam address associated with ElectrifyAsia. Another example relating to spam address of KYC Casper token is shown in FIG. 51

The wallet crawler system is configured to allow a Sentinel to flag spam address(es). In one example, the Sentinel can invoke such function by choosing option 27 of the main menu (e.g. FIG. 47A), When a spam address is flagged, the wallet crawler system is configured to remove all OUTs of that address from the unidentified wallet list. Subsequently, an automated request will also be sent to the TRDB to overwrite the incorrect 'User Wallet' annotation for that spam address, and correct the record as a spam address. It should be appreciated that the wallet crawler system may comprises a separate database to store the annotations and the wallet address, and in such example, the Sentinel Protocol is configured to refer to the separate database and/or threat reputation database during its execution.

To gain more visibility into the blockchain, the wallet crawler system is configured to identify and form associations between Non-exchange (personal) wallets and addresses belonging to various services (e.g. DEX, Gaming, OTC). In one example, the wallet crawler systems allow the Sentinels to enter in (post) to the Sentinel Portal any Non-exchange wallets they have found to made transactions to DEX, OTC, Gaming, Gambling wallets (DOGG) through a text file. For instance, when the Sentinel chooses option 5 of the main menu (e.g. FIG. 47A), the wallet crawler system receives a text file.

The format of the .text file is in the following format <address><tab><Relationship with DOGGwallet (DOGG)><enter\n>

Some examples are:
0x1223 . . . Relationship with 0xb169 . . . (Crypto Kitties)
0x5412 . . . Relationship with 0xb169 . . . (Crypto Kitties)

Similar to the crawling of Exchange wallet addresses, IN tx of DOGG wallet addresses (i.e. DEX/OTC/Gaming/Gambling addresses) can be crawled by the wallet crawler system to identify Non-exchange wallets. There will however be no need for validity checks to be done on these identified Non-exchange wallets.

The rationale is that Exchange user wallets is unlikely to make OUT tx to DOGG wallets, hence any wallet that sends to a DOGG is Non-exchange wallet. In one example, the wallet crawler system is configured to record the relationship between the obtained senders' addresses and DOGG addresses and/or the contract's method ID (e.g. FIG. 39) that was invoked during the transaction.

Sentinel Protocol is expected to become an effective platform to help the current cybersecurity ecosystem, especially the cryptocurrency security industry, which suffers from an inherent lack of oversight. The pre-emptive response to the new attack vectors in Sentinel Protocol has been proven to be effective through machine learning. However, the ambiguity of the threat based on probability is still a challenge. Utilizing the collective intelligence of the blockchain, Sentinel Protocol provides for a more efficient solution to solve the cryptocurrency security problem. In addition, Sentinel Protocol opens up opportunities for individuals with the right skills and/or security vendors to take part in this Protocol for decentralized security on the block chain industry and/or the cryptocurrency security industry. Consequently, it brings about a greater positive effect for the many parties in collaboration with the cryptocurrency industry, such as exchanges, payments, and wallet companies. These parties who may or may not be protected by the legal system can now operate in a more secured environment by tapping on a decentralized threat database maintained by crowd sourcing.

A Security and Intelligence Platform for Block chain" (SIPB) (e.g. 100 of FIG. 1) according to an exemplary example of the present disclosure between an apparatus 5402 for managing the threat reputation database, a Sentinel device 5404 owned by a Sentinel and a user device 5406 owned by an individual utilizing the Sentinel Protocol is illustrated with FIG. 54.

The apparatus 5402 may be a computing device and comprises a number of individual components including, but not limited to, processing unit 5416, a memory 5418 (e.g. a volatile memory such as a Random Access Memory (RAM) for the loading of executable instructions 5420, the executable instructions defining the functionality the apparatus 5402 carries out under control of the processing unit 5416. The apparatus 102 also comprises a network module 5425 allowing the apparatus to communicate over the communications network 5408 (for example the Internet). User interface 5424 is provided for user interaction and may comprise, for example, conventional computing peripheral devices such as display monitors, computer keyboards and the like. The apparatus 5402 may also comprise a database 5426. It should also be appreciated that the database 5426 may not be local to the server apparatus 5402. The database 5426 may be a cloud database.

The processing unit 5416 is connected to input/output devices such as a computer mouse, keyboard/keypad, a display, headphones or microphones, a video camera and the like (not illustrated in Figure) via Input/Output (I/O) interfaces 5422. The components of the processing unit 5416 typically communicate via an interconnected bus (not illustrated in FIG. 1) and in a manner known to the person skilled in the relevant art.

The processing unit 5416 may be connected to the network 5408, for instance, the Internet, via a suitable transceiver device (i.e. a network interface) or a suitable wireless transceiver, to enable access to e.g. the Internet or other network systems such as a wired Local Area Network (LAN) or Wide Area Network (WAN). The processing unit 5416 of the apparatus 5402 may also be connected to one or more external wireless communication enabled user device 5404 and crew device 5406 through the respective communication links 5410, 5412, 5414 via the suitable wireless transceiver device e.g. a WiFi transceiver, Bluetooth module, Mobile telecommunication transceiver suitable for Global System for Mobile Communication (GSM), 3G, 3.5G, 4G telecommunication systems, or the like.

The Sentinel device 5404 and/or the user device 5406 can be a computing or mobile device, for example, smart phones, tablet devices, and other handheld devices. The one or more Sentinel devices 5404 and one or more user devices 5406 may be able to communicate through other communications network, such as, wired network, mobile telecommunication networks, but these are omitted from FIG. 1 for the sake of clarity. Instead of the system architecture described above for the computing or mobile device 5402, the user device 5406 and/or the apparatus 5402 may be a computing or mobile device having the system architecture of the Sentinel device 5404. Likewise, instead of the system architecture described below for the computing or mobile device 5404, the Sentinel device 5404 and/or the user device 5406 may be a computing or mobile device having the system architecture of the apparatus 5402.

The Sentinel device 5404 may comprise a number of individual components including, but not limited to, microprocessor 5428 (or processor), a memory 5430 (e.g. a volatile memory such as a RAM) for the loading of executable instructions 5432, the executable instructions defining the functionality the Sentinel device 5404 carries out under control of the microprocessor 5428. The Sentinel device 5404 also comprises a network module (not illustrated in Figure) allowing the Sentinel device 5404 to communicate over the communications network 108. User interface 5436 is provided for user interaction and control that may be in the form of a touch panel display and presence of a keypad as is prevalent in many smart phone and other handheld devices. The Sentinel device 5404 may also comprise a database (not illustrated in Figure), which may not be local to the Sentinel device 5404, but a cloud database. The Sentinel device 5404 may include a number of other Input/Output (I/O) interfaces as well but they may be for connection with headphones or microphones, Subscriber identity module (SIM) card, flash memory card, USB based device, and the like, which are more for mobile device usage. The apparatus 5402, the Sentinel device 5404 and/or the user device 5406 may have access to a common wallet annotation database, and/or threat reputation database (TRDB) that is on a blockchain. An example of data stored in the common wallet annotation database is shown in FIG. 55. Each annotated wallet address in the annotation database may be associated with a blockchain type (e.g. ethereum or bitcoin), a security category (e.g. whitelist, blacklist or graylist), the list of annotations (e.g. Exchange, user wallet, Upbit, Bithumb, Token) associated with the wallet address and any relationship with other annotated wallet address in the annotation database.

The software and one or more computer programs may include, for example, the client applications (e.g. the Sentinel Protocol, CARA, CATV, Twitter Crawler, and/or Wallet Crawler) and may further include one or more software applications for e.g. instant messaging platform, audio/video playback, internet accessibility, operating the Sentinel device 5404 and user device 5406 (i.e. operating system), network security, file accessibility, database management, which are applications typically equipped on a desktop or portable (mobile) device. The software and one or more computer programs may be supplied to the user of the Sentinel device 5404 or the user device 5406 encoded on a data storage medium such as a CD-ROM, on a flash memory carrier or a Hard Disk Drive, and are to be read using a corresponding data storage medium drive for instance, a data storage device (not illustrated in FIG. 1). Such application programs may also be downloaded from the network 5408. The application programs are read and controlled in its execution by the processing unit 5416 or microprocessor 5428. Intermediate storage of program data may be accomplished using RAM 5420 or 5430. The client applications can be provided as an API, so any individual or organization (e.g. cryptocurrency wallet projects, cryptocurrency exchanges, and security vendors) can make use of the information. Alternatively, the client applications can be provided locally to an individual or organization with updates downloaded into the client applications at regular intervals or in real time.

Furthermore, one or more of the steps of the computer programs or software may be performed in parallel rather than sequentially. One or more of the computer programs may be stored on any machine or computer readable medium that may be non-transitory in nature. The computer readable medium may include storage devices such as magnetic or optical disks, memory chips, or other storage devices suitable for interfacing with a general purpose computer or mobile device. The machine or computer readable medium may also include a hard-wired medium such as exemplified in the Internet system, or wireless medium such as exemplified in the Wireless LAN (WLAN) system. The computer program when loaded and executed on such a general-purpose computer effectively results in an apparatus that implements the steps of the computing methods in examples herein described.

In summary, examples of the present disclosure may have the following features.

In one example, there is provided an apparatus (e.g. 100 in FIG. 1, 5402, 5404 and 5406 in FIG. 54) for cybersecurity. The apparatus comprises of a processor (e.g. 5418 and 5428 in FIG. 54) being configured to execute instructions (e.g. 5420 and 5432 in FIG. 54) in a memory (e.g. 5418 and 5430 in FIG. 54) to control the apparatus to:

i. receive an input for a subject address (e.g. 1960 in FIGS. 19B and 20A-F, 2606 in FIGS. 26,28-31, 33, 35 and 36) in a target blockchain system;
  ii. obtain a list of addresses (1962, 1964, 2002, 2004, 2006, 2008, 2010, 2012, 2014, 2016 and 2018 in FIGS. 19B and 20A-F) involved in a predefined number of hops of transactions upstream and/or downstream of the subject address in the target blockchain system;
  iii. identify suspicious transaction behaviour of addresses in the obtained list of addresses upstream and/or downstream of the subject address; and
  iv. calculate a risk score indicative of degree of cybersecurity threat for the subject address taking into consideration the suspicious transaction behaviour.

The apparatus may be further controllable to identify an address from the obtained list of addresses that transacted directly with the subject address upstream of the subject address as immediate source address (e.g. 1962 in FIG. 19B, 20A-F), and/or identify an address from the obtained list of addresses that transacted directly with the subject address downstream of the subject address as immediate destination address (e.g. 1964 in FIG. 19B, 20A-F), wherein each hop is defined as a transaction between two addresses that involves transfer of one or more tokens of a cryptocurrency of the target blockchain system;
  classify each immediate source address and/or immediate destination address with an indicator of degree of cybersecurity threat based on the determined suspicious transaction behaviour and/or based on indicator of degree of cybersecurity threat pre-recorded for the immediate source address and/or immediate destination address;
  assign to each of one or more tasks (e.g. Task 1 to Task 5 in FIGS. 21, 22 and 23A to 2C), a plurality of transactions occurring in a time period in the predefined number of hops of transactions upstream and/or downstream of the subject address, wherein the plurality of transactions comprises transactions between the subject address, the immediate source address and/or the immediate destination address;
  classify each task with an indicator of degree of cybersecurity threat based on the classification of the immediate source address and/or immediate destination address involved in the task; and
  calculate the risk score indicative of degree of cybersecurity threat for the subject address based on the classification of the one or more tasks.

Optionally, the plurality of transactions assigned to the task may comprise transactions starting from a first transaction between the subject address and a first immediate source address to a last transaction between the subject address and a last immediate destination address, wherein the last immediate destination address is an address that transacted with the subject address before a transaction between the subject address and an immediate source address.

The risk score may be calculated based on number of tasks classified with an indicator of a predetermined high degree of cybersecurity threat; time duration of the subject address involving one or more transactions involving the one or more tasks classified with an indicator of a predetermined high degree of cybersecurity threat; and amount of bad value of tokens in the one or more tasks that the subject address has transacted with and which is derived from addresses in the obtained list of addresses with an indicator of a predetermined high degree of cybersecurity threat.

Optionally, the apparatus may be controllable to: calculate the amount of bad value of tokens considered for one task by:

calculating a total input token amount received in the task from one or more immediate source addresses;
  calculating a total output token amount sent in the task to one or more immediate destination addresses, wherein a total absolute value of tokens transacted in the task equals to the total output token amount,
  wherein
    if a first condition that total bad value of tokens in the task from one or more immediate source addresses with an indicator of a predetermined high degree of cybersecurity threat is more than bad value of tokens sent to one or more immediate destination addresses in the task is satisfied, and
    if a second condition that total bad value of tokens in the task from one or more immediate source addresses with an indicator of a predetermined high degree of cybersecurity threat is less than or equal to the total absolute value of tokens transacted is satisfied, the amount of bad value of tokens considered for the task is equal to total input bad value tokens is achieved, however, if a third condition that total bad value of tokens in the task from one or more immediate source addresses with an indicator of a predetermined high degree of cybersecurity threat is more than the total absolute value of tokens transacted, the amount of bad value of tokens considered for the task is equal to the total absolute value of tokens transacted, however, if a fourth condition that the total bad value of tokens in the task to the one or more immediate destination addresses with an indicator of a predetermined high degree of cybersecurity threat is greater than the bad value of tokens in the task from one or more immediate source addresses with an indicator of a predetermined high degree of cybersecurity threat, the amount of bad value of tokens considered for the task is equal to the total bad value of tokens in the task to the one or more immediate destination addresses with an indicator of a predetermined high degree of cybersecurity threat.

The risk score may be calculated based on a first equation as follow:

Risk Score=average (normalized malicious token+ normalized malicious tasks+normalized malicious days), wherein normalized malicious value of each of the normalized malicious token, normalized malicious tasks and normalized malicious days is calculated by a second equation:

normalized malicious value=(normalized absolute bad value+% of bad value without normalization)/2, wherein the normalized absolute bad value of each metric comprising tokens, tasks and days, is calculated by a third equation:

normalized absolute bad value=[(absolute bad value of metric)*(% of bad value of metric)/(maximum absolute bad value of metric*normalizer), wherein the maximum absolute bad value of each metric comprising tokens, tasks and days is learnt by machine learning, wherein the normalizer is a predetermined value to normalise the absolute bad value of each metric comprising tokens, tasks and days based on the % of bad value of each metric comprising tokens, tasks and days.

The features on risk score calculation can be found in examples described with reference to FIG. 22.

The apparatus may be further controllable to classify each task with normal, suspicious, highly suspicious or malicious as the indicator of degree of cybersecurity threat based on characteristics that comprise at least one of the following:

a) immediate spending of all tokens from all immediate source addresses to immediate destination addresses with a balance of 0 token and token hold time by all immediate source addresses is less than or equal to 1 day; and/or b) spending of all tokens from all immediate source addresses after considerable hold time with a balance of 0 token and token hold time greater than or equal to 10 days.

The suspicious transaction behaviour may be identified based on i. whether the one or more transactions upstream and/or downstream of the subject address has a predetermined number of hops, and/or ii. after each address in the list of addresses is determined as a low transaction address or a medium transaction address based on one or more predetermined transaction volume thresholds, whether one or more addresses that are determined as low transaction address or a medium transaction address in the predetermined number of hops is involved in a transaction with a predetermined factor of aggregation or splitting of tokens, and/or iii. whether one or more addresses in the list of addresses are involved in a transaction with a predetermined factor of aggregation or splitting of tokens.

The suspicious transaction behaviour to be identified may comprise:

i. at least 5 hops of transactions, from an immediate source or destination address upstream or downstream of the subject address that directly transacted with the subject address, of direct relaying of tokens without aggregation or splitting of tokens;

ii. at least 4 hops of transactions, from an immediate source or destination address upstream or downstream of the subject address that directly transacted with the subject address, of relaying of tokens with at least 4 factors of splitting or aggregation of tokens by a low transaction address;

iii. at least 4 hops of transactions, from an immediate source or destination address upstream or downstream of the subject address that directly transacted with the subject address, of relaying of tokens with at least 8 factors of splitting or aggregation of tokens by a medium transaction address;

iv. at least 3 hops of transactions, from an immediate source or destination address upstream or downstream of the subject address that directly transacted with the subject address, of relaying of tokens with at least 2 factors of aggregation or splitting of tokens that involves a minimum of 2 addresses; and/or v. a single transaction with at least 10 factors of aggregation or splitting of tokens that involves a minimum of 2 addresses and occurring just before or after an exchange address.

The features on suspicious transaction behaviour are illustrated by examples described with reference to FIGS. 20A to 20F.

The predefined number of hops of transactions upstream or downstream from the subject address may be a number from a range of 1 to 8. Preferably, the predefined number of hops of transactions upstream or downstream from the subject address may be 5 or 6. This is to reduce the computational effort required by the apparatus to identify the suspicious transaction behaviour.

The suspicious transaction behaviour of one or more address upstream and/or downstream of the subject address may be determined using a trained artificial intelligence system that had undergone machine learning. For instance, principal component analysis may be applied to obtain characteristics that resemble different obfuscation techniques employed by malicious actors from a training set during the machine learning stage.

The apparatus may be further controllable to generate a virtualization diagram (e.g. 2602 in FIG. 26) to show a marker for each address in the list of addresses involved in the predefined number of hops of transactions upstream and/or downstream of the subject address, direction of token flow between the shown markers, and amount of token transacted between the shown markers.

Optionally, the apparatus may be further controllable to generate the virtualization diagram based on user inputs, wherein the user inputs include one or more of the following:
  i. source depth (e.g. 2610 in FIGS. 26, 28) to select a number of hops of transactions downstream of the subject address(e.g. 2606 in FIGS. 26, 28) to show in the virtualization diagram;
  ii. distribution depth (e.g. 2608 in FIGS. 26, 28) to select a number of hops of transactions upstream of the subject address to show in the virtualization diagram;
  iii. transaction limit (e.g. 2612 in FIG. 28) to enter an amount of token to exclude showing of addresses that have transacted beyond the entered amount of token in the virtualization diagram;
  iv. date range (e.g. 2614, 2616 in FIG. 28) to enter a start date (e.g. 2614 in FIG. 28) and an end date (e.g. 2616 in FIG. 28) to show addresses with transactions occurring between the start date and end date in the virtualization diagram; and/or
  v. disablement (e.g. 3504 in FIG. 35) of showing of each address that has more than a predetermined number (e.g. 3502 in FIG. 35) of token flow paths into or from said address.

The apparatus may be a part of a cybersecurity blockchain system that comprises a threat reputation database (e.g. 110 in FIG. 1) comprising cybersecurity threat data collected by users, security experts (e.g. 150 in FIG. 1) and/or artificial intelligence machines deployed to detect cybersecurity threat, wherein the apparatus is further controllable to update a threat reputation database (e.g. the TRDB described in the present disclosure) with the risk score indicative of degree of cybersecurity threat for the subject address when the apparatus is used to calculate the risk score for the subject address. Each apparatus can be regarded as a node of the cybersecurity blockchain system. One or more nodes of the cybersecurity blockchain system may be configured to allow a user to report a case in which cybersecurity is compromised and involves one or more addresses of the target blockchain system, and such report is sent to one or more nodes in the cybersecurity blockchain accessible to one or more designated security experts to validate, wherein, after validation, record or records of one or more addresses along with an assigned degree of cybersecurity threat, if assigned, are saved as a data block of the cybersecurity blockchain system in the threat reputation database.

Optionally, each address shown in the visualization diagram may be shown with a category after referring to records in the threat reputation database, wherein the category is one of the following: Blacklist (e.g. labelled as "1" in FIG. 35), Whitelist (e.g. labelled as "2" in FIG. 35); Exchange (e.g. labelled as "3" in FIG. 35); Decentralised exchange (e.g. labelled as "4" in FIG. 35); Involved in a Scam (e.g. labelled as "6" in FIG. 35); Involved with Phishing (e.g. labelled as "5" in FIG. 35); Associated with a Smart contract (e.g. labelled as "7" in FIG. 35); Annotated with information in the threat reputation database (e.g. labelled as '8" in FIG. 35); and Not falling in any of the above categories (e.g. labelled as "9" in FIG. 35).

The apparatus may be further controllable to periodically query the target blockchain system to
  i. update the threat reputation database with a newly found address in the target blockchain system and to assign the newly found address with one of the following types: exchange wallet, user wallet, or relay wallet used by an exchange; and/or
  ii. update an existing address stored in the threat reputation database with newly acquired information from the target blockchain system that is queried.

Optionally, the target blockchain may be queried by requesting for a list of addresses that transacted with a specific inputted address, requesting for number of transactions performed by each address in the requested list of addresses, and requesting for a balance token amount of each address in the requested list of addresses.

The apparatus may be further controllable to assign the newly found address or update assignment of the existing address to be an exchange wallet, if it is known that the specific inputted address is a user wallet associated with an exchange and the specified inputted address had transacted with an exchange wallet and the newly found address or the existing address, and if the newly found address or the existing address is found to transact with 10 other user wallets issued by the same exchange of the specified inputted address. The apparatus may also be controllable to assign the newly found address or update assignment of the existing address to be a user wallet, if found from the query to the target blockchain that token or tokens are transferred directly from the newly found address or the existing address to one or more known exchange wallet or one or more known relay wallet used by an exchange, or if found from the query to the target blockchain that a wallet creator had created the newly found address or the existing address and the wallet creator is known to be used by an exchange. The apparatus may be further controllable to assign the newly found address or update assignment of the existing address to be a relay wallet used by an exchange, if found from the query to the target blockchain that the newly found address or the existing address is involved in one inward token transaction and one outward token transaction that result in a balance of 0 token for the newly found address or the existing address, or if found from the query to the target blockchain that token withdrawal took place for the newly found address or the existing address and after the token withdrawal, any balance tokens of the newly found address or the existing address is transferred to more than one wallet.

The features on assignment of newly found address or updating of assignment of an existing address can be found in examples described with reference to FIGS. 38A-D, 40, 41A-41B, 42A-42H.

The apparatus may be further controllable to detect an impersonator twitter account or a malicious tweet.

Optionally, the apparatus may further controllable to authenticate identity of a subject twitter account by:
  i. detecting anomaly in use of space between a twitter handle of the subject twitter account and a profile name of the subject twitter account;
  ii. detecting similarity between a known profile name of an authentic twitter account and the profile name of the subject twitter account;
  iii. detecting a similarity between a known twitter handle of an authentic twitter account and the twitter handle of the subject twitter account, and/or
  iv. detecting anomaly in number of Cyrillic characters used in the profile name and the twitter handle of the subject twitter account.

The above-mentioned features relating authentication of identity of a subject twitter account can be found in examples described with reference to FIGS. 4, 5A-B, 6A-C, 7 and 8A-8E. In one example, the apparatus may be controllable to display a badge proximate to the profile name of the subject twitter account that is indicative of the authenticity of the identity of the subject twitter account. This feature can be found in examples described with reference to FIGS. 17A and 17B.

Optionally, the apparatus may be further controllable to poll for new tweets in an authentic twitter account and flag each of the retrieved new tweets as a potentially malicious or malicious tweet if at least one of the following conditions is satisfied:
 (i) the retrieved new tweet is determined to contain at least one pre-defined keyword indicative of malicious content and a wallet address;
 (ii) the retrieved new tweet is determined to contain at least one pre-defined keyword indicative of malicious content and a Uniform Resource Locator (URL);
 (iii) the retrieved new tweet is determined to contain at least one URL and after accessing the URL, the URL is determined to comprise pre-defined HTML source code indicative of malicious content; or
 (iv) the retrieved new tweet is determined to contain a wallet address or a URL that is pre-determined to be blacklisted.

The above-mentioned features to poll for new tweets and flag them can be found in examples described with reference to FIGS. 8A and 8B, 9, 10A and 10C.

In one example, the apparatus may be controllable to display a visual indicator to indicate the retrieved new tweet is potentially malicious or malicious tweet. This feature can be found in examples described with reference to FIG. 18.

In another example, there is provided a method for cybersecurity. The method comprises receiving an input (e.g. 1903 in FIG. 19A) for a subject address in a target blockchain system; obtaining a list of addresses involved in a predefined number of hops of transactions upstream and/or downstream of the subject address in the target blockchain system; identifying suspicious transaction behaviour of addresses in the obtained list of addresses upstream and/or downstream of the subject address; and calculating a risk score (e.g. 1909 in FIG. 19A) indicative of degree of cybersecurity threat for the subject address taking into consideration the suspicious transaction behaviour.

In yet another example, there is provided a method and an apparatus for cybersecurity, the apparatus comprises: a threat reputation database comprising threat data collected by users, security experts and/or artificial intelligence, wherein the users can report malicious data, such as hacks and/or scams for security experts to validate before saving as a data block in the threat reputation database, wherein the security experts or users are rewarded for contributing data into the threat reputation database. The threat reputation database may comprise machine learning data capable of identifying potential security threat. The method and the apparatus may be based on blockchain technology.

For the avoidance of doubt, any feature of one aspect of the present invention may be utilised in any other aspect of the invention. It is noted that the examples given in the description below are intended to clarify the invention and are not intended to limit the invention to those examples per se.

In the specification and claims, unless the context clearly indicates otherwise, the term "comprising" has the non-exclusive meaning of the word, in the sense of "including at least" rather than the exclusive meaning in the sense of "consisting only of". The same applies with corresponding grammatical changes to other forms of the word such as "comprise", "comprises" and so on.

While the invention has been particularly shown and described with reference to specific embodiments, it should be understood by those skilled in the art that various changes in form and details may be made therein without departing from the scope of the invention as understood by a skilled person.

The invention claimed is:

1. An apparatus for cybersecurity, the apparatus comprising:
 a processor being configured to execute instructions in a memory to control the apparatus to:
 receive an input for a subject address in a target blockchain system;
 obtain a list of addresses involved in a predefined number of hops of transactions upstream and/or downstream of the subject address in the target blockchain system;
 identify suspicious transaction behaviour of addresses in the obtained list of addresses upstream and/or downstream of the subject address;
 calculate a risk score indicative of degree of cybersecurity threat for the subject address taking into consideration the suspicious transaction behaviour;
 identify an address from the obtained list of addresses that transacted directly with the subject address upstream of the subject address as immediate source address, and/or identify an address from the obtained list of addresses that transacted directly with the subject address downstream of the subject address as immediate destination address,
 wherein each hop is defined as a transaction between two addresses that involves transfer of one or more tokens of a cryptocurrency of the target blockchain system;
 classify each immediate source address and/or immediate destination address with an indicator of degree of cybersecurity threat based on the determined suspicious transaction behaviour and/or based on indicator of degree of cybersecurity threat pre-recorded for the immediate source address and/or immediate destination address;
 assign to each of one or more tasks, a plurality of transactions occurring in a time period in the predefined number of hops of transactions upstream and/or downstream of the subject address, wherein the plurality of transactions comprises transactions between the subject address, the immediate source address and or the immediate destination address;
 classify each task with an indicator of degree of cybersecurity threat based on the classification of the immediate source address and/or immediate destination address involved in the task; and
 calculate the risk score indicative of degree of cybersecurity threat for the subject address based on the classification of the one or more tasks,
 wherein the apparatus is part of a cybersecurity blockchain system that comprises:
 a threat reputation database comprising cybersecurity threat data collected by users, security experts and/or artificial intelligence machines deployed to detect cybersecurity threat, wherein the apparatus is further controllable to update the threat reputation database with the risk score indicative of degree of cybersecurity threat for the subject address when the apparatus is used to calculate the risk score for the subject address,
 wherein one or more nodes of the cybersecurity blockchain system is configured to allow a user to report a case in which cybersecurity is compromised and involves one or more addresses of the target blockchain system, and such report is sent to one or more nodes in the cybersecurity blockchain accessible to one or more designated security experts to validate, wherein, after validation, record or records of one or more addresses along with an assigned degree of cybersecurity threat, if assigned, are saved as a data block of the cybersecurity blockchain system in the threat reputation database.

2. The apparatus of claim 1, wherein the suspicious transaction behaviour is identified based on whether the one or more transactions upstream and/or downstream of the subject address has a predetermined number of hops, and/or after each address in the list of addresses is determined as a low transaction address or a medium transaction address based on one or more predetermined transaction volume thresholds, whether one or more addresses that are determined as low transaction address or a medium transaction address in the predetermined number of hops is involved in a transaction with a predetermined factor of aggregation or splitting of tokens, and/or whether one or more addresses in the list of addresses are involved in a transaction with a predetermined factor of aggregation or splitting of tokens.

3. The apparatus of claim 2, wherein the suspicious transaction behaviour to identify comprises:

at least 5 hops of transactions, from an immediate source or destination address upstream or downstream of the subject address that directly transacted with the subject address, of direct relaying of tokens without aggregation or splitting of tokens;

at least 4 hops of transactions, from an immediate source or destination address upstream or downstream of the subject address that directly transacted with the subject address, of relaying of tokens with at least 4 factors of splitting or aggregation of tokens by a low transaction address;

at least 4 hops of transactions, from an immediate source or destination address upstream or downstream of the subject address that directly transacted with the subject address, of relaying of tokens with at least 8 factors of splitting or aggregation of tokens by a medium transaction address;

at least 3 hops of transactions, from an immediate source or destination address upstream or downstream of the subject address that directly transacted with the subject address, of relaying of tokens with at least 2 factors of aggregation or splitting of tokens that involves a minimum of 2 addresses; and/or a single transaction with at least 10 factors of aggregation or splitting of tokens that involves a minimum of 2 addresses and occurring just before or after an exchange address.

4. The apparatus of claim 1, wherein the predefined number of hops of transactions upstream or downstream from the subject address is 5 or 6.

5. The apparatus of claim 1, wherein the suspicious transaction behaviour of one or more address upstream and/or downstream of the subject address is determined using a trained artificial intelligence system that had undergone machine learning.

6. The apparatus of claim 1, wherein the apparatus is further controllable to generate a virtualization diagram to show a marker for each address in the list of addresses involved in the predefined number of hops of transactions upstream and/or downstream of the subject address, direction of token flow between the shown markers, and amount of token transacted between the shown markers.

7. The apparatus of claim 6, wherein the apparatus is further controllable to generate the virtualization diagram based on user inputs, wherein the user inputs include one or more of the following:

source depth to select a number of hops of transactions downstream of the subject address to show in the virtualization diagram;

distribution depth to select a number of hops of transactions upstream of the subject address to show in the virtualization diagram;

transaction limit to enter an amount of token to exclude showing of addresses that have transacted beyond the entered amount of token in the virtualization diagram;

date range to enter a start date and an end date to show addresses with transactions occurring between the start date and end date in the virtualization diagram; and/or disablement of showing of each address that has more than a predetermined number of token flow paths into or from said address.

8. The apparatus of claim 1, wherein the apparatus is further controllable to detect an impersonator twitter account or a malicious tweet.

9. The apparatus of claim 8, wherein the apparatus is further controllable to:

authenticate identity of a subject twitter account by detecting anomaly in use of space between a twitter handle of the subject twitter account and a profile name of the subject twitter account;

detecting similarity between a known profile name of an authentic twitter account and the profile name of the subject twitter account;

detecting a similarity between a known twitter handle of an authentic twitter account and the twitter handle of the subject twitter account, and/or detecting anormaly in number of Cyrillic characters used in the profile name and the handle of the subject twitter account; and display a badge proximate to the profile name of the subject twitter account that is indicative of authenticity of the identity of the subject twitter account.

10. The apparatus of claim 8, wherein the apparatus is further controllable to:

poll for new tweets in an authentic twitter account;

flag each new tweet as a potentially malicious or malicious tweet if:

(i) the new tweet is determined to contain at least one pre-defined keyword indicative of malicious content and a wallet address;

(ii) the new tweet is determined to contain at least one pre-defined keyword indicative of malicious content and a Uniform Resource Locator (URL);

(iii) the new tweet is determined to contain at least one URL and after accessing the URL, the URL is determined to comprise pre-defined HTML source code indicative of malicious content; and/or (iv) the new tweet is determined to contain a wallet address or a URL that is pre-determined to be blacklisted; and display a visual indicator for each flagged new tweet to indicate it is potentially malicious or malicious tweet.

11. The apparatus of claim 1, wherein the plurality of transactions assigned to the task comprises transactions starting from a first transaction between the subject address and a first immediate source address to a last transaction between the subject address and a last immediate destination address, wherein the last immediate destination address is an address that transacted with the subject address before a transaction between the subject address and an immediate source address.

12. The apparatus of claim 1, wherein the risk score is calculated based on:
number of tasks classified with an indicator of a predetermined high degree of cybersecurity threat;
time duration of the subject address involving one or more transactions involving the one or more tasks classified with an indicator of a predetermined high degree of cybersecurity threat; and
amount of bad value of tokens in the one or more tasks that the subject address has transacted with and which is derived from addresses in the obtained list of addresses with an indicator of a predetermined high degree of cybersecurity threat.

13. The apparatus of claim 12, wherein the apparatus is controllable to:
calculate the amount of bad value of tokens considered for one task by:
calculating a total input token amount received in the task from one or more immediate source addresses;
calculating a total output token amount sent in the task to one or more immediate destination addresses, wherein a total absolute value of tokens transacted in the task equals to the total output token amount,
wherein
if a first condition that total bad value of tokens in the task from one or more immediate source addresses with an indicator of a predetermined high degree of cybersecurity threat is more than bad value of tokens sent to one or more immediate destination addresses in the task is satisfied, and
if a second condition that total bad value of tokens in the task from one or more immediate source addresses with an indicator of a predetermined high degree of cybersecurity threat is less than or equal to the total absolute value of tokens transacted is satisfied,
the amount of bad value of tokens considered for the task is equal to total input bad value tokens is achieved,
however, if a third condition that total bad value of tokens in the task from one or more immediate source addresses with an indicator of a predetermined high degree of cybersecurity threat is more than the total absolute value of tokens transacted, the amount of bad value of tokens considered for the task is equal to the total absolute value of tokens transacted,
however, if a fourth condition that the total bad value of tokens in the task to the one or more immediate destination addresses with an indicator of a predetermined high degree of cybersecurity threat is greater than the bad value of tokens in the task from one or more immediate source addresses with an indicator of a predetermined high degree of cybersecurity threat, the amount of bad value of tokens considered for the task is equal to the total bad value of tokens in the task to the one or more immediate destination addresses with an indicator of a predetermined high degree of cybersecurity threat.

14. The apparatus of claim 12, wherein the risk score is calculated based on a first equation as follow:

$$\text{Risk Score} = \text{average (normalized malicious token} + \text{normalized malicious tasks} + \text{normalized malicious days)},$$

wherein normalized malicious value of each of the normalized malicious token, normalized malicious tasks and normalized malicious days is calculated by a second equation:

$$\text{normalized malicious value} = (\text{normalized absolute bad value \% of bad value without normalization})/2,$$

wherein the normalized absolute bad value of each metric comprising tokens, tasks and days, is calculated by a third equation:

$$\text{normalized absolute bad value} = [(\text{absolute bad value of metric})*(\% \text{ of bad value of metric})/(\text{maximum absolute bad value of metric}*\text{normalizer})],$$

wherein the maximum absolute bad value of each metric comprising tokens, tasks and days is learnt by machine learning,
wherein the normalizer is a predetermined value to normalise the absolute bad value of each metric comprising tokens, tasks and days based on the % of bad value of each metric comprising tokens, tasks and days.

15. The apparatus of claim 1, wherein the apparatus is further controllable to classify each task with normal, suspicious, highly suspicious or malicious as the indicator of degree of cybersecurity threat based on characteristics that comprise at least one of the following:
a) immediate spending of all tokens from all immediate source addresses to immediate destination addresses with a balance of 0 token and token hold time by all immediate source addresses is less than or equal to 1 day; and/or
b) spending of all tokens from all immediate source addresses after considerable hold time with a balance of 0 token and token hold time greater than or equal to 10 days.

16. The apparatus of claim 1, wherein each address shown in a visualization diagram is shown with a category after referring to records in the threat reputation database, wherein the category is one of the following: Blacklist; Whitelist; Exchange; Decentralised exchange; Involved in a Scam; Involved with Phishing; Associated with a Smart contract; Annotated with information in the threat reputation database; and Not falling in any category.

17. The apparatus of claim 1, wherein the apparatus is further controllable to: periodically query the target blockchain system to:
update the threat reputation database with a newly found address in the target blockchain system and to assign the newly found address with one of the following types: exchange wallet user wallet, or relay wallet used by an exchange; and/or
update an existing address stored in the threat reputation database with newly acquired information from the target blockchain system that is queried.

18. The apparatus of claim 16, wherein the target blockchain system is queried by requesting for a list of addresses that transacted with a specific inputted address, requesting for number of transactions performed by each address in the requested list of addresses, and
requesting for a balance token amount of each address in the requested list of addresses.

19. The apparatus of claim 17, wherein the apparatus is further controllable to:
- assign the newly found address or update assignment of the existing address to be an exchange wallet
  if it is known that the specific inputted address is a user wallet associated with an exchange and the specified inputted address had transacted with an exchange wallet and the newly found address or the existing address and if the newly found address or the existing address is found to transact with 10 other user wallets issued by the same exchange of the specified inputted address; or
- assign the newly found address or update assignment of the existing address to be a user wallet
  if found from the query to the target blockchain that token or tokens are transferred directly from the newly found address or the existing address to one or more known exchange wallet or one or more known relay wallet used by an exchange; or
  if found from the query to the target blockchain that a wallet creator had created the newly found address or the existing address and the wallet creator is known to be used by an exchange; or
- assign the newly found address or update assignment of the existing address to be a relay wallet used by an exchange
  if found from the query to the target blockchain that the newly found address or the existing address is involved in one inward token transaction and one outward token transaction that result in a balance of 0 token for the newly found address or the existing address, or
  if found from the query to the target blockchain that token withdrawal took place for the newly found address or the existing address and after the token withdrawal, any balance tokens of the newly found address or the existing address is transferred to more than one wallet.

20. A method for cybersecurity, the method comprising:
- receiving an input for a subject address in a target blockchain system;
- obtaining a list of addresses involved in a predefined number of hops of transactions upstream and/or downstream of the subject address in the target blockchain system;
- identifying suspicious transaction behaviour of addresses in the obtained list of addresses upstream and/or downstream of the subject address;
- calculating a risk score indicative of degree of cybersecurity threat for the subject address taking into consideration the suspicious transaction behaviour;
- identifying an address from the obtained list of addresses that transacted directly with the subject address upstream of the subject address as immediate source address, and/or identify an address from the obtained list of addresses that transacted directly with the subject address downstream of the subject address as immediate destination address, wherein each hop is defined as a transaction between two addresses that involves transfer of one or more tokens of a cryptocurrency of the target blockchain system;
- classifying each immediate source address and/or immediate destination address with an indicator of degree of cybersecurity threat based on the determined suspicious transaction behaviour and/or based on indicator of degree of cybersecurity threat pre-recorded for the immediate source address and/or immediate destination address;
- assigning to each of one or more tasks, a plurality of transactions occurring in a time period in the predefined number of hops of transactions upstream and/or downstream of the subject address, wherein the plurality of transactions comprises transactions between the subject address, the immediate source address and or the immediate destination address;
- classifying each task with an indicator of degree of cybersecurity threat based on the classification of the immediate source address and/or immediate destination address involved in the task;
- calculating the risk score indicative of degree of cybersecurity threat for the subject address based on the classification of the one or more tasks;
- deploying a threat reputation database comprising cybersecurity threat data collected by users, security experts and/or artificial intelligence machines to detect cybersecurity threat;
- updating the threat reputation database with the risk score indicative of degree of cybersecurity threat for the subject address when the risk score for the subject address is calculated; and
- receiving a report from a user of a case in which cybersecurity is compromised and involves one or more addresses of the target blockchain system and sending such report to one or more nodes in a cybersecurity blockchain system accessible to one or more designated security experts to validate,
- wherein, after validation, record or records of one or more addresses along with an assigned degree of cybersecurity threat, if assigned, are saved as a data block of the cybersecurity blockchain system in the threat reputation database.

* * * * *